(12) United States Patent
Xia et al.

(10) Patent No.: US 9,382,387 B2
(45) Date of Patent: Jul. 5, 2016

(54) RAPID SELF-ASSEMBLY OF BLOCK COPOLYMERS TO PHOTONIC CRYSTALS

(71) Applicants:California Institute of Technology, Pasadena, CA (US); The University of Massachusetts, Boston, MA (US)

(72) Inventors: Yan Xia, Quincy, MA (US); Benjamin R Sveinbjornsson, Pasadena, CA (US); Robert H Grubbs, South Pasadena, CA (US); Raymond Weitekamp, Glendale, CA (US); Garret M Miyake, Pasadena, CA (US); Harry A Atwater, South Pasadena, CA (US); Victoria Piunova, Altadena, CA (US); Christopher Scot Daeffler, Pasadena, CA (US); Sung Woo Hong, Seoul (KR); Weiyin Gu, Amherst, MA (US); Thomas P. Russell, Amherst, MA (US)

(73) Assignee: CALIFORNIA INSTITUTE OF TECHNOLOGY, Pasadena, CA (US)

(*) Notice: Subject to any disclaimer, the term of this patent is extended or adjusted under 35 U.S.C. 154(b) by 86 days.

(21) Appl. No.: 13/800,646

(22) Filed: Mar. 13, 2013

(65) Prior Publication Data
US 2013/0324666 A1 Dec. 5, 2013

Related U.S. Application Data

(60) Provisional application No. 61/610,379, filed on Mar. 13, 2012, provisional application No. 61/653,311, filed on May 30, 2012, provisional application No. 61/736,421, filed on Dec. 12, 2012.

(51) Int. Cl.
*C08G 81/02* (2006.01)
*C08G 83/00* (2006.01)

(52) U.S. Cl.
CPC ............ *C08G 81/027* (2013.01); *C08G 83/008* (2013.01)

(58) Field of Classification Search
CPC .. C08F 293/00; C08F 293/005; C08F 297/00; C08F 297/06; C08F 299/00; C08G 83/008
See application file for complete search history.

(56) References Cited

U.S. PATENT DOCUMENTS

| | | | |
|---|---|---|---|
| 5,462,990 | A | 10/1995 | Hubbell et al. |
| 6,007,845 | A | 12/1999 | Domb et al. |
| 6,383,500 | B1 | 5/2002 | Wooley et al. |
| 6,407,187 | B1 | 6/2002 | Matyjaszewski et al. |
| 6,433,931 | B1 | 8/2002 | Fink et al. |
| 6,627,314 | B2 | 9/2003 | Matyjaszewski et al. |
| 6,671,097 | B2 | 12/2003 | Fink et al. |
| 6,692,914 | B1 | 2/2004 | Klaerner et al. |
| 7,101,937 | B1 | 9/2006 | Frechet et al. |
| 7,795,355 | B2 | 9/2010 | Matyjaszewski et al. |
| 7,960,479 | B2 | 6/2011 | Cheng et al. |
| 8,415,436 | B2 | 4/2013 | Han et al. |
| 8,419,792 | B2 | 4/2013 | Vanderbilt et al. |
| 8,454,689 | B2 | 6/2013 | Vanderbilt et al. |
| 2002/0135880 | A1 | 9/2002 | Fink et al. |
| 2007/0099791 | A1 | 5/2007 | Wan et al. |
| 2013/0296491 | A1 | 11/2013 | Xia et al. |
| 2014/0011958 | A1 | 1/2014 | Miyake et al. |

FOREIGN PATENT DOCUMENTS

WO    WO 2013/138494    9/2013

OTHER PUBLICATIONS

Eberhardt, M. et al. Polymer Preprints vol. 41(1) (2005) pp. 100-101.*
Aguirre et al. (2010) "Tunable Colors in Opals and Inverse Opal Photonic Crystals," *Adv. Funct. Mater.* 20:2565-2578.
Akbari et al. (2001) "Cool Surfaces and Shade Trees to Reduce Energy Use and Improve Air Quality in Urban Areas", *Solar Energy*, vol. 70 No. 3, pp. 295-310.
Albert et al. (2010) "Self-Assembly of Block Copolymer Thin Films," *Materials Today*. 13:24-33.
Aharoni (1979), "Rigid Backbone Polymers. 2. Polyisocyanates and Their Liquid-Crystal Behavior," Macromolecules, 12, 94-103.
Atwater et al. (2010) "Plasmonics for Improved Photovoltaic Devices", *Nature Material*, vol. 9, pp. 205-214.
Azzaroni et al. (2012), "Polymer Brushes Here, There, and Everywhere: Recent Advances in Their Practical Applications and Emerging Opportunities in Multiple Research Fields", Journal of Polymer Science Part A: Polymer Chemistry 2012, 50, 3225-3258.
Bang et al. (2009) "Block Copolymer Nanolithography: Translation of Molecular Level Control to Nanoscale Patterns," *Adv. Mater.* 21:4769-4792.
Bang et al. (2009) "Dual Templating Synthesis of Mesoporous Titanium Nitride Microspheres," *Adv. Mater.* 21:3186-3190.
Bates et al. (1990) "Block Copolymer Thermodynamics: Theory and Experiment," *Ann. Rev. Phys. Chem.* 41:525-557.
Bates et al. (1999) "Block Co-polymers-Designer Soft Materials," *Physics Today*. 52:32-38.
Bates et al. (Apr. 27, 2012) "Multiblock Polymers: Panacea or Pandora's Box?" *Science*. 336:434-440.
Bajpai et al. (2008), "Responsive polymers in controlled drug delivery", Progress in Polymer Science 33 (2008) 1088-1118.
Bae et al. (2005), "Organization of Rigid Wedge-Flexible Coil Block Copolymers into Liquid Crystalline Assembly", Macromolecules, vol. 38, No. 10, pp. 4226-4230.

(Continued)

*Primary Examiner* — Irina S Zemel
*Assistant Examiner* — Jeffrey Lenihan
(74) *Attorney, Agent, or Firm* — Lathrop & Gage LLP

(57) ABSTRACT

The invention provides a class of copolymers having useful properties, including brush block copolymers, wedge-type block copolymers and hybrid wedge and polymer block copolymers. In an embodiment, for example, block copolymers of the invention incorporate chemically different blocks comprising polymer size chain groups and/or wedge groups that significantly inhibit chain entanglement, thereby enhancing molecular self-assembly processes for generating a range of supramolecular structures, such as periodic nanostructures and microstructures. The present invention also provides useful methods of making and using copolymers, including block copolymers.

30 Claims, 43 Drawing Sheets

(56) References Cited

OTHER PUBLICATIONS

Bennett et al. (1982) "Modelling of the urban heat island and of its interaction with pollutant dispersal," *Atmospheric Environment*. 16:1797-1822.

Bertone et al. (1999) "Thickness Dependence of the Optical Properties of Ordered Silica-Air and Air-Polymer Photonic Crystals," *Phys. Rev. Lett.* 83:300-303.

Bielawski et al. (2007) "Living ring-opening metathesis polymerization," *Prog. Polym. Sci.* 32:1-29.

Bielawski et al. (2009) "Living Ring-Opening Metathesis Polymerization," In; Ch. 6 *Controlled and Living Polymerizations*. Eds.: Müller, A. H. E.; Matyjaszewski, K. *Wiley-VCH*. Weinheim, Germany. pp. 297-342.

Black (2005) "Self-Aligned Self Assembly of Multi-Nanowire Silicon Field Effect Transistors," *Appl. Phys. Lett.* 87:163116-163118.

Black et al. (2001) "Integration of Self-Assembled Diblock Copolymers for Semiconductor Capacitor Fabrication," *Appl. Phys. Lett.* 79:409-411.

Braun et al. (1999) "Microporous materials: Electrochemically grown photonic crystals," *Nature*. 402:603-604.

Campbell et al. (2000) "Fabrication of photonic crystals for the visible spectrum by holographic lithography," *Nature*. 404:53-56.

Carmesin et al. (1990) "Static and Dynamic Properties of Two-Dimensional Polymer Melts," *J. Phys. (Paris)*. 51:915-932.

Carney et al. (2008), "Intramolecular Hydroamination of Aminoalkynes with Silver—Phenanthroline Catalysts," Org. Lett. 2008, 10, 3903-3906.

Crutzen (2004) "New Directions: The Growing Urban Heat and Pollution "Island" Effect—Impact on Chemistry and Climate," *Atmospheric Environment 38*, 3539-3540.

Cheng et al. (2001) "Formation of a Cobalt Magnetic Dot Array via Block Copolymer Lithography," *Adv. Mater.* 13:1174-1178.

Cheng et al. (2006) "Templated Self-Assembly of Block Copolymers: Top-Down Helps Bottom-Up," *Adv. Mater.* 18:2505-2521.

Cushen et al. (2012) "Oligosaccharide/Silicon-Containing Block Copolymers with 5 nm Features for Lithographic Applications," *ACS Nano*. 6:3424-3433.

Daeffler (2013), "Ring-Opening Metathesis of Bulky Norbornene Monomers and Radical-Mediated Hydrophosphonation of Olefins" Ph.D. Thesis, California Institute of Technology, Pasadena, California.

Deutsch et al. (1991) "Interdiffusion and Self-Diffusion in Polymer Mixtures: A Monte Carlo Study," *J. Chem. Phys.* 94:2294-2304.

Edrington et al. (2001) "Polymer-Based Photonic Crystals," *Adv. Mater.* 13:421-425.

Ferry et al. (2010), "Design Considerations for Plasmonic Photovoltaics," *Adv. Mater*, vol. 22, pp. 4794-4808.

Fink et al. (1999) "Block Copolymers as Photonic Bandgap Materials," *Journal of Lightwave Technology*, vol. 17, No. 11, pp. 1963-1969.

Fredrickson et al. (1996) "Dynamics of Block Copolymers: Theory and Experiment," *Annu. Rev. Mater. Sci.* 26: 501-550.

Galisteo-Lopez et al. (2011) "Self-Assembled Photonic Structures," *Adv. Mater*, vol. 23, 30-69.

Gao et al. (2007) "Synthesis of Molecular Brushes by "Grafting Onto" Method: Combination of ATRP and Click Reactions," *J. Am. Chem. Soc.* 129:6633.

Ge et al. (Jan. 20, 2011) "Responsive Photonic Crystals," *Angew. Chem. Int. Ed.* 50:1492-1522.

Grason (2006) "The Packing of Soft Materials: Molecular Asymmetry, Geometric Frustration and Optimal Lattices in Block Copolymer Melts," *Phys. Rep.* 433:1-64.

Green et al. (1999) "The Macromolecular Route to Chiral Amplification," *Angew. Chem. Int. Ed.* 38:3138-3154.

Green et al. (1989), "Macromolecular stereochemistry: the out-of-proportion influence of optically active comonomers on the conformational characteristics of polyisocyanates. The sergeants and soldiers experiment," J. Am. Chem. Soc., 111, 6452-6454.

Grimm et al. (2008) "Global Change and the Ecology of Cities," *Science*. 319:756-760.

Gu et al. (Published online Jan. 31, 2013) "Self-Assembly of Symmetric Brush Diblock Copolymers," *ACS Nano*. 7:2551-2558.

Hadjichristidis et al. (2001) "Polymers with Complex Architecture by Living Anionic Polymerization," *Chem. Rev.* 101:3747-3792.

Hadjichristidis et al. (2003) "The Strength of the Macromonomer Strategy for Complex Macromolecular Architecture: Molecular Characterization, Properties and Applications of Polymacromonomers," *Macromol. Rapid Commun.* 24:979-1013.

Hamley (2003) "Nanostructure Fabrication Using Block Copolymers," *Nanotechnology*. 14:R39.

Hashimoto et al. (1993) "Ordered structure in blends of block copolymers. 1. Miscibility criterion for lamellar block copolymers," *Macromolecules*. 26:2895-2904.

Hawker et al. (2005) "Block Copolymer Lithography: Merging 'Bottom-Up' with 'Top-Down' Processes," *MRS Bull*. 30:952-966.

Heroguez et al. (1996) "Synthesis of α-Norbornenylpoly(ethylene oxide) Macromonomers and Their Ring-Opening Metathesis Polymerization," *Macromolecules*. 29:4459-4464.

Hu et al. (Aug. 4, 2011) "Linear Rheological Response of a Series of Densely Branched Brush Polymers," *Macromolecules*. 44:6935-6943.

Hustad et al. (2009) "Photonic Polyethylene from Self-Assembled Mesophases of Polydisperse Olefin Block Copolymers," *Macromolecules*. 42:3788-3794.

International Search Report and Written Opinion mailed Jul. 18, 2013, corresponding to International Application No. PCT/US2013/030978.

Jeon et al. (2004) "Fabricating Complex Three-Dimensional Nanostructures with High-Resolution Conformable Phase Masks," *Proc. Natl. Acad. Sci. USA* 101:12428-12433.

Jeon, et al. (1999) "Patterned Polymer Growth on Silicon Surfaces Using Microcontact Printing and Surface-Initiated Polymerization," Applied Physics Letters 75(26):4201-4203.

Johnson et al. (2010) "Drug-loaded, bivalent-bottle-brush polymers by graft-through ROMP," *Macromolecules*. 43:10326-10335.

Johnson et al. (Dec. 13, 2011) "Core-Clickable PEG-Branch-Azide Bivalent-Bottle-Brush Polymers by ROMP: Grafting-Through and Clicking-To," *J. Am. Chem. Soc.* 133:559-566.

Kalnay et al. (2003) "Impact of Urban and Land-Use Change on Climate," *Nature*, vol. 423, 523-531.

Kane et al. (1996) "Phase Behavior and Morphological Characteristics of Compositionally Symmetric Diblock Copolymer Blends," *Macromolecules*. 29:8862-8870.

Kang et al. (2007) "Broad-Wavelength-Range Chemically Tunable Block-Copolymer Photonic Gels," *Nat. Mater*. 6:957-960.

Kang et al. (2009) "Full Color Stop Bands in Hybrid Organic/Inorganic Block Copolymer Photonic Gels by Swelling—Freezing," *J. Am. Chem. Soc.* 131:7538-7539.

Kang et al. (2011), "Ultrafast Cyclopolymerization for Polyene Synthesis: Living Polymerization to Dendronized Polymers," J. Am. Chem. Soc. 2011, 133, 11904-11907.

Karl et al. (2003) "Modern Global Climate Change," *Science*. 302:1719-1723.

Kikuchi et al. (2008) "Conformational Properties of Cylindrical Rod Brushes Consisting of a Polystyrene Main Chain and Poly(n-hexyl isocyanate) Side Chains," *Macromolecules*. 41:6564-6572.

Kim et al. (2001) "A Route to Nanoscopic $SiO_2$ Posts via Block Copolymer Templates," *Adv. Mater*. 13:795-797.

Krause et al. (2003), "Simple Synthesis of Poly(acetylene) Latex Particles in Aqueous Media," Angew. Chem. Int. Ed. 2003, 42, 5965-5969.

Kumar et al. (2009), "Factors Relevant for the Regioselective Cyclopolymerization of 1,6-Heptadiynes, N,N-Dipropargylamines, N,N-Dipropargylammonium Salts, and Dipropargyl Ethers by RuIV—Alkylidene-Based Metathesis Initiators", J. Am. Chem. Soc., 131, 387-395.

Lanson et al. (2007) "Poly(styrene)comb-*b*-Poly(ethylene oxide)comb Copolymers: Synthesis and AFM Investigation of Intra- and Supramolecular Organization as Thin Deposits," *Macromolecules*. 40:9503-9509.

(56) References Cited

OTHER PUBLICATIONS

Lanson et al. (2007) "Synthesis of (Poly(chloroethyl vinyl ether)-g-polystyrene)comb-b-(poly(chlorogyran ethoxy vinyl ether)-g-polyisoprene)comb Copolymers and Study of Hyper-Branched Micelle Formation in Dilute Solutions," *Macromolecules.* 40:5559-5565.
Lee et al. (2008) "Hetero-Grafted Block Brushes with PCL and PBA Side Chains," *Macromolecules.* 41:6073-6080.
Lee et al. (2010) "Quasi-Amorphous Colloidal Structures for Electrically Tunable Full-Color Photonic Pixels with Angle-Independency," *Adv. Mater.* 22:4973-4977.
Leibler (1980) "Theory of Microphase Separation in Block Copolymers," *Macromolecules.* 13:1602-1617.
Leitgeb et al. (2010) "The ROMP toolbox upgraded," *Polymer.* 51:2927-2946.
Li et al. (2000) "Dense Arrays of Ordered GaAs Nanostructures by Selective Area Growth on Substrates Patterned by Block Copolymer Lithography," *Appl. Phys. Lett.* 76:1689-1691.
Li et al. (2001) "The Internal Pressure and New Solubility Parameter of Polymeric Liquids," *J. Chem. Eng. Chin. Univ.* 3:206-212.—English Abstract Only.
Lin et al. (1998) "A three-dimensional photonic crystal operating at infrared wavelengths," *Nature.* 394:251-253.
Linguist, et al. (2008) "Plasmonic Nanocavity Arrays for Enhanced Efficiency in Organic Photovoltaic Cells," *Applied Physics Letters.* 93:123308.
Lopes et al. (2001) "Hierarchical Self-Assembly of Metal Nanostructures on Diblock Copolymer Scaffolds," *Nature.* 414:735-738.
Love et al. (2002) "A Practical and Highly Active Ruthenium-Based Catalyst that Effects the Cross Metathesis of Acrylonitrile," *Angew. Chem. Int. Ed.* 41:4035-4037.
Luttge (2009) "Massively Parallel Fabrication of Repetitive Nanostructures: Nanolithography for Nanoarrays," J. Phys. D: Appl. Phys. 42:123001.
Marencic et al. (2010) "Controlling Order in Block Copolymer Thin Films for Nanopatterning Applications," *Annu. Rev. Chem. Bimol. Eng.* 1:277-297.
Maede et al. (2012), "Helical polymer brushes with a preferred-handed helix-sense triggered by a terminal optically active group in the pendant," Chem. Commun, 48, 3342-3344.
Masuda et al. (1999) "Photonic Crystal Using Anodic Porous Alumina," *Jpn. J. Appl. Phys.* 38:L1403-L1405.
Matsen et al. (1997) "Conformationally asymmetric block copolymers," *J. Poly. Sci. Part B: Polym. Phys.* 35:945-952.
Matson et al. (2008) "Synthesis of Fluorine-18 Functionalized Nanoparticles for use as in vivo Molecular Imaging Agents," *J. Am. Chem. Soc.* 130:6731-6733.
Mayer et al. (2001) "Chiral polyisocyanates, a special class of helical polymers," *Prog. Polym. Sci.* 26:1973-2013.
Maxein et al. (1999), "Structure—Property Relations in Cholesteric Networks from Chiral Polyisocyanates," Macromolecules, 32, 5747-5754.
Maxein et al. (1998), "Opalescent Cholesteric Networks from Chiral Polyisocyanates in Polystyrene," Adv. Mater., 10, 341-345.
Mayershofer et al. (2006), Bi- and Trinuclear Ruthenium Alkylidene Triggered Cyclopolymerization of 1,6-Heptadiynes: Access to $A_n$—X—$A_n$ Block and $(A_n)_3$X Tristar Copolymers, Macromolecules, 39, 3484-3493.
Milner et al. (1988), "Theory of the Grafted Polymer Brush," Mecromolecules, 21(8):2610-2619.
Miyake et al. (Published online Aug. 14, 2012) "Synthesis of Isocyanate-Based Brush Block Copolymers and Their Rapid Self Assembly to Infrared Reflecting Photonic Crystals," *J. Am. Chem. Soc.* 134:14249-14254.
Miyake et al. (Published online Sep. 13, 2012) "Precisely Tunable Photonic Crystals From Rapidly Self-Assembling Brush Block Copolymer Blends," *Angew. Chem. Int. Ed.* 51:11246-11248.
Miyake et al. (2010) "Stereospecific Polymerization of Chiral Oxazolidinone-Functionalized Alkenes," Macromolecules, 43, 7504-7514.
Moon et al. (2010) "Chemical Aspects of Three-Dimensional Photonic Crystals," *Chem. Rev.* 110:547-574.
Neiser et al. (2003) "Polymerization of Macromonomers to Cylindrical Brushes Initiated by Organolanthanides," *Macromolecules.* 36:5437-5439.
Neugebauer et al. (2004) "How Dense Are Cylindrical Brushes Grafted from a Multifunctional Macroinitiator?" *Polymer.* 45:8173-8179.
Oono et al. (1988) "⅔—Power Law for Copolymer Lamellar Thickness Implies a ⅓—Power Law for Spinodal Decomposition," *Phys. Rev. Lett.* 61:1109-1111.
Orfanidis (Retrieved May 2012) *Electromagnetic Waves and Antennas.* Online book, http:// http://www.ece.rutgers.edu/~orfanidi/ewa.
Pangborn et al. (1996) "Safe and Convenient Procedure for Solvent Purification," *Organometallics.* 15:1518-1520.
Paquet et al. (2008) "Nanostructured polymers for photonics," *Materials Today.* 2008, 11, 48-56.
Park et al. (1997) "Block Copolymer Lithography: Periodic Arrays of ~$10^{11}$ Holes in 1 Square Centimeter," *Science.* 276:1401-1404.
Park et al. (2003) "Enabling Nanotechnology with Self Assembled Block Copolymer Patterns," *Polymer.* 44:6725-6760.
Park et al. (2009) "Macroscopic 10-Terabit-per-Square-Inch Arrays from Block Copolymers with Lateral Order," *Science.* 323:1030-1033.
Parnell et al. (Feb. 4, 2011) "Continuously Tuneable Optical Filters from Self-Assembled Block Copolymer Blends," *Soft Matter.* 7:3721-3725.
Patten et al. (1991) "'Living' titanium(IV) catalyzed coordination polymerizations of isocyanates," *J. Am. Chem. Soc.* 113:5065-5066.
Patten et al. (1996) "Living Organotitanium(IV)-Catalyzed Polymerizations of Isocyanates," *J. Am. Chem. Soc.* 118:1906-1916.
Patz et al. (2005) "Impact of regional climate change on human health," *Nature.* 438:310-317.
Pelletier et al. (2006) "Aluminum nanowire polarizing grids: Fabrication and analysis," *Appl. Phys. Lett.* 88:211114.
Peng et al. (2011) "Surface Urban Heat Island Across 419 Global Big Cities," *Environ. Sci. Technol.* 2012, 46, 696-703.
Poelma et al. (2012) "Cyclic Block Copolymers for Controlling Feature Sizes in Block Copolymer Lithography," *ACS Nano.* 6:10845-10854.
Rizwan et al. (2008) "A review on the generation, determination and mitigation of Urban Heat Island," *Journal of Environmental Sciences.* 20:120-128.
Runge et al. (2007) "Synthesis of High Molecular Weight Comb Block Copolymers and Their Assembly into Ordered Morphologies in the Solid State," *J. Am. Chem. Soc.* 129:10551-10560.
Runge et al. (2008) "Investigation of the Assembly of Comb Block Copolymers in the Solid State," *Macromolecules.* 41:7687-7694.
Rutenburg (2004) "Synthesis of Polymer Dielectric Layers for Organic Thin Film Transistors via Surface-Initiated Ring-Opening Metathesis Polymerization," *J. Am. Chem. Soc.* 2004, 126,4062-4063.
Rzayev et al. (2009) "Synthesis of Polystyrene-Polylactide Bottlebrush Block Copolymers and Their Melt Self-Assembly into Large Domain Nanostructures," *Macromolecules.* 42:2135.
Schappacher et al. (2005) "From Combs to Comb-g-Comb Centipedes," *Macromolecules.* 38:7209-7213.
Segalman (2005) "Patterning with Block Copolymer Thin Films," *Materials Science and Engineering.* R48:191-226.
Shah et al. (2011), "Chiroptical Properties of Graft Copolymers Containing Chiral Poly(n-hexyl isocyanate) as a Side Chain", Macromolecules, 44, 7917-7925.
Sheiko et al. (2001) "Visualization of Macromolecules—A First Step to Manipulation and Controlled Response," *Chem. Rev.* 101:4099-4123.
Slugovc (2004) "The Ring Opening Metathesis Polymerisation Toolbox," *Macromol. Rapid Commun.* 25:1283-1297.
South et al. (2007), "Modular and Dynamic Functionalization of Polymeric Scaffolds", Accounts of Chemical Research, vol. 40, No. 1, pp. 63-74.

(56) References Cited

OTHER PUBLICATIONS

Stoykovich et al. (2006) "Block Copolymers and Conventional Lithography," *Materials Today.* 9:20.
Sumerlin et al. (2007) "Initiation Efficiency in the Synthesis of Molecular Brushes by Grafting from via Atom Transfer Radical Polymerization," *Macromolecules.* 38:702-708.
Sveinbjörnsson et al. (Jul. 30, 2012) "Rapid Self-Assembly of Brush Block Copolymers to Photonic Crystals," *Proc. Natl. Acad. Sci. USA.* 109(36):14332-14336.
The Proceedings of the Austrian—Slovenian Polymer Meeting 2013, www.aspm.si pp. 1-303.
Thompson et al. (2005) "Solvent Accelerated Polymer Diffusion in Thin Films," *Macromolecules.* 38:4339-4344.
Thurn-Albrecht et al. (2000) "High-Density Nanowire Arrays Grown in Self-Assembled Diblock Copolymer Templates," *Science.* 290:2126-2129.
Troparevsky et al. (2010) "Transfer-matrix formalism for the calculation of optical response in multilayer systems: from coherent to incoherent interference," *Optics Express.* 18:24715-24721.
Tseng et al. (2010) "Block Copolymer Nanostructures for Technology," *Polymers.* 2:470-489.
Urbas et al. (2000) "Tunable Block Copolymer/Homopolymer Photonic Crystals," *Adv. Mater.* 12:812-814.
Urbas et al. (1999) "One-Dimensionally Periodic Dielectric Reflectors from Self-Assembled Block Copolymers—Homopolymer Blends," *Macromolecules.* 32:4748-4750.
Valkama et al. (2004) "Self-Assembled Polymeric Solid Films with Temperature-Induced Large and Reversible Photonic-Bandgap Switching," *Nature Mater.* 3:872-876.
Vayer et al. (2010) "Perpendicular Orientation of Cylindrical Domains Upon Solvent Annealing Thin Films of Polystyrene-B-Polylactide,"*Thin Solid Films.* 518:3710-3715.
Vougioukalakis et al. (2010) "Ruthenium-Based Heterocyclic Carbene-Coordinated Olefin Metathesis Catalysts," *Chem. Rev.* 110:1746-1787.
Vygodskii et al. (2008), "Cyclopolymerization of N,N-Dipropargylamines and N,N-Dipropargyl Ammonium Salts," *Macromolecules* 2008, 41, 1919-1928.
Wanakule et al. (2010) "Thermodynamic Properties of Block Copolymer Electrolytes Containing Imidazolium and Lithium Salts," *Macromolecules.* 43:8282-8289.
Wang et al. (Mar. 14, 2011) "Bioinspired Colloidal Photonic Crystals with Controllable Wettability," *Acc. Chem. Res.* 44:405-415.
Westphalen, et al. (1999), "Metal Cluster Enhanced Organic Solar Cells," *Solar Energy Materials & Solar Cells 61* (2000) 97-105.
Xia et al. (2009) "Efficient synthesis of narrowly dispersed brush copolymers and study of their assemblies: the importance of side chain arrangement," *J. Am. Chem. Soc.* 131:18525-18532.
Xia et al. (2009) "Efficient Synthesis of Narrowly Dispersed Brush Polymers via Living Ring-Opening Metathesis Polymerization of Macromonomers," *Macromolecules.* 42:3761-3766.
Xu et al. (Nov. 24, 2011) "Fabrication of Silicon Oxide Nanodots with an Areal Density Beyond 1 Teradots Inch$^{-2}$," *Adv. Mater.* 22:5755.
Yang et al. (2010), "Supramolecular ABC Triblock Copolymers via One-Pot, Orthogonal Self-Assembly", J. Am. Chem. Soc. 2010, vol. 132, pp. 1637-1645.
Yamaguchi et al. (2001) "A Phase Diagram for the Binary Blends of Nearly Symmetric Diblock Copolymers. 1. Parameter Space of Molecular Weight Ratio and Blend Composition," *Macromolecules.* 34:6495-6505.
Yashima et al. (2009) "Helical Polymers: Synthesis, Structures, and Functions," *Chem. Rev.* 109:6102-6211.
Yoon et al. (2005) "Self-Assembly of Block Copolymers for Photonic-Bandgap Materials," MRS Bull. 2005, 30, 721-726.
Yoon et al. (2006) "Optically Transparent and High Molecular Weight Polyolefin Block Copolymers toward Self-Assembled Photonic Band Gap Materials," *Macromolecules.* 39:1913-1919.
Yoon et al. (2008) "Thermochromic Block Copolymer Photonic Gel," *Macromolecules.* 41:4582-4584.
Zalusky et al. (2002) "Ordered Nanoporous Polymers from Polystyrene-Polylactide Block Copolymers," *J. Am. Chem. Soc.* 124:12761-12773.
Zhang et al. (2005) "Cylindrical Polymer Brushes," *J. Polym. Sci. Part A: Polym. Chem.* 43:3461-3481.
Zhulina "Polymer brushes: Polymers in Soft and Biological Matter" Jul. 30-Aug. 1, 2012, Boulder CO, USA, Institute of Macromolecular Compounds, Russian Academy of Sciences, St. Petersburg, Russia.
Zhulina "Polymer brushes: Simple Views on Polymers at Surfaces and Interfaces: Simposium Honoring P.-G. de Gennes", APS meeting, Mar. 13, 2008, New Orleans USA, Institute of Macromolecular Compounds, Russian Academy of Sciences, St. Petersburg, Russia.

* cited by examiner

RAPID SELF-ASSEMBLY OF BLOCK COPOLYMERS TO PHOTONIC CRYSTALS

CROSS-REFERENCE TO RELATED APPLICATIONS

This application claims the benefit of priority from U.S. Provisional Patent Application No. 61/610,379, filed Mar. 13, 2012, U.S. Provisional Patent Application No. 61/653,311, filed May 30, 2012, and U.S. Provisional Patent Application No. 61/736,421, filed Dec. 12, 2012, each of which is hereby incorporated by reference in its entirety.

STATEMENT REGARDING FEDERALLY SPONSORED RESEARCH OR DEVELOPMENT

This invention was made with government support under DE-FG02-05ER46218 awarded by the Department of Energy, support under GM031332 awarded by the National Institutes of Health, and support under CHE1048404 awarded by the National Science Foundation. The government has certain rights in the invention.

BACKGROUND OF INVENTION

Well-defined, periodic nanostructures have received considerable attention since they can be served as useful templates and scaffolds for nanodots, nanowires, magnetic storage media, semiconductors, optical devices, polarizers, and photonic materials [1]. For this purpose, bottom-up approaches have extensively been studied because they can offer an efficient, cost-effective strategy to overcome the technological and economic limits associated with large-scale top-down approaches [1k]. The self-assembly of block copolymers (BCPs) [1k,2], one of the most promising candidates for this purpose, have widely been studied as the sizes, spacings, and morphologies of the nanostructures from the self-assembled BCPs can be simply tuned by varying molecular weight and composition ratio of BCPs and, more importantly, the versatilities in the properties of the blocks can be easily introduced by many well-known chemical techniques.

For some practical applications like polarizers and photonic band gap materials for visible wavelengths, the alternating domain spacing of the self-assembled BCPs usually has to be up to a few hundred nanometers. Thomas and coworkers utilized the partially cross-linked, conventional BCPs to prepare the photonic band gap materials for visible wavelengths [3], but this normally requires the molecular weight (MW) of BCPs to be extremely large for the applications mentioned above. It is noted that, according to the model system for polymers with the MW over the critical entanglement MW [4], the viscosity of polymers gets higher abruptly as the MW gets larger due to polymer chain-entanglement, which yields a significant kinetic barrier for the effective self-assembly of conventional BCPs with high MW [2c, 3, 5]. For this reason, the defects might not be able to be effectively annihilated even upon longer annealing time due to the entanglement, and there could be degradation of polymer chains upon thermal treatment due to significantly increased annealing temperature and time to overcome the kinetic barrier.

Brush polymers (also called comb or graft polymers) are defined as grafted polymers with both relatively high MW and significantly dense and regularly spaced side brush chains attached to the backbone [6]. Due to the significant steric hindrance between densely grafted side brush chains, brush polymers have a highly extended backbone and exhibit a reduced degree of chain-entanglement compared to conventional polymers. Therefore, it is often favorable for brush polymers to self-assemble into well aligned and ordered nanostructures even though the MW of brush polymers is relatively high. There are three general methods to make brush polymers. In the "grafting from" approach, a macro-initiator backbone is first synthesized but there are limitations in the efficiency of its initiation and conversion of monomers. The "grafting onto" method, where the side chains and the backbone are separately synthesized and then coupled together, have difficulties in obtaining complete grafting due to increasing steric hindrance and the subsequent purification of unreacted brush side chains can be problematic [6d,6e,6g, 7]. In the "grafting through" method, which is also called the "Macromonomer (MM) approach" the side chains are synthesized with a polymerizable end group which is subsequently polymerized. This approach has many advantages over those 'graft from' or 'graft onto' approaches, but still contains drawbacks like not being able to obtain high MW and/or narrow polydispersity index (PDI) [8]. Recently, Grubbs and coworkers successfully reported a novel ring-opening metathesis polymerization (ROMP) exploiting the high ring strain of norbornene monomer and the high activity of Ru-based olefin metathesis catalyst to synthesize brush polymers with ultra-high MW, narrow PDI, and well-defined, structural architectures [6f]. It is noted that, when two different brush side chains, where the difference in polymer interaction parameters is large enough to induce micro-phase segregation, are used to prepare blocky or random type of brush polymers with ultra-high MW, one, two, or three dimensionally periodic nanostructures with extremely large feature sizes can be very easily achieved, due to the significantly reduced degree of entanglements.

While BCPs have been previously used to make periodic dielectric media, the use of brush copolymers has not been extensively studied before now. There have been a couple of observations made in past publications. Bowden et al. reported in 2007 that they observed one of their block copolymers, that was combined of one grafted block and one linear block, reflecting blue light (and transmitting yellow light) and upon swelling with solvent, as is common with linear polymers, they were able to observe a red color. That system was still limited by the high degree of polymerization ($\approx$450:2000) of the graft:linear block required to observe this optical property [6d]. Rzayev reported in 2009 that one of his brush block copolymers appeared to reflect blue light indicating interaction with visible light [6g]. In 2009 we noted that we saw one of our brush block copolymers reflect green light but no further analysis or discussion was made apart from that simple observation [6f].

It will be apparent from the foregoing description that block copolymer materials exhibiting useful physical, chemical and optical properties are useful for a range of applications including photonics, optoelectronics, and molecular templates and scaffolding. Specifically block copolymer materials are needed that are capable of efficient self-assembly to generate useful periodic structures with domain lengths in the nanometer range and exhibiting optical functionality in the visible and NIR regions of the electromagnetic spectrum.

Citations for this Background of the Invention section correspond to the references section provided in Example 2.

SUMMARY OF THE INVENTION

The invention provides a class of copolymers having useful properties, including brush block copolymers, wedge-type block copolymers and hybrid wedge and polymer block copolymers. In an embodiment, for example, copolymers of the invention incorporate chemically different blocks comprising polymer size chain groups and/or wedge groups that significantly inhibit chain entanglement, thereby enhancing molecular self-assembly processes for generating a range of supramolecular structures, such as periodic nanostructures and microstructures. Incorporation of complementary blocks having polymer side chain groups and/or wedge groups with selected compositions (e.g., monomer composition, chain length, extend of branching, etc.) and properties (e.g., molecular weight, etc.) in some of the block copolymers the invention provides a means of imparting steric properties resulting in a highly extended polymer backbone configuration allowing for rapid self-assembly to stacked lamellae of alternating layers of block-copolymer component providing useful photonic materials. The present invention also provides useful methods of making and using copolymers, such as block copolymers.

In an embodiment, for example, the invention provides a block copolymer comprising: (i) at least 10 first repeating units; wherein each of the first repeating units of the copolymer comprises a first polymer backbone group covalently linked to a first wedge group or a first polymer side chain group; and (ii) at least 10 second repeating units; wherein each of the second repeating units of the copolymer block comprises a second polymer backbone group covalently linked to a second wedge group or a second polymer side chain group that is different than the first wedge group or the first polymer side chain group; wherein the first and second repeating units are directly or indirectly covalently linked along a backbone of the copolymer; wherein a size (R) of the copolymer increases substantially linearly with molecular weight (MW) of the copolymer pursuant to the expression (E1): $R \propto MW^x$ (E1); wherein $0.85 < x < 1$.

In an embodiment, for example, the copolymer is a random polymer. In an embodiment, for example, the copolymer is a block copolymer, such as a diblock copolymer, triblock copolymer, or other polyblock copolymer (e.g. 4, 5, etc. blocks). In an embodiment, for example, a copolymer of the invention comprises 10 to 2000 of the first repeating units and 10 to 2000 of the second repeating units, optionally for some embodiments 100 to 2000 of the first repeating units and 100 to 2000 of the second repeating units and optionally for some embodiments 500 to 2000 of the first repeating units and 500 to 2000 of the second repeating units. In an embodiment, for example, a copolymer of the invention has a molecular weight selected from the range of 100,000 Da up to 30,000,000 Da, optionally for some embodiments 500,000 Da up to 30,000,000 Da and optionally for some embodiments 1,000,000 Da up to 30,000,000 Da.

In an embodiment, for example, the invention provides a block copolymer comprising: (i) a first polymer block comprising the at least 10 first repeating units; wherein each of the first repeating units of the first polymer block comprises the first polymer backbone group covalently linked to the first wedge group or the first polymer side chain group; and (ii) a second polymer block comprising the at least 10 second repeating units; the second polymer block directly or indirectly covalently linked to the first polymer block along the backbone of the block copolymer; wherein each of the second repeating units of the second polymer block comprises the second polymer backbone group covalently linked to the second wedge group or the second polymer side chain group that is different than the first wedge group or the first polymer side chain group of the first polymer block; wherein the size (R) of the block copolymer increases substantially linearly with molecular weight (MW) of the block copolymer pursuant to the expression (E1): $R \propto MW^x$ (E1); wherein $0.85 < x < 1$.

In a specific embodiment for the invention, for example, x in expression (E1) is greater than or equal to 0.90, and optionally is greater than or equal to 0.95 and optionally greater than or equal to 0.98. In an embodiment, for example, the size (R) of the block copolymer increases substantially linearly with molecular weight (MW) of the block copolymer pursuant to the expression (E1a): $R = (C_{1a}) MW^x$ (E1a); wherein $0.85 < x < 1$ and wherein $C_{1a}$ is a constant. As used herein, molecular weight is abbreviated as "MW" and size of the block copolymer is abbreviated as "R".

In an embodiment of this aspect, the size (R) of the copolymer, such as a block copolymer, corresponds to the length of the block copolymer, for example a length of the copolymer along the polymer backbone. In an embodiment, for example, the size (R) of the copolymer, such as a block copolymer, corresponds to a domain length of a supramolecular assembly of a plurality of the copolymers. In an embodiment, for example, the size (R) of the copolymer, such as a block copolymer, corresponds to a route mean square radius (RMSR) of a supramolecular assembly of a plurality of the copolymers provided in the solution phase. In an embodiment, for example, molecular self-assembly of a plurality of the copolymers, such as block copolymers, generate a periodic structure characterized by a domain length (DL) that increases substantially linearly with the molecular weight (MW) pursuant to the expression (E2); $DL \propto MW^x$ (E2); wherein $0.85 < x < 1$, and optionally for some applications $0.95 < x < 1$. In an embodiment, for example, the periodic structure is a thin film lamellar structure characterized by the domain length. In an embodiment, for example, the domain length (DL) increases substantially linearly with the molecular weight (MW) pursuant (E2a): $DL = (C_{2a}) MW^x$ (E2a); wherein $0.85 < x < 1$, and optionally for some applications $0.95 < x < 1$, and wherein $C_{2a}$ is a constant. In an embodiment, for example, molecular self-assembly of a plurality of the copolymers, such as block copolymers, results in generation of a supramolecular assembly in the solution phase characterized by a route mean square radius (RMSR) that increases substantially linearly with the molecular weight (MW) pursuant to the expression (E3): $RMSR \propto MW^x$ (E3), wherein $0.85 < x < 1$, and optionally for some applications $0.95 < x < 1$. In some embodiments, for example, the route mean square radius (RMSR) increases substantially linearly with the molecular weight (MW) pursuant (E3a): $DL = (C_{3a}) MW^x$ (E3a); wherein $0.85 < x < 1$, and optionally for some applications $0.95 < x < 1$, and wherein $C_{3a}$ is a constant. As used herein, domain length is abbreviated as "DL" and route mean square radius is abbreviated as "RMSR."

In an embodiment, the first and second blocks of the present copolymers, such as block copolymers, provide steric interactions and/or bulk that enforces the rigidity of the backbone, for example, resulting in an extended polymer backbone. Copolymers of the invention, such as block copolymers, may further comprises additional blocks, such as additional blocks directly or indirectly linked to the first and second blocks, such as one or more additional wedge-group containing blocks, one or more additional polymer side chain-containing blocks and/or one or more additional wedge-group containing blocks and one or more additional polymer side chain-containing blocks, optionally provided along the polymer backbone.

In an embodiment of this aspect, the block copolymer of the invention has the formula (FX1a), (FX1b), (FX1c) or (FX1d):

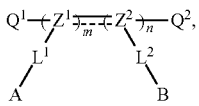
(FX1a)

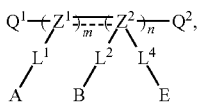
(FX1b)

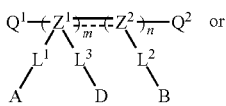
(FX1c)

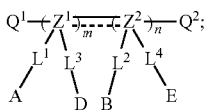
(FX1d)

wherein: $Z^1$ is the first polymer backbone group and $Z^2$ is the second polymer backbone group; $Q^1$ is a first backbone terminating group and $Q^2$ is a second backbone terminating group; $L^1$ is a first linking group, $L^2$ is a second linking group, $L^3$ is a third linking group and $L^4$ is a fourth linking group; A and D are each independently a polymer side chain group or a wedge group, wherein A is the first wedge group or the first polymer side chain group; B and E are each independently a polymer side chain group or a wedge group, wherein B is the second polymer side chain group or the second wedge group; and each of n and m is independently an integer selected from the range of 20 to 2000. In an embodiment, for example, the invention provides a block copolymer having formula (FX1) wherein the ratio of m to n is selected from the range of 0.1 to 1, and optionally for some embodiments 0.5 to 2. In an embodiment, for example, the invention provides a block copolymer having formula (FX1) wherein m is an integer selected from the range of 20 to 2000 and n is an integer selected from the range of 20 to 2000, and optionally for some embodiments wherein m is an integer selected from the range of 100 to 2000, optionally 500 to 2000, and n is an integer selected from the range of 100 to 2000, optionally 500 to 2000.

Copolymers of the invention, such as bock copolymers, may incorporate a broad range of polymer backbone groups, including polymer backbone groups capable of assuming an extended backbone configuration. In an embodiment, for example, the wedge groups and/or polymer side chain groups provide steric bulk and interactions within the copolymer resulting in the polymer backbone being an extended backbone. In an embodiment, for example, the wedge groups and/or polymer side chain groups of the first and second polymer blocks provide steric bulk and interactions within the block copolymer resulting in the polymer backbone being an extended backbone. In an embodiment, the invention provides a block copolymer having formula (FX1), wherein $Z^1$ and $Z^2$ are same polymer backbone group, for example, providing blocks that differ via the composition of the wedge groups and/or polymer side chain groups linked to the polymer backbone group. In an embodiment, the invention provides a block copolymer having formula (FX1), wherein $Z^1$ and $Z^2$ are not the same polymer backbone group, for example, providing first and second polymer blocks that differ via the composition of the wedge groups and/or polymer side chain groups in addition to the first and second polymer blocks having different polymer backbone groups. In an embodiment, the invention provides a block copolymer having formula (FX1), wherein $Z^1$ and $Z^2$ are derived from polymerization of a monomer selected from the group consisting of a substituted or unsubstituted norbornene, olefin, cyclic olefin, norbornene anhydride, cyclooctene, cyclopentadiene, styrene and alcrylate.

The invention includes block copolymers comprising blocks having the same or different sizes, for example, block copolymers wherein first and second polymer blocks are the same length, or alternatively wherein the first polymer block is larger than the second polymer block, or alternatively wherein the second polymer block is larger than the first polymer block. In an embodiment, for example, the invention provides a block copolymer having formula (FX1), wherein m is greater than or equal to 100 and wherein n is greater than or equal to 100.

In an embodiment, the invention provides a block copolymer having the formula (FX2a), (FX2b), (FX2c) or (FX2d):

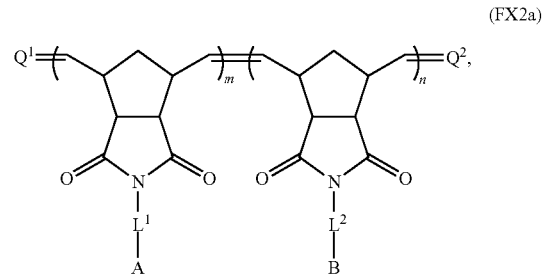
(FX2a)

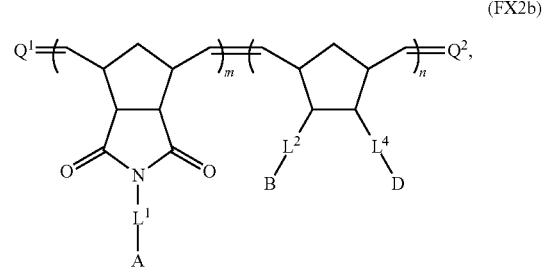
(FX2b)

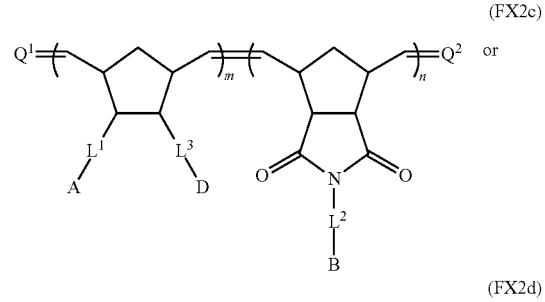
(FX2c)

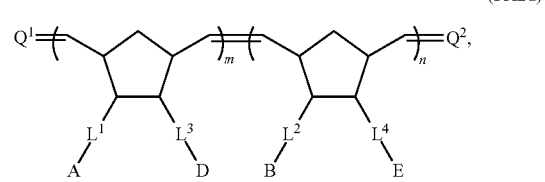
(FX2d)

wherein $Q^1$, $Q^2$, m, n, $L^1$, $L^2$, $L^3$, $L^4$, A, B, C and D are as defined in connection with formula (FX1). In an embodiment, for example, the invention provides a block copolymer having formula (FX2) wherein the ratio of m to n is selected from the range of 0.1 to 10. In an embodiment, for example, the invention provides a block copolymer having formula (FX2) wherein m is an integer selected from the range of 20 to 2000 and n is an integer selected from the range of 20 to 2000.

The composition and physical properties of the wedge groups and polymer side chain groups of copolymers of the invention, such as block copolymers, are important for providing materials exhibiting useful chemical, physical and optical properties. Use of wedge groups and polymer side chain groups having complementary compositions and properties is beneficial. Particularly useful are wedge groups and polymer side chain groups that are sufficiently chemically dissimilar and also capable of imparting steric properties to enforce the polymer backbone to provide for efficient self-assembly to form useful supramolecular structures, including lamellar structures.

In an aspect, the invention provides a class of brush block copolymers wherein first and second polymer blocks comprise different polymer side chain groups. In an embodiment, for example, the invention provides a brush block copolymer wherein the first polymer block comprises the first polymer side chain group, optionally having a molecular weight greater than or equal to 500 Da, optionally for some embodiments greater than or equal to 1000 Da, and optionally for some embodiments greater than or equal to 5000 Da. In an embodiment, for example, the first polymer side chain group has a molecular weight selected from the range of 500 to 30,000 Da, optionally selected from the range of 1000 to 30,000 Da, optionally selected from the range of 5000 to 30,000 Da. In an embodiment, for example, the invention provides a brush block copolymer wherein the second polymer block comprises the second polymer side chain group, optionally having a molecular weight greater than or equal to 500 Da, optionally for some embodiments greater than or equal to 1000 Da, and optionally for some embodiments greater than or equal to 5000 Da. In an embodiment, for example, the second polymer side chain group has a molecular weight selected from the range of 500 to 30,000 Da, optionally selected from the range of 1000 to 30,000 Da, optionally selected from the range of 5000 to 30,000 Da.

In an embodiment, for example, the invention provides a block copolymer having the formula (FX3):

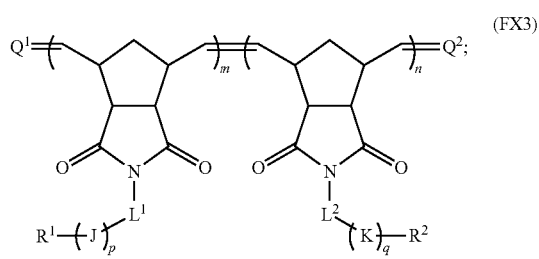

wherein: J is a repeating group of the first polymer side chain group; K is a repeating group of the second polymer side chain group; each of $R^1$ and $R^2$ is independently a polymer side chain terminating group; and each of p and q is independently an integer selected from the range of 35 to 2000, and wherein $Q^1$, $Q^2$, m, n, $L^1$, and $L^2$ are as defined in connection with formula (FX1). In an embodiment, for example, the invention provides a block copolymer having formula (FX3), wherein each of $R^1$ and $R^2$ is independently hydrogen, $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{10}$ alkyl halide, phosphonate, phosphonic acid, silane, siloxane acrylate, or catechol; wherein each of $R^{30}$-$R^{42}$ is independently hydrogen or $C_1$-$C_5$ alkyl. In an embodiment, for example, the invention provides a block copolymer having formula (FX3), wherein the ratio of m to n is selected from the range of 0.1 to 10, optionally selected from the range of 0.5 to 2. In an embodiment, for example, the invention provides a block copolymer having formula (FX3), wherein the ratio of p to q is selected from range of 0.1 to 10, optionally selected from the range of 0.5 to 2.

In an embodiment, for example, the invention provides a block copolymer having the formula (FX4), (FX5), or (FX6):

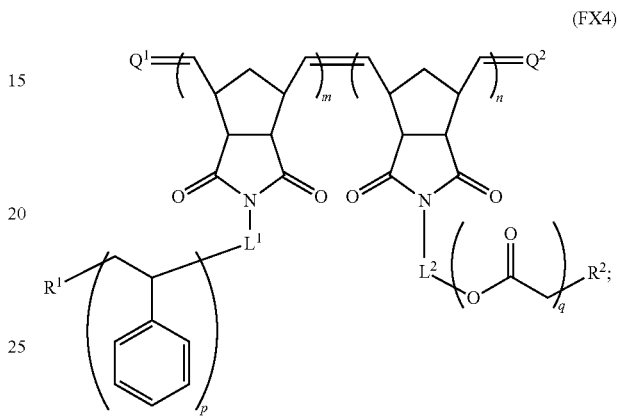

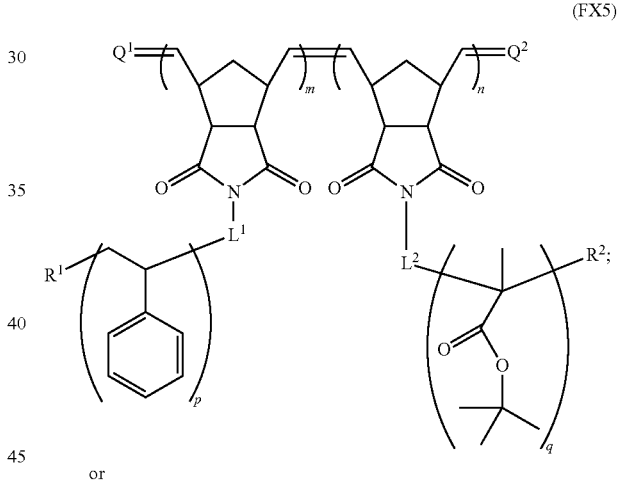

or

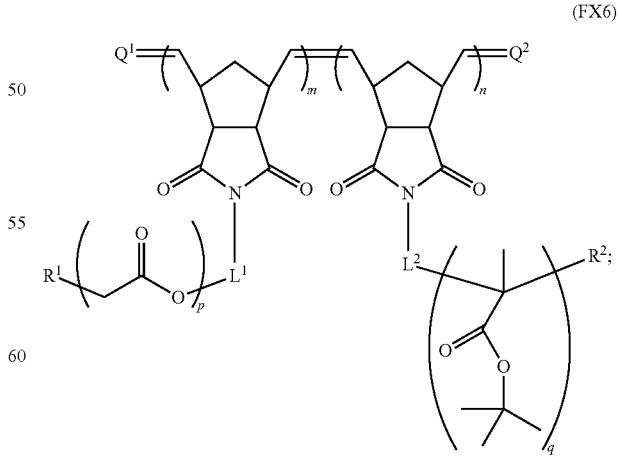

wherein $Q^1$, $Q^2$, m, n, $L^1$, $L^2$, $R^1$, $R^2$, p, and q are as defined in connection with formulas (FX1)-(FX3).

In an aspect, the invention provides a class of hybrid wedge and polymer block copolymers wherein the one of the first and second polymer blocks comprise a wedge group and the other of the first and second polymer blocks comprise a polymer side chain group. In an embodiment, for example, the invention provides a block copolymer wherein the first polymer block comprises the first polymer side chain group, optionally having a molecular weight greater than or equal to 500 Da and the second polymer block comprises the second wedge group, optionally having a molecular weight greater than or equal to 50 Da. In an embodiment, for example, the invention provides a block copolymer wherein the first polymer block comprises the first polymer side chain group, optionally having a molecular weight selected from the range of 500 Da to 30,000 Da and the second polymer block comprises the second wedge group, optionally having a molecular weight selected from the range of 15 Da to 1500 Da. In an embodiment, for example, the second wedge group is characterized by at least two branch points each terminating in an independent terminating branch moiety comprising at least 4 atoms. In an embodiment, for example, the second wedge group is characterized by at least three branching points each terminating in an independent terminating branch moiety comprising at least 10 atoms. In an embodiment, for example, each of the terminating branch moieties of the second wedge group independently has a number of atoms selected from the range of 10 to 100. In an embodiment, for example, the first wedge group and/or the second wedge group independently has a molecular weight greater than or equal to 50 Da, optionally for some embodiments greater than or equal to 100 Da, optionally for some embodiments greater than or equal to 500 Da. In an embodiment, for example, each of the terminating branch moieties of the first wedge group and/or second wedge group independently has a number of atoms selected from the range of 10 to 500, optionally selected from the range of 10 to 200, and optionally selected from the range of 10 to 200.

In an embodiment, for example, the second wedge group independently comprises a $C_2$-$C_{30}$ alkyl, $C_3$-$C_{30}$ cycloalkyl, $C_5$-$C_{30}$ aryl, $C_5$-$C_{30}$ heteroaryl, $C_2$-$C_{30}$ ester, $C_2$-$C_{30}$ ether, $C_2$-$C_{30}$ thioether, $C_2$-$C_{30}$ amine, $C_2$-$C_{30}$ imide, $C_2$-$C_{30}$ halocarbon chain, $C_2$-$C_{30}$ perfluorocarbon or $C_2$-$C_{30}$ polyethylene glycol. In an embodiment, for example, the second wedge group independently comprises an aromatic or alicyclic fused ring structure. In an embodiment, for example, the second wedge group independently comprises a group derived from a substituted or unsubstituted adamantane, silsesquioxane, norbornane, terpenoid, polyethylene glycol, or borneol.

In an embodiment, for example, the second wedge group has the formula (W1), (W2) or (W3):

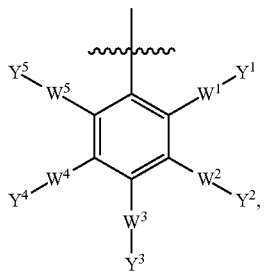

(W1)

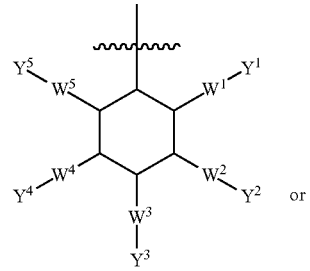

(W2)

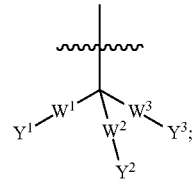

(W3)

wherein each of $W^1$-$W^5$ is independently a linking group; and each of $Y^1$-$Y^5$ is independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, or $C_2$-$C_{30}$ polyethylene glycol; wherein each of $R^{30}$-$R^{42}$ is independently hydrogen, $C_5$-$C_{10}$ aryl or $C_1$-$C_{10}$ alkyl. In an embodiment, for example, any of $W^1$-$W^5$, is independently $C_1$-$C_{10}$ alkylene, $C_3$-$C_{10}$ cycloalkylene, $C_2$-$C_{10}$ alkenylene, $C_3$-$C_{10}$ cycloalkenylene, $C_2$-$C_{10}$ alkynylene, ethenylene, ethynylene, or phenylene. In an embodiment, for example, each of $W^1$-$W^5$ is independently $C_1$-$C_5$ alkylene. In an embodiment, for example, any of $R^{30}$-$R^{42}$, is independently hydrogen or $C_1$-$C_4$ alkyl. Optionally, at least two of $Y^1$-$Y^5$ is independently is a substituted or unsubstituted $C_1$-$C_{30}$ alkyl, $C_3$-$C_{30}$ cycloalkyl, $C_5$-$C_{30}$ aryl or $C_5$-$C_{30}$ heteroaryl. Embodiments wherein any of $W^1$-$W^{10}$ is independently a single bond refers to polymers wherein a group, such as $Y^1$-$Y^{10}$, is directly linked via a single bond to an adjacent moiety, such as an aromatic group (e.g., benzyl) or an alicyclic group (e.g., cyclohexane group).

In an embodiment, for example, the second wedge group has the formula has the formula (W4), (W5), (W6), (W7), (W8), (W9) or (W10):

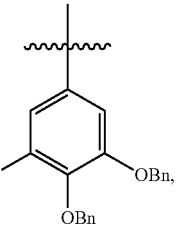

(W4)

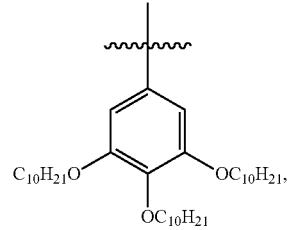

(W5)

-continued (W6) 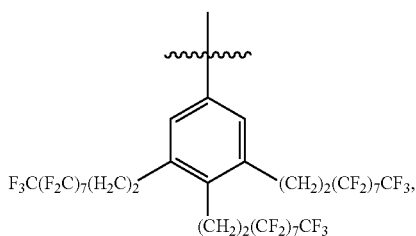

(W7) 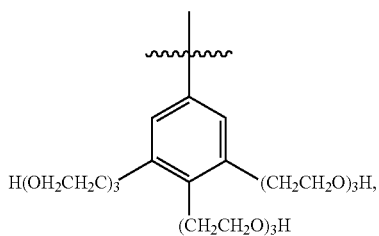

(W8) 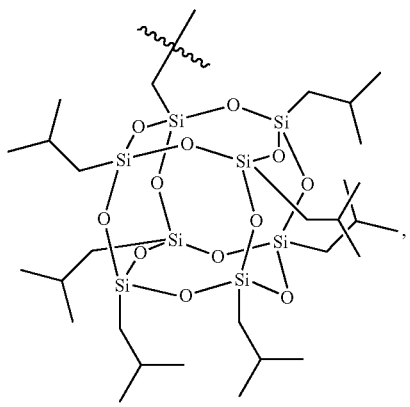

(W9) 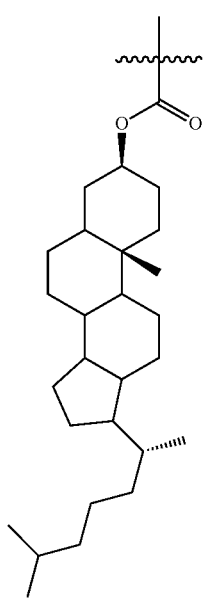

or

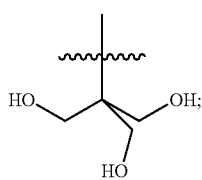

wherein Bn is a benzyl group.

In an embodiment, for example, the invention provides a block copolymer having the formula (FX7):

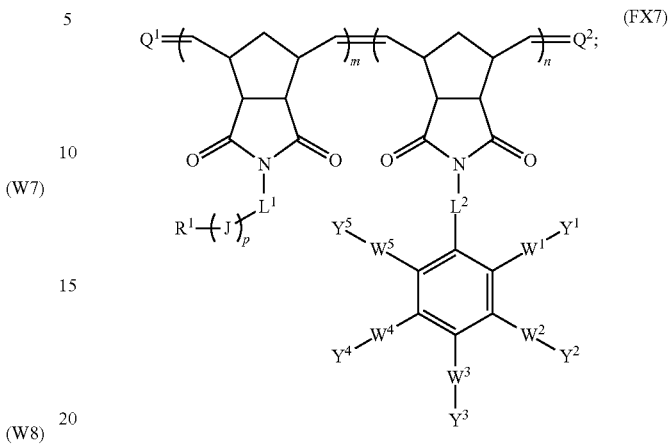

(FX7)

wherein: J is a repeating group of the first polymer side chain group; $R^1$ is a polymer side chain terminating group; p is independently an integer selected from the range of 35 to 2000; each of $W^1$-$W^5$ is independently a linking group; and each of $Y^1$-$Y^5$ is independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^{30}$, —$CONR^{31}R^{32}$, —$COR^{33}$, —$SOR^{34}$, —$OSR^{38}$, —$SO_2R^{38}$, —$OR^{37}$, —$SR^{38}$, —$NR^{39}R^{40}$, —$NR^{41}COR^{42}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, or $C_2$-$C_{30}$ polyethylene glycol; wherein each of $R^{30}$-$R^{42}$ is independently hydrogen, $C_5$-$C_{10}$ aryl or $C_1$-$C_{10}$ alkyl; and wherein $Q^1$, $Q^2$, m, n, $L^1$, and $L^2$ are as defined in connection with formula (FX1). In an embodiment, for example, the invention provides a block copolymer having formula (FX7) wherein the ratio of m to n is selected from the range of 0.1 to 10, optionally selected from the range of 0.5 to 2. In an embodiment, for example, the invention provides a block copolymer having formula (FX7) wherein m is an integer selected from the range of 20 to 2000 and n is an integer selected from the range of 20 to 2000. In an embodiment, for example, p is independently an integer selected from the range of 100 to 2000.

In an embodiment, for example, the invention provides a block copolymer having the formula (FX8), (FX9), (FX10), (FX11), (FX12) or (FX13):

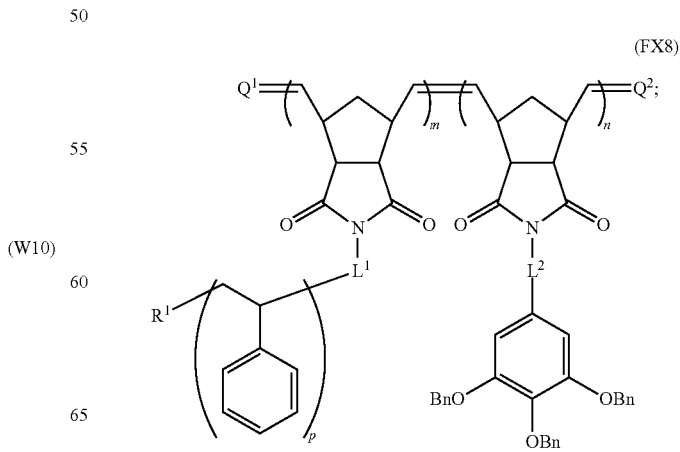

(FX8)

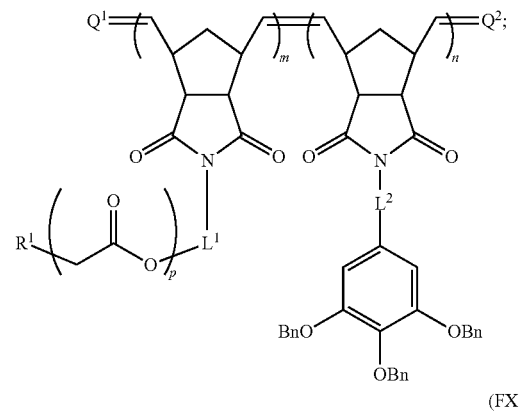
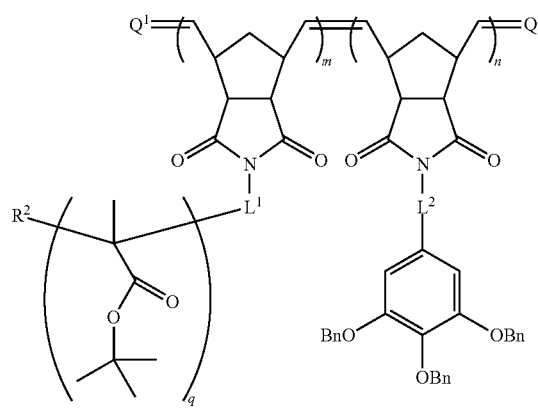
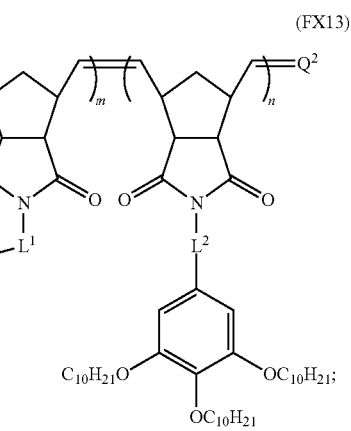
wherein Bn is a benzyl group.
In an embodiment, for example, the invention provides a block copolymer having any one of the formula (FX8), (FX9), (FX10), (FX11), (FX12) or (FX13):

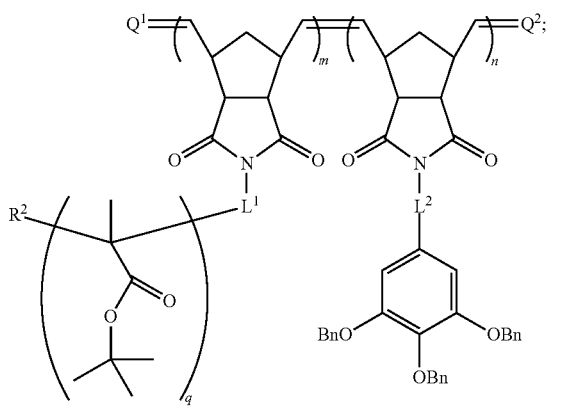

(FX10)

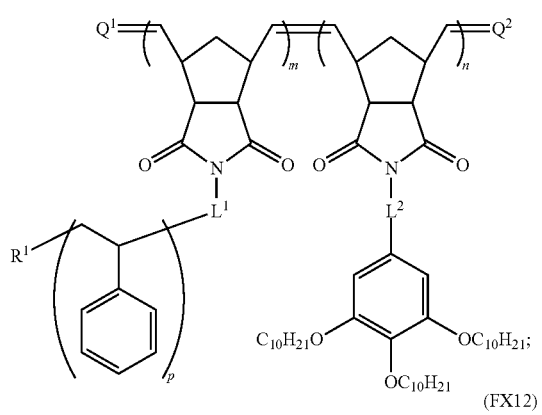

(FX11)

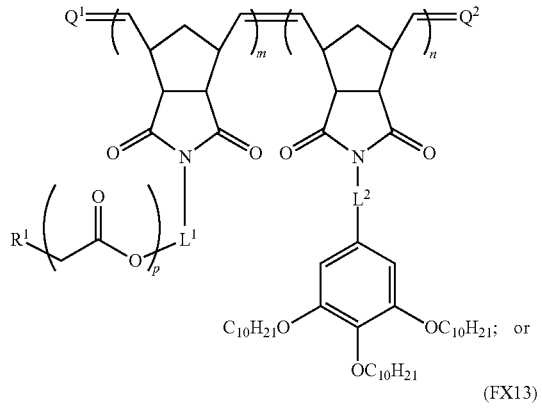

(FX12)

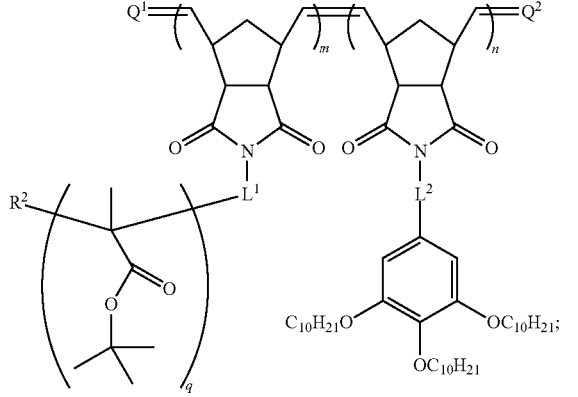

(FX13)

wherein Bn is a benzyl group.

In an aspect, the invention provides a class of wedge-type copolymers. In an embodiment, for example, the invention provides wedge-type block copolymers, wherein the first polymer block comprise a first wedge group and the second polymer blocks comprise a second wedge group different from the first wedge group of the first polymer block. In an embodiment, for example, the invention provides a wedge-type block copolymer wherein the first polymer block comprises the first wedge group, optionally having a molecular weight greater than or equal to 50 Da, and the second polymer block comprises the second wedge group different from the first wedge group, and optionally having a molecular weight greater than or equal to 50 Da. In an embodiment, for example, the invention provides a wedge-type block copolymer wherein the first polymer block comprises the first wedge group, optionally having a molecular weight selected from the range of 15 Da to 150 Da, and the second polymer block comprises the second wedge group different from the first wedge group, and optionally having a molecular weight selected from the range of 15 Da to 150 Da. In an embodiment, for example, the first wedge block group, second wedge block group or both independently has a molecular weight greater than or equal to 50 Da, optionally for some embodiments greater than or equal to 100 Da, optionally for some embodiments greater than or equal to 500 Da. In an embodiment, for example, each of the terminating branch moieties of the first wedge block group, second wedge block group or both independently has a number of atoms selected from the range of 10 to 500, optionally selected from the range of 10 to 200, and optionally selected from the range of 10 to 200. In an embodiment, for example, each of the terminating branch moieties of the second wedge group independently has a number of atoms selected from the range of 10 to 100.

In an embodiment, for example, the invention provides a block copolymer having the formula (FX14):

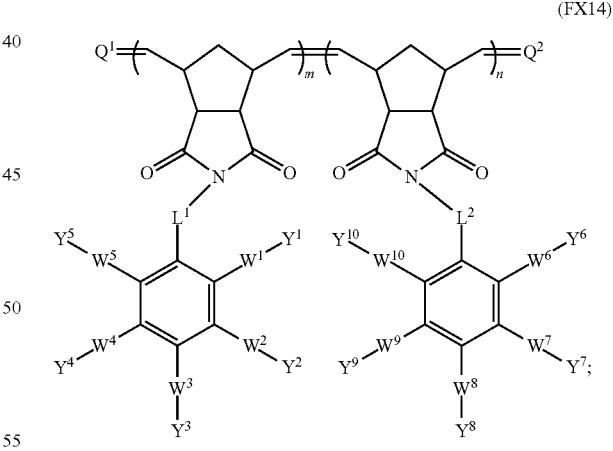

(FX14)

wherein: each of $W^1$-$W^{10}$ is independently a linking group; and each of $Y^1$-$Y^{10}$ independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, —$C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, or $C_2$-$C_{30}$ polyethylene glycol; wherein each of $R^{30}$-$R^{42}$ is independently hydrogen, $C_5$-$C_{10}$ aryl or $C_1$-$C_{10}$ alkyl;

and wherein at least a portion of $Y^1$-$Y^5$ are different than $Y^6$-$Y^{10}$; and wherein $Q^1$, $Q^2$, m, n, $L^1$, and $L^2$ are as defined in connection with formula (FX1). In an embodiment, for example, at least two of $Y^1$-$Y^5$ are different than at least two of $Y^6$-$Y^{10}$, at least three of $Y^1$-$Y^5$ are different than at least three of $Y^6$-$Y^{10}$, and optionally wherein all of $Y^1$-$Y^5$ are different than $Y^6$-$Y^{10}$. In an embodiment, for example, the invention provides a block copolymer having formula (FX7) wherein the ratio of m to n is selected from the range of 0.1 to 10, and optionally selected from the range of 0.2 to 2. In an embodiment, for example, the invention provides a block copolymer having formula (FX7) wherein m is an integer selected from the range of 20 to 2000 and n is an integer selected from the range of 20 to 2000. In an embodiment, for example, any of $W^1$-$W^{10}$, is independently $C_1$-$C_{10}$ alkylene, $C_3$-$C_{10}$ cycloalkylene, $C_2$-$C_{10}$ alkenylene, $C_3$-$C_{10}$ cycloalkenylene, $C_2$-$C_{10}$ alkynylene, ethenylene, ethynylene, or phenylene. In an embodiment, for example, each of $W^1$-$W^{10}$ is independently $C_1$-$C_5$ alkylene.

In an embodiment, for example, the invention provides a block copolymer having the formula (FX15):

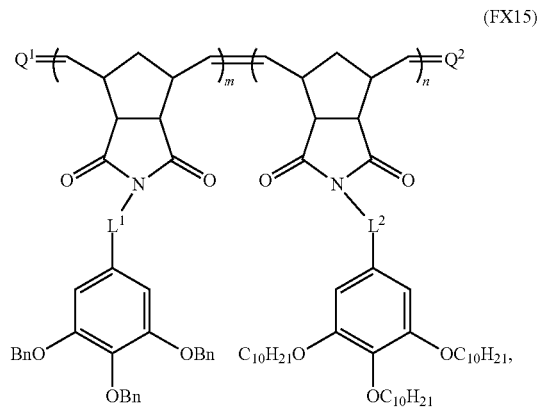

(FX15)

wherein Bn is a benzyl group. In an embodiment, for example, each of $W^1$-$W^{10}$ is independently a single bond, —(CH$_2$)$_q$—, —(CH$_2$)$_q$O(CH$_2$)$_r$—, —(CH$_2$)$_q$S(CH$_2$)$_r$—, —(CH$_2$)$_q$O$_2$(CH$_2$)$_r$—, —(CH$_2$)$_q$SO(CH$_2$)$_r$, —(CH$_2$)$_q$SO$_2$(CH$_2$)$_r$—, —(CH$_2$)$_q$SO$_3$(CH$_2$)$_r$—, —(CH$_2$)$_q$OSO$_2$(CH$_2$)$_r$—, —(CH$_2$)$_q$NR$^{19}$(CH$_2$)$_r$—, —(CH$_2$)$_q$CO(CH$_2$)$_r$—, —(CH$_2$)$_q$COO(CH$_2$)$_r$—, —(CH$_2$)$_q$OCO(CH$_2$)$_r$—, —(CH$_2$)$_q$OCOO(CH$_2$)$_r$—, —(CH$_2$)$_q$CONR$^{20}$(CH$_2$)$_r$—, —(CH$_2$)$_q$NR$^{21}$CO(CH$_2$)$_r$—, —(CH$_2$)$_q$OCONR$^{22}$(CH$_2$)$_r$—, —(CH$_2$)$_q$NR$^{23}$COO(CH$_2$)$_r$—, or —(CH$_2$)$_q$NR$^{24}$CONR$^{25}$(CH$_2$)$_r$—; wherein each of $R^{19}$-$R^{25}$ is independently hydrogen, or $C_1$-$C_5$ alkyl; and wherein each of q and r is independently an integer selected from the range of 0 to 10. Embodiments wherein any of $W^1$-$W^{10}$ is independently a single bond refers to polymers wherein a group, such as $Y^1$-$Y^{10}$, is directly linked via a single bond to an adjacent moiety, such as an aromatic group (e.g., benzyl) or an alicyclic group (e.g., cyclohexane group).

A wide range of linking groups are useful in the copolymers of the invention, such as block copolymers, for example, for linking wedge groups and/or polymer side chain groups to the polymer backbone groups. In some embodiments, for example, direct covalent linking is provided by a single bond between two linked groups, such as wedge groups and/or polymer side chain groups and a polymer backbone groups. In some embodiments, for example, indirect covalent linking is provided by a linking moiety provided between two linked groups, such as wedge groups and/or polymer side chain groups and a polymer backbone groups. In an embodiment, for example, the invention provides a block copolymer of any of formula (FX1)-(FX15), wherein each of each of $L^1$, $L^2$, $L^3$ and $L^4$ is independently a single bond, —(CH$_2$)$_q$—, —(CH$_2$)$_q$(CH$_2$)$_r$—, —(CH$_2$)$_q$S(CH$_2$)$_r$—, —(CH$_2$)$_q$O$_2$(CH$_2$)$_r$—, —(CH$_2$)$_q$SO(CH$_2$)$_r$, —(CH$_2$)$_q$SO$_2$(CH$_2$)$_r$—, —(CH$_2$)$_q$SO$_3$(CH$_2$)$_r$—, —(CH$_2$)$_q$OSO$_2$(CH$_2$)$_r$—, —(CH$_2$)$_q$NR$^{19}$(CH$_2$)$_r$—, —(CH$_2$)$_q$CO(CH$_2$)$_r$—, —(CH$_2$)$_q$COO(CH$_2$)$_r$—, —(CH$_2$)$_q$OCO(CH$_2$)$_r$—, —(CH$_2$)$_q$OCOO(CH$_2$)$_r$—, —(CH$_2$)$_q$CONR$^{20}$(CH$_2$)$_r$—, —(CH$_2$)$_q$NR$^{21}$CO(CH$_2$)$_r$—, —(CH$_2$)$_q$OCONR$^{22}$(CH$_2$)$_r$—, —(CH$_2$)$_q$NR$^{23}$COO(CH$_2$)$_r$—, or —(CH$_2$)$_q$NR$^{24}$CONR$^{25}$(CH$_2$)$_r$—; wherein each of $R^{19}$-$R^{25}$ is independently hydrogen, or $C_1$-$C_5$ alkyl; and wherein each of q and r is independently an integer selected from the range of 0 to 10. In an embodiment, for example, the invention provides a copolymer, such as a block copolymer, of any of formula (FX1a)-(FX8), wherein each of $L^1$, $L^2$, $L^3$ and $L^4$ is independently $C_1$-$C_{10}$ alkylene, $C_3$-$C_{10}$ cycloalkylene, $C_2$-$C_{10}$ alkenylene, $C_3$-$C_{10}$ cycloalkenylene, $C_2$-$C_{10}$ alkynylene, ethenylene, ethynylene, or phenylene. In an embodiment, for example, the invention provides a block copolymer of any of formula (FX1a)-(FX8), wherein each of $L^1$, $L^2$, $L^3$ and $L^4$ is independently $C_1$-$C_5$ alkylene.

A wide range of backbone terminating groups are useful in the block copolymers of the invention. In an embodiment, for example, the invention provides a block copolymer of any of formula (FX1)-(FX15), wherein each of $Q^1$ and $Q^2$ is independently hydrogen, $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, —CO$_2$R$^{30}$, —CONR$^{31}$R$^{32}$, —COR$^{33}$, —SOR$^{34}$, —OSR$^{35}$, —SO$_2$R$^{38}$, —OR$^{37}$, —SR$^{38}$, —NR$^{39}$R$^{40}$, —NR$^{41}$COR$^{42}$, $C_1$-$C_{10}$ alkyl halide, phosphonate, phosphonic acid, silane, siloxane, acrylate, or catechol; wherein each of $R^{30}$-$R^{42}$ is independently hydrogen, $C_1$-$C_{10}$ alkyl or $C_5$-$C_{10}$ aryl. In an embodiment, each of $R^{30}$-$R^{42}$ is independently hydrogen or $C_1$-$C_4$ alkyl.

The invention includes copolymers, such as block copolymers, having more than two polymer blocks, such as block copolymers having three polymer blocks, four polymer blocks or more than four polymer blocks. In some embodiments, the additional polymer blocks comprise wedge groups and/or polymer side chain groups. In some embodiments, the additional polymer blocks comprise the same wedge groups and/or polymer side chain groups as the first and second blocks. Alternatively, the additional polymer blocks comprise the different wedge groups and/or polymer side chain groups as the first and second blocks. Block copolymers having additional polymer blocks are useful for generating a wide range of structures via self-assembly processes.

In an embodiment, for example, the invention provides a block copolymer a third polymer block comprising at least 10 third repeating units; the third polymer block indirectly or directly covalently linked to the first polymer block and the second polymer block along the backbone of the block copolymer; wherein each of the third repeating units of the third polymer block comprises a third polymer backbone group covalently linked to a third polymer side chain group or a third wedge group. In some embodiments, for example, the third polymer block comprises 20 to 2000 third repeating units. In an embodiment, for example, the third polymer block is provided between the first polymer block and the second polymer block; or is provided on a side of the first polymer block opposite to the second polymer block; or is provided on a side of the second polymer block opposite to the first polymer block.

In an embodiment, for example, the invention provides a block copolymer comprising a fourth polymer block comprising at least 10 fourth repeating units; the fourth polymer block directly or indirectly covalently linked to the first polymer block, the second polymer block and the third polymer block along the backbone of the block copolymer; wherein each of the fourth repeating units of the fourth polymer block comprises a fourth polymer backbone group covalently linked to a fourth polymer side chain group or a fourth wedge group. In some embodiments, for example, the fourth polymer block comprises 20 to 2000 fourth repeating units. In some embodiments, for example, the fourth polymer block is provided between the first polymer block and the second polymer block; or is provided between the first polymer block and the third polymer block; or is provided between the second polymer block and the third polymer block; or is provided on a side of the first polymer block opposite to the second polymer block; or is provided on a side of the first polymer block opposite to the third polymer block; or is provided on a side of the second polymer block opposite to the first polymer block; or is provided on a side of the second polymer block opposite to the third polymer block.

In another aspect, the invention provides structures generated from copolymers, for example, structures generated from any of the copolymer compositions and/or composition classes described herein, including the disclosure block copolymers. In an embodiment, a structure of the invention is generated via molecular self-assembly, or a similar process, thereby forming a supramolecular assembly comprising a plurality of copolymers of the invention, such as block copolymers.

In an embodiment, for example, the invention provides a structure comprising a supramolecular assembly of a plurality of copolymers; wherein each of the copolymers independently comprises: (i) at least 10 first repeating units; wherein each of the first repeating units of the copolymer comprises a first polymer backbone group covalently linked to a first wedge group or a first polymer side chain group; and (ii) at least 10 second repeating units; wherein each of the second repeating units of the copolymer block comprises a second polymer backbone group covalently linked to a second wedge group or a second polymer side chain group that is different than (a)-4(ch)-4( )-2(o)-first wedge group or the first polymer side chain group; wherein th4( )-2(o)-first and second repeating units are directly or indirectly covalently linked along a backbone of (a)-4(ch)-4( )-2(o)-copolymer; wherein a size (R) of the copolymer increases substantially linearly with molecular weight (MW) of the copolymer pursuant to the expression (E1) wherein $0.85<x<1$: $R \propto MW^x$ (E1). As will be readily understood by one having skill in the art, the invention includes structures, such as nanostructures and microstructures, comprising any of the copolymers disclosed herein, including the specific compounds and composition classes disclosed herein.

In an embodiment, for example, the invention provides a structure comprising a supramolecular assembly of a plurality of block copolymers; wherein each of the block copolymers independently comprises: (i) a2(o)-first polymer comprising at least 10 first

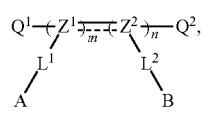
(FX1a)

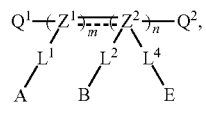
(FX1b)

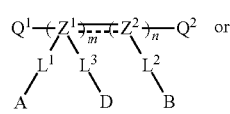
(FX1c)

-continued

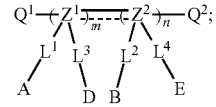
(FX1d)

wherein: $Z^1$ is the first polymer backbone group and $Z^2$ is the second polymer backbone group; $Q^1$ is a first backbone terminating group and $Q^2$ is a second backbone terminating group; $L^1$ is a first linking group, $L^2$ is a second linking group, $L^3$ is a third linking group and $L^4$ is a fourth linking group; A and D are each independently a polymer side chain group or a wedge group, wherein A is the first wedge group or the first polymer side chain group; B and E are each independently a polymer side chain group or a wedge group, wherein B is the second polymer side chain group or the second wedge group; and each of n and m is independently an integer selected from the range of 20 to 2000.

In a specific embodiment for the invention, for example, x in expression (E4) is greater than or equal to 0.90, and optionally is greater than or equal to 0.95. In an embodiment, for example, the size (S) of the structure increases substantially linearly with molecular weight (MW) of the block copolymer pursuant to the expression (E4a): $R=(C_{4a}) MW^x$ (E4a); wherein $0.85<x<1$ and wherein $C_{4a}$ is a constant. As used herein, molecular weight is abbreviated as "MW" and size of the structure is abbreviated as "S".

In an embodiment, for example, the structure of this aspect of the invention is formed via molecular self-assembly of the block copolymers to generate the supramolecular assembly. In an embodiment, for example, the structure is formed via thermal annealing, solvent annealing and/or by the application of an external pressure.

In an embodiment, for example, the size (S) of the structure corresponds to a domain length. In an embodiment, for example, the domain length is greater than or equal to 80 nm, optionally for some embodiments greater than or equal to 160 nm. In an embodiment, for example, the domain length corresponds to a periodic feature of the structure, optionally having a length greater than or equal to 80 nm, optionally for some embodiments greater than or equal to 160 nm. In an embodiment, for example, the structure is characterized by an optical thickness greater than or equal to 100 nm, optionally greater than or equal to 200 nm. As used herein, optical thickness is equal to the product of the geometric thickness and the refractive index (e.g. optical thickness=(geometric thickness)×(refractive index).

In an embodiment, for example, the structure is formed via molecular self-assembly of the block copolymers to generate the supramolecular assembly. In an embodiment, for example, the structure comprises a periodic structure. In an embodiment, for example, the structure comprises a nanostructure or a microstructure. In an embodiment, for example, the structure is characterized by at least one domain having a size greater than 80 nm and optionally greater than 160 nm. In an embodiment, for example, the structure absorbs, scatters or reflects electromagnetic radiation having wavelengths greater than or equal to 400 nm, optionally greater than or equal to 800 nm. In an embodiment, for example, the structure is characterized by an optical thickness greater than or equal to 100 nm, and optionally greater than or equal to 200 nm.

In an embodiment, for example, the structure comprises a one dimensional, two dimensional or three dimensional photonic crystal. In an embodiment, for example, the copolymers that make up the structure are characterized by a polydispersity index selected over the range of 1 to 2, optionally for some embodiments selected over the range of 1 to 1.6. In an embodiment, for example, the structure is a stacked lamellar structure. In an embodiment, for example, the structure is characterized by a periodically varying refractive index. In an embodiment, for example, the structure comprises an additive selected from the group consisting of a ceramic, metal, metal oxide, liquid, silicon, semiconductor and any mixture or combinations of these, for example in a configuration wherein the additive is associated with only one of the blocks of the block copolymer.

In another aspect, the invention provides a method of making a block copolymer. In an embodiment, for example, the invention provides a method of making a copolymer comprising the steps of: providing first polymer monomers each having a first polymer backbone group linked to a first wedge group or a first polymer side chain group; (i) polymerizing the first polymer monomers; (ii) providing second polymer monomers each having a second polymer backbone group linked to a second wedge group or a second polymer side chain group different from the first wedge group or the first polymer side chain group; and (iii) polymerizing the second polymer monomers, to form the copolymer; wherein the compositions and abundances of the first polymer monomers and the second polymer monomers are selected such that a size (R) of the copolymer increases substantially linearly with molecular weight (MW) pursuant to the expression (E1) wherein $0.85 < x < 1$: $R \propto MW^x$ (E1).

In a method of the invention, for example, the copolymer is a block copolymer having the formula (FX1a), (FX1b), (FX1c) or (FX1d):

(FX1a)

(FX1b)

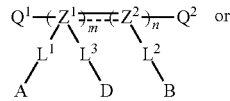
(FX1c)

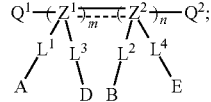
(FX1d)

wherein: $Z^1$ is the first polymer backbone group and $Z^2$ is the second polymer backbone group; $Q^1$ is a first backbone terminating group and $Q^2$ is a second backbone terminating group; $L^1$ is a first linking group, $L^2$ is a second linking group, $L^3$ is a third linking group and $L^4$ is a fourth linking group; A and D are each independently a polymer side chain group or a wedge group, wherein A is the first wedge group or the first polymer side chain group; B and E are each independently a polymer side chain group or a wedge group, wherein B is the second polymer side chain group or the second wedge group; and each of n and m is independently an integer selected from the range of 20 to 2000.

In an embodiment, the method of the invention is used to make a block copolymer having any one of formula (FX1)-(FX15). In an embodiment, for example, the polymerization steps are carried out via ring opening polymerization or controlled radical polymerization. In an embodiment, for example, the polymerization steps are carried out in the presence of a Ru-based olefin metathesis catalyst. In an embodiment, for example, the method of the invention comprises a grafting through synthesis.

In an embodiment, the invention provides copolymers, such as block copolymers, generated by polymerization of one or more substituted or unsubstituted norbornene monomers. In an embodiment, the invention provides copolymers, such as block copolymers, generated by polymerization of one or more monomers selected from the group consisting of:

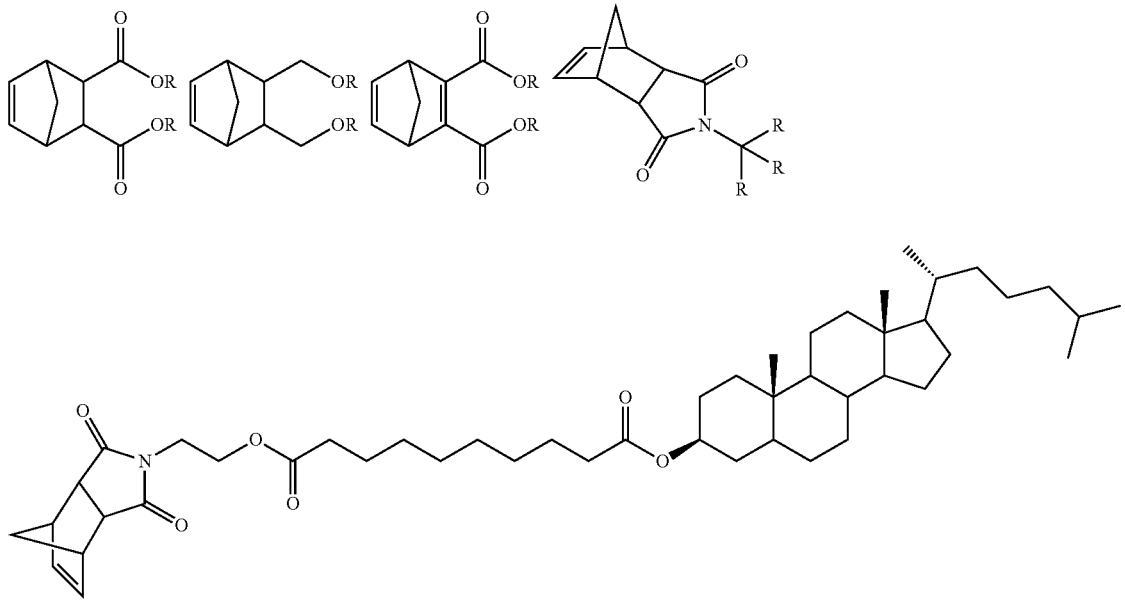

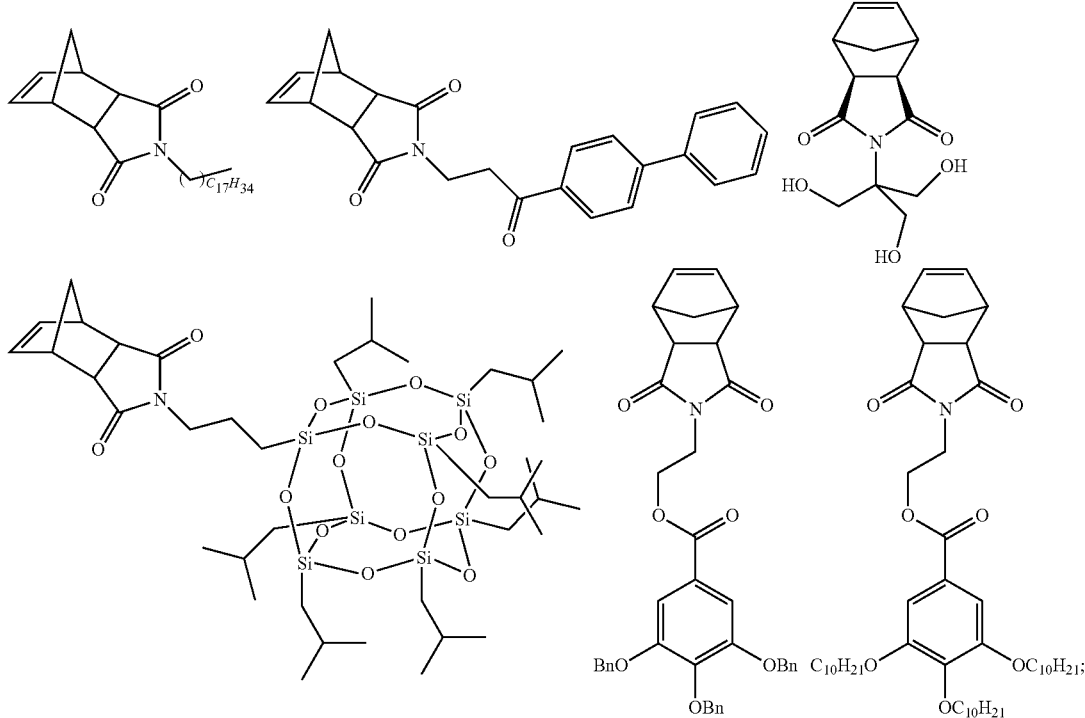

wherein each Bn is independently a substituted or unsubstituted benzyl group and wherein each R is independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, or $C_2$-$C_{30}$ polyethylene glycol; wherein each of $R^{30}$-$R^{42}$ is independently hydrogen, $C_5$-$C_{10}$ aryl or $C_1$-$C_{10}$ alkyl.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 14. A schematic image of the main synthetic approaches to graft polymers, grafting to, grafting from and grafting through.

STATEMENTS REGARDING CHEMICAL COMPOUNDS AND NOMENCLATURE

Figure 1:
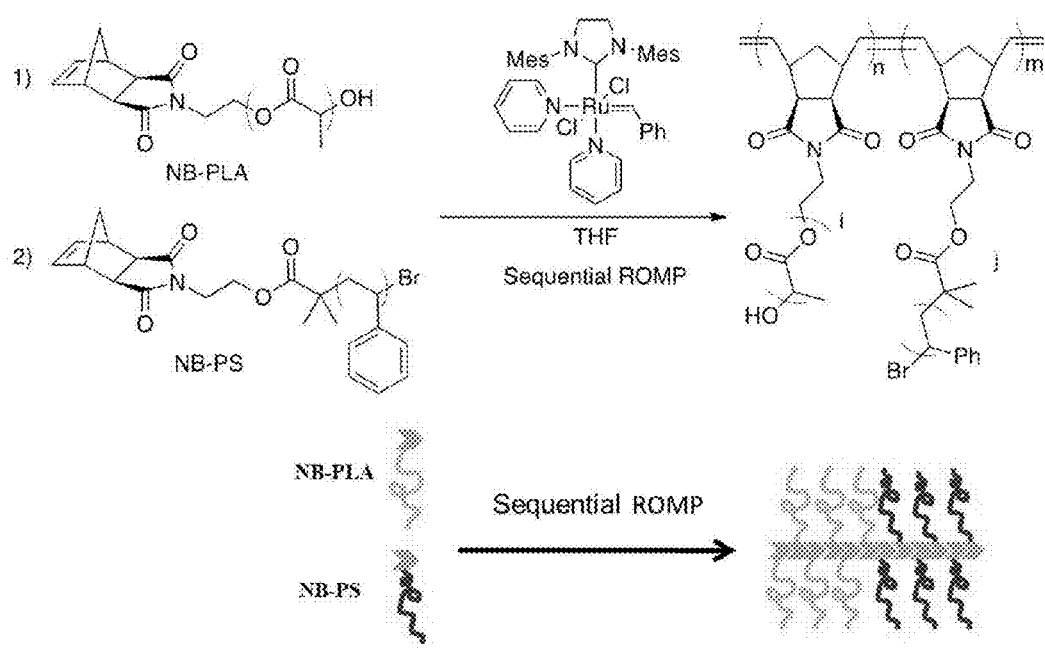
FIG. 1. General synthetic route and schematic diagram of BrBCPs.

In an embodiment, a composition or compound of the invention is isolated or purified. In an embodiment, an isolated or purified compound is at least partially isolated or purified as would be understood in the art. In an embodiment, the composition or compound of the invention has a chemical purity of 95%, optionally for some applications 99%, optionally for some applications 99.9%, optionally for some applications 99.99%, and optionally for some applications 99.999% pure.

As used herein, the term "polymer" refers to a molecule composed of repeating structural units connected by covalent chemical bonds or the polymerization product of one or more monomers, often characterized by a high molecular weight. The term polymer includes homopolymers, or polymers consisting essentially of a single repeating monomer subunit. The term polymer also includes copolymers which are formed when two or more different types of monomers are linked in the same polymer. Copolymers may comprise two or more monomer subunits, and include random, block, alternating, segmented, grafted, tapered and other copolymers. Useful polymers include organic polymers or inorganic polymers that may be in amorphous, semi-amorphous, crystalline or partially crystalline states. Cross linked polymers having linked monomer chains are useful for some applications.

"Block copolymers" are a type of copolymer comprising blocks or spatially segregated domains, wherein different domains comprise different polymerized monomers, for example, including at least two chemically distinguishable blocks. Block copolymers may further comprise one or more other structural domains, such as hydrophobic groups, hydrophilic groups, etc. In a block copolymer, adjacent blocks are constitutionally different, i.e. adjacent blocks comprise constitutional units derived from different species of monomer or from the same species of monomer but with a different composition or sequence distribution of constitutional units. Different blocks (or domains) of a block copolymer may reside on different ends or the interior of a polymer (e.g. [A][B]), or may be provided in a selected sequence ([A][B][A][B]). "Diblock copolymer" refers to block copolymer having two different chemical blocks.

"Polymer backbone group" refers to groups that are covalently linked to make up a backbone of a polymer, such as a block copolymer. Polymer backbone groups may be linked to side chain groups, such as wedge groups and polymer side chain groups.

"Wedge group" refers to a group covalently linked to a polymer backbone group that comprises a branched moiety, optionally imparting steric properties to the polymer. In an embodiment, a wedge group of the present polymer materials and methods is not a polymer group. In an embodiment, for example, a wedge group is characterized by at least two branch points, optionally at least three, each terminating in an independent terminating branch moiety comprising at least 4 atoms, and optionally at least 10 atoms, and optionally at least 20 atoms and optionally at least 50 atoms. A wedge group may be directly or indirectly linked to the polymer backbone group. In some embodiments, wedge groups provide steric bulk and/or interactions that result in an extended polymer backbone and/or a rigid polymer backbone.

"Polymer side chain group" refers to a group covalently linked to a polymer backbone group that comprises a polymer side chain, optionally imparting steric properties to the polymer. In an embodiment, for example, a polymer side chain group is characterized by a plurality of repeating units having the same, or similar, chemical composition. A polymer side chain may terminate in a wide range of polymer side chain terminating group. A polymer side chain group may be directly or indirectly linked to the polymer backbone groups. In some embodiments, polymer side chain groups provide steric bulk and/or interactions that result in an extended polymer backbone and/or a rigid polymer backbone.

As used herein, the term "group" may refer to a functional group of a chemical compound. Groups of the present compounds refer to an atom or a collection of atoms that are a part of the compound. Groups of the present invention may be attached to other atoms of the compound via one or more covalent bonds. Groups may also be characterized with respect to their valence state. The present invention includes groups characterized as monovalent, divalent, trivalent, etc. valence states.

As used herein, the term "substituted" refers to a compound wherein a hydrogen is replaced by another functional group.

As is customary and well known in the art, hydrogen atoms in formulas (FX1)-(FX15) and (W1)-(W10) are not always explicitly shown, for example, hydrogen atoms bonded to the carbon atoms of aromatic, heteroaromatic, and alicyclic rings are not always explicitly shown in formulas (FX1)-(FX15) and (W1)-(W10). The structures provided herein, for example in the context of the description of formulas (FX1)-(FX15) and (W1)-(W10), are intended to convey to one of reasonable skill in the art the chemical composition of compounds of the methods and compositions of the invention, and as will be understood by one of skill in the art, the structures provided do not indicate the specific positions of atoms and bond angles between atoms of these compounds.

As used herein, the terms "alkylene" and "alkylene group" are used synonymously and refer to a divalent group derived from an alkyl group as defined herein. The invention includes compounds having one or more alkylene groups. Alkylene groups in some compounds function as attaching and/or spacer groups. Compounds of the invention may have substituted and/or unsubstituted $C_1$-$C_{20}$ alkylene, $C_1$-$C_{10}$ alkylene and $C_1$-$C_5$ alkylene groups.

As used herein, the terms "cycloalkylene" and "cycloalkylene group" are used synonymously and refer to a divalent group derived from a cycloalkyl group as defined herein. The invention includes compounds having one or more cycloalkylene groups. Cycloalkyl groups in some compounds function as attaching and/or spacer groups. Compounds of the invention may have substituted and/or unsubstituted $C_3$-$C_{20}$ cycloalkylene, $C_3$-$C_{10}$ cycloalkylene and $C_3$-$C_5$ cycloalkylene groups.

As used herein, the terms "arylene" and "arylene group" are used synonymously and refer to a divalent group derived from an aryl group as defined herein. The invention includes compounds having one or more arylene groups. In some embodiments, an arylene is a divalent group derived from an aryl group by removal of hydrogen atoms from two intra-ring carbon atoms of an aromatic ring of the aryl group. Arylene groups in some compounds function as attaching and/or spacer groups. Arylene groups in some compounds function as chromophore, fluorophore, aromatic antenna, dye and/or imaging groups. Compounds of the invention include substituted and/or unsubstituted $C_3$-$C_{30}$ arylene, $C_3$-$C_{20}$ arylene, $C_3$-$C_{10}$ arylene and $C_1$-$C_5$ arylene groups.

As used herein, the terms "heteroarylene" and "heteroarylene group" are used synonymously and refer to a divalent group derived from a heteroaryl group as defined herein. The invention includes compounds having one or more heteroarylene groups. In some embodiments, a heteroarylene is a divalent group derived from a heteroaryl group by removal of hydrogen atoms from two intra-ring carbon atoms or intra-ring nitrogen atoms of a heteroaromatic or aromatic ring of the heteroaryl group. Heteroarylene groups in some compounds function as attaching and/or spacer groups. Heteroarylene groups in some compounds function as chromophore, aromatic antenna, fluorophore, dye and/or imaging groups. Compounds of the invention include substituted and/or unsubstituted $C_3$-$C_{30}$ heteroarylene, $C_3$-$C_{20}$ heteroarylene, $C_1$-$C_{10}$ heteroarylene and $C_3$-$C_5$ heteroarylene groups.

As used herein, the terms "alkenylene" and "alkenylene group" are used synonymously and refer to a divalent group derived from an alkenyl group as defined herein. The invention includes compounds having one or more alkenylene groups. Alkenylene groups in some compounds function as attaching and/or spacer groups. Compounds of the invention include substituted and/or unsubstituted $C_2$-$C_{20}$ alkenylene, $C_2$-$C_{10}$ alkenylene and $C_2$-$C_5$ alkenylene groups.

As used herein, the terms "cylcoalkenylene" and "cylcoalkenylene group" are used synonymously and refer to a divalent group derived from a cylcoalkenyl group as defined herein. The invention includes compounds having one or more cylcoalkenylene groups. Cycloalkenylene groups in some compounds function as attaching and/or spacer groups. Compounds of the invention include substituted and/or unsubstituted $C_3$-$C_{20}$ cylcoalkenylene, $C_3$-$C_{10}$ cylcoalkenylene and $C_3$-$C_5$ cylcoalkenylene groups.

As used herein, the terms "alkynylene" and "alkynylene group" are used synonymously and refer to a divalent group derived from an alkynyl group as defined herein. The invention includes compounds having one or more alkynylene groups. Alkynylene groups in some compounds function as attaching and/or spacer groups. Compounds of the invention include substituted and/or unsubstituted $C_2$-$C_{20}$ alkynylene, $C_2$-$C_{10}$ alkynylene and $C_2$-$C_5$ alkynylene groups.

As used herein, the term "halo" refers to a halogen group such as a fluoro (—F), chloro (—Cl), bromo (—Br), iodo (—I) or astato (—At).

The term "heterocyclic" refers to ring structures containing at least one other kind of atom, in addition to carbon, in the ring. Examples of such heteroatoms include nitrogen, oxygen and sulfur. Heterocyclic rings include heterocyclic alicyclic rings and heterocyclic aromatic rings. Examples of heterocyclic rings include, but are not limited to, pyrrolidinyl, piperidyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, triazolyl and tetrazolyl groups. Atoms of heterocyclic rings can be bonded to a wide range of other atoms and functional groups, for example, provided as substituents.

The term "carbocyclic" refers to ring structures containing only carbon atoms in the ring. Carbon atoms of carbocyclic rings can be bonded to a wide range of other atoms and functional groups, for example, provided as substituents.

The term "alicyclic ring" refers to a ring, or plurality of fused rings, that is not an aromatic ring. Alicyclic rings include both carbocyclic and heterocyclic rings.

The term "aromatic ring" refers to a ring, or a plurality of fused rings, that includes at least one aromatic ring group. The term aromatic ring includes aromatic rings comprising carbon, hydrogen and heteroatoms. Aromatic ring includes carbocyclic and heterocyclic aromatic rings. Aromatic rings are components of aryl groups.

The term "fused ring" or "fused ring structure" refers to a plurality of alicyclic and/or aromatic rings provided in a fused ring configuration, such as fused rings that share at least two intra ring carbon atoms and/or heteroatoms.

As used herein, the term "alkoxyalkyl" refers to a substituent of the formula alkyl-O-alkyl.

As used herein, the term "polyhydroxyalkyl" refers to a substituent having from 2 to 12 carbon atoms and from 2 to 5 hydroxyl groups, such as the 2,3-dihydroxypropyl, 2,3,4-tri hydroxybutyl or 2,3,4,5-tetrahydroxypentyl residue.

As used herein, the term "polyalkoxyalkyl" refers to a substituent of the formula alkyl-(alkoxy)$_n$-alkoxy wherein n is an integer from 1 to 10, preferably 1 to 4, and more preferably for some embodiments 1 to 3.

Amino acids include glycine, alanine, valine, leucine, isoleucine, methionine, proline, phenylalanine, tryptophan, asparagine, glutamine, glycine, serine, threonine, serine, rhreonine, asparagine, glutamine, tyrosine, cysteine, lysine, arginine, histidine, aspartic acid and glutamic acid. As used herein, reference to "a side chain residue of a natural α-amino acid" specifically includes the side chains of the above-referenced amino acids.

Alkyl groups include straight-chain, branched and cyclic alkyl groups. Alkyl groups include those having from 1 to 30 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-30 carbon atoms. The term cycloalkyl specifically refers to an alkyl group having a ring structure such as ring structure comprising 3-30 carbon atoms, optionally 3-20 carbon atoms and optionally 2-10 carbon atoms, including an alkyl group having one or more rings. Cycloalkyl groups include those having a 3-, 4-, 5-, 6-, 7-, 8-, 9- or 10-member carbon ring(s) and particularly those having a 3-, 4-, 5-, 6-, or 7-member ring(s). The carbon rings in cycloalkyl groups can also carry alkyl groups. Cycloalkyl groups can include bicyclic and tricycloalkyl groups. Alkyl groups are optionally substituted. Substituted alkyl groups include among others those which are substituted with aryl groups, which in turn can be optionally substituted. Specific alkyl groups include methyl, ethyl, n-propyl, iso-propyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Substituted alkyl groups include fully halogenated or semihalogenated alkyl groups, such as alkyl groups having one or more hydrogens replaced with one or more fluorine atoms, chlorine atoms, bromine atoms and/or iodine atoms. Substituted alkyl groups include fully fluorinated or semifluorinated alkyl groups, such as alkyl groups having one or more hydrogens replaced with one or more fluorine atoms. An alkoxy group is an alkyl group that has been modified by linkage to oxygen and can be represented by the formula R—O and can also be referred to as an alkyl ether group. Examples of alkoxy groups include, but are not limited to, methoxy, ethoxy, propoxy, butoxy and heptoxy. Alkoxy groups include substituted alkoxy groups wherein the alkyl portion of the groups is substituted as provided herein in connection with the description of alkyl groups. As used herein MeO— refers to $CH_3O$—.

Alkenyl groups include straight-chain, branched and cyclic alkenyl groups. Alkenyl groups include those having 1, 2 or more double bonds and those in which two or more of the double bonds are conjugated double bonds. Alkenyl groups include those having from 2 to 20 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having 10-20 carbon atoms. Cycloalkenyl groups include those in which a double bond is in the ring or in an alkenyl group attached to a ring. The term cycloalkenyl specifically refers to an alkenyl group having a ring structure, including an alkenyl group having a 3-, 4-, 5-, 6-, 7-, 8-, 9- or 10-member carbon ring(s) and particularly those having a 3-, 4-, 5-, 6- or 7-member ring(s). The carbon rings in cycloalkenylgroups can also carry alkyl groups. Cycloalkenylgroups can include bicyclic and tricyclic alkenyl groups. Alkenyl groups are optionally substituted. Substituted alkenyl groups include among others those which are substituted with alkyl or aryl groups, which groups in turn can be optionally substituted. Specific alkenyl groups include ethenyl, prop-1-enyl, prop-2-enyl, cycloprop-1-enyl, but-1-enyl, but-2-enyl, cyclobut-1-enyl, cyclobut-2-enyl, pent-1-enyl, pent-2-enyl, branched pentenyl, cyclopent-1-enyl, hex-1-enyl, branched hexenyl, cyclohexenyl, all of which are optionally substituted. Substituted alkenyl groups include fully halogenated or semihalogenated alkenyl groups, such as alkenyl groups having one or more hydrogens replaced with one or more fluorine atoms, chlorine atoms, bromine atoms and/or iodine atoms. Substituted alkenyl groups include fully fluorinated or semifluorinated alkenyl groups, such as alkenyl groups having one or more hydrogen atoms replaced with one or more fluorine atoms.

Aryl groups include groups having one or more 5-, 6- or 7-member aromatic rings, including heterocyclic aromatic rings. The term heteroaryl specifically refers to aryl groups having at least one 5-, 6- or 7-member heterocyclic aromatic rings. Aryl groups can contain one or more fused aromatic rings, including one or more fused heteroaromatic rings, and/or a combination of one or more aromatic rings and one or more nonaromatic rings that may be fused or linked via covalent bonds. Heterocyclic aromatic rings can include one or more N, O, or S atoms in the ring. Heterocyclic aromatic rings can include those with one, two or three N atoms, those with one or two O atoms, and those with one or two S atoms, or combinations of one or two or three N, O or S atoms. Aryl groups are optionally substituted. Substituted aryl groups include among others those which are substituted with alkyl or alkenyl groups, which groups in turn can be optionally substituted. Specific aryl groups include phenyl, biphenyl groups, pyrrolidinyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms. Aryl groups include, but are not limited to, aromatic group-containing or heterocylic aromatic group-containing groups corresponding to any one of the following: benzene, naphthalene, naphthoquinone, diphenylmethane, fluorene, anthracene, anthraquinone, phenanthrene, tetracene, tetracenedione, pyridine, quinoline, isoquinoline, indoles, isoindole, pyrrole, imidazole, oxazole, thiazole, pyrazole, pyrazine, pyrimidine, purine, benzimidazole, furans, benzofuran, dibenzofuran, carbazole, acridine, acridone, phenanthridine, thiophene, benzothiophene, dibenzothiophene, xanthene, xanthone, flavone, coumarin, azulene or anthracycline. As used herein, a group corresponding to the groups listed above expressly includes an aromatic or heterocyclic aromatic group, including monovalent, divalent and polyvalent groups, of the aromatic and heterocyclic aromatic groups listed herein are provided in a covalently bonded configuration in the compounds of the invention at any suitable point of attachment. In embodiments, aryl groups contain between 5 and 30 carbon atoms. In embodiments, aryl groups contain one aromatic or heteroaromatic six-membered ring and one or more additional five- or six-membered aromatic or heteroaromatic ring. In embodiments, aryl groups contain between five and eighteen carbon atoms in the rings. Aryl groups optionally have one or more aromatic rings or heterocyclic aromatic rings having one or more electron donating groups, electron withdrawing groups and/or targeting ligands provided as substituents.

Arylalkyl groups are alkyl groups substituted with one or more aryl groups wherein the alkyl groups optionally carry additional substituents and the aryl groups are optionally substituted. Specific alkylaryl groups are phenyl-substituted alkyl groups, e.g., phenylmethyl groups. Alkylaryl groups are alternatively described as aryl groups substituted with one or more alkyl groups wherein the alkyl groups optionally carry additional substituents and the aryl groups are optionally substituted. Specific alkylaryl groups are alkyl-substituted phenyl groups such as methylphenyl. Substituted arylalkyl groups include fully halogenated or semihalogenated arylalkyl groups, such as arylalkyl groups having one or more alkyl and/or aryl groups having one or more hydrogens replaced with one or more fluorine atoms, chlorine atoms, bromine atoms and/or iodine atoms.

As to any of the groups described herein which contain one or more substituents, it is understood that such groups do not contain any substitution or substitution patterns which are sterically impractical and/or synthetically non-feasible. In addition, the compounds of this invention include all stereochemical isomers arising from the substitution of these compounds. Optional substitution of alkyl groups includes substitution with one or more alkenyl groups, aryl groups or both, wherein the alkenyl groups or aryl groups are optionally substituted. Optional substitution of alkenyl groups includes substitution with one or more alkyl groups, aryl groups, or both, wherein the alkyl groups or aryl groups are optionally substituted. Optional substitution of aryl groups includes substitution of the aryl ring with one or more alkyl groups, alkenyl groups, or both, wherein the alkyl groups or alkenyl groups are optionally substituted.

Optional substituents for any alkyl, alkenyl and aryl group includes substitution with one or more of the following substituents, among others:

halogen, including fluorine, chlorine, bromine or iodine;
pseudohalides, including —CN;
—COOR where R is a hydrogen or an alkyl group or an aryl group and more specifically where R is a methyl, ethyl, propyl, butyl, or phenyl group all of which groups are optionally substituted;
—COR where R is a hydrogen or an alkyl group or an aryl group and more specifically where R is a methyl, ethyl, propyl, butyl, or phenyl group all of which groups are optionally substituted;
—CON(R)$_2$ where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;
—OCON(R)$_2$ where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;
—N(R)$_2$ where each R, independently of each other R, is a hydrogen, or an alkyl group, or an acyl group or an aryl group and more specifically where R is a methyl, ethyl, propyl, butyl, phenyl or acetyl group, all of which are optionally substituted; and where R and R can form a ring which can contain one or more double bonds and can contain one or more additional carbon atoms;
—SR, where R is hydrogen or an alkyl group or an aryl group and more specifically where R is hydrogen, methyl, ethyl, propyl, butyl, or a phenyl group, which are optionally substituted;
—SO$_2$R, or —SOR where R is an alkyl group or an aryl group and more specifically where R is a methyl, ethyl, propyl, butyl, or phenyl group, all of which are optionally substituted;
—OCOOR where R is an alkyl group or an aryl group;
—SO$_2$N(R)$_2$ where each R, independently of each other R, is a hydrogen, or an alkyl group, or an aryl group all of which are optionally substituted and wherein R and R can form a ring which can contain one or more double bonds and can contain one or more additional carbon atoms;
—OR where R is hydrogen, an alkyl group, an aryl group, or an acyl group all of which are optionally substituted. In a particular example R can be an acyl yielding —OCOR" where R" is a hydrogen or an alkyl group or an aryl group and more specifically where R" is methyl, ethyl, propyl, butyl, or phenyl groups all of which groups are optionally substituted.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di-, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups; and methoxyphenyl groups, particularly 4-methoxyphenyl groups.

As to any of the above groups which contain one or more substituents, it is understood that such groups do not contain any substitution or substitution patterns which are sterically impractical and/or synthetically non-feasible. In addition, the compounds of this invention include all stereochemical isomers arising from the substitution of these compounds.

DETAILED DESCRIPTION OF THE INVENTION

In general, the terms and phrases used herein have their art-recognized meaning, which can be found by reference to standard texts, journal references and contexts known to those skilled in the art.

The invention is further detailed in the following Examples, which are offered by way of illustration and are not intended to limit the scope of the invention in any manner.

Example 1

Self-Assembly of Symmetric Brush Diblock Copolymers

Abstract

Self-assembled structures of brush block copolymer (BrBCPs) with polylactide (PLA) and polystyrene (PS) side chains are described. The polynorbornene-backbone-based BrBCPs containing approximately equal volume fractions of each block self-assembled into highly ordered lamellae with domain spacing ranging from 20 nm to 240 nm by varying molecular weight of the backbone in the bulk state, as revealed by small angle x-ray (SAXS). The domain size increased approximately linearly with backbone length, which indicated an extended conformation of the backbone in the ordered state. In situ SAXS measurements suggested that the BrBCPs self-assemble with an extremely fast manner which could be attributed to a reduced number of entanglements between chains. The strong segregation theory and Monte Carlo simulation also confirmed this near-linear dependence of the domain spacing on backbone length, rationalizing experimental results.

Block copolymers (BCPs) have attracted tremendous interest from both academia and industry because of their ability to self-assemble into periodic structures with domain spacing ranging from 10 to 100 nm.[1,2] The incompatibility effects arising from the particular chemical structure of block copolymers give them a number of specific morphologies such as spherical, cylindrical, lamellar, or gyroid, which leads to numerous technological applications.[3,4] For a noncrystalline A-B diblock copolymer, the bulk morphology is determined by Flory-Huggins parameter, $\chi$, the total degree of polymerization, N, and volume fraction of each block, f. As the value of $\chi N$ varies, three different regimes are distinguished: the weak (WSL), intermediate (ISR) and the strong (SSL) segregation limits. Notably, if $\chi N \gg 10$, the diblock copolymer is not only in SSL, where A and B blocks are strongly segregated, but it is also strongly stretched to create sharp microdomain interfaces. The characteristic domain spacing is determined by the scaling relation of $D \sim N^{2/3} \chi^{1/6}$ in this region.[2,5]

Dedicated efforts have been made to tune the microphase separation distance by varying those $\chi$ and N. Besides, macromolecular architecture is also a powerful tool for tuning BCP domain spacing. For example, Poelma et al. recently found that thin film self-assembly of cyclic polystyrene-block-polyethylene oxide (cPS-b-PEO) showed significant decrease in domain spacing over the corresponding linear polymers due to the reduced hydrodynamic radii of the cyclic systems.[23] Although small microstructure sizes are of particular interest,[6,7] especially to semiconductor industries, such as for storage media fabrication and lithographic applications.[24,25] It remains a challenge to obtain BCPs that self-assemble into morphologies with domain sizes exceeding 100 nm. Materials with large domain sizes have exciting applications as optical materials, e.g. polarizers and photonic band gap materials for visible and infrared light.[8,9,22] It is noted that, according to the model system for polymers with molecular weight (MW) over the critical entanglement MW, the viscosity of polymers increases abruptly as the MW gets larger due to severe chain entanglements, resulting in significant reduction of polymer mobility. Consequently, there could be a serious degradation of polymer chains due to significantly increased annealing temperatures and time for molecular arrangement, and the defects might not be effectively annihilated due to the severe entanglements.[1,2,5,10]

Brush block copolymers (BrBCPs) where two or more different types of side chains are attached to a linear polymer in a block-wise manner, may open up an alternative approach to obtain domain spacing with a broader range of length scales. In that case, each side chain may be designed long enough to drive microphase separation and thus behave like a block segment in a conventional block copolymer. Moreover, brush polymers have been considered to have the highly extended backbone conformation and exhibit the reduced degree of entanglements between brush polymers compared with conventional polymers, due to the significant steric hindrances between densely grafted side brush chains. Runge et al. found that high MW BrBCPs can self-assemble into exceptionally large structures with domain spacing exceeding 100 nm in the bulk state.[11] More recently, Xia et al. reported highly ordered lamellae structures with bulk domain spacing as large as 116 nm from the self-assembly of high MW, narrowly dispersed BrBCPs.[12] In their report, they concluded that the domain size was dictated by the backbone length, but did not provide quantitative molecular weight dependence of backbone and side chain on the domain spacing, which is one of the essential guideline for the tuning of microstructure formed by BrBCPs.

TABLE 1

Sample codes and characteristics of BrBCPs.

| Group | Sample Codes | Mn* (kDa) | PDI | Total Degree of Polymerization* |
|---|---|---|---|---|
| I | [g-S$_{2.4k}$]$_{19}$-b-[g-LA$_{2.4k}$]$_{25}$ | 105 | 1.01 | 44 |
|  | [g-S$_{2.4k}$]$_{35}$-b-[g-LA$_{2.4k}$]$_{43}$ | 186 | 1.01 | 78 |
|  | [g-S$_{2.4k}$]$_{51}$-b-[g-LA$_{2.4k}$]$_{67}$ | 281 | 1.03 | 118 |
|  | [g-S$_{2.4k}$]$_{98}$-b-[g-LA$_{2.4k}$]$_{124}$ | 529 | 1.08 | 222 |
|  | [g-S$_{2.4k}$]$_{189}$-b-[g-LA$_{2.4k}$]$_{233}$ | 1007 | 1.24 | 422 |
|  | [g-S$_{2.4k}$]$_{259}$-b-[g-LA$_{2.4k}$]$_{381}$ | 1525 | 1.61 | 640 |
| II | [g-S$_{4.3k}$]$_{11}$-b-[g-LA$_{4.5k}$]$_{14}$ | 104 | 1.01 | 25 |
|  | [g-S$_{4.3k}$]$_{19}$-b-[g-LA$_{4.5k}$]$_{25}$ | 192 | 1.01 | 44 |
|  | [g-S$_{4.3k}$]$_{32}$-b-[g-LA$_{4.5k}$]$_{42}$ | 320 | 1.02 | 74 |
|  | [g-S$_{4.3k}$]$_{42}$-b-[g-LA$_{4.5k}$]$_{58}$ | 432 | 1.03 | 100 |
|  | [g-S$_{4.3k}$]$_{93}$-b-[g-LA$_{4.5k}$]$_{128}$ | 954 | 1.04 | 221 |
|  | [g-S$_{4.3k}$]$_{206}$-b-[g-LA$_{4.5k}$]$_{278}$ | 2089 | 1.13 | 484 |

*Determined by THF GPC using RI and MALLS detectors.

Figure 11:
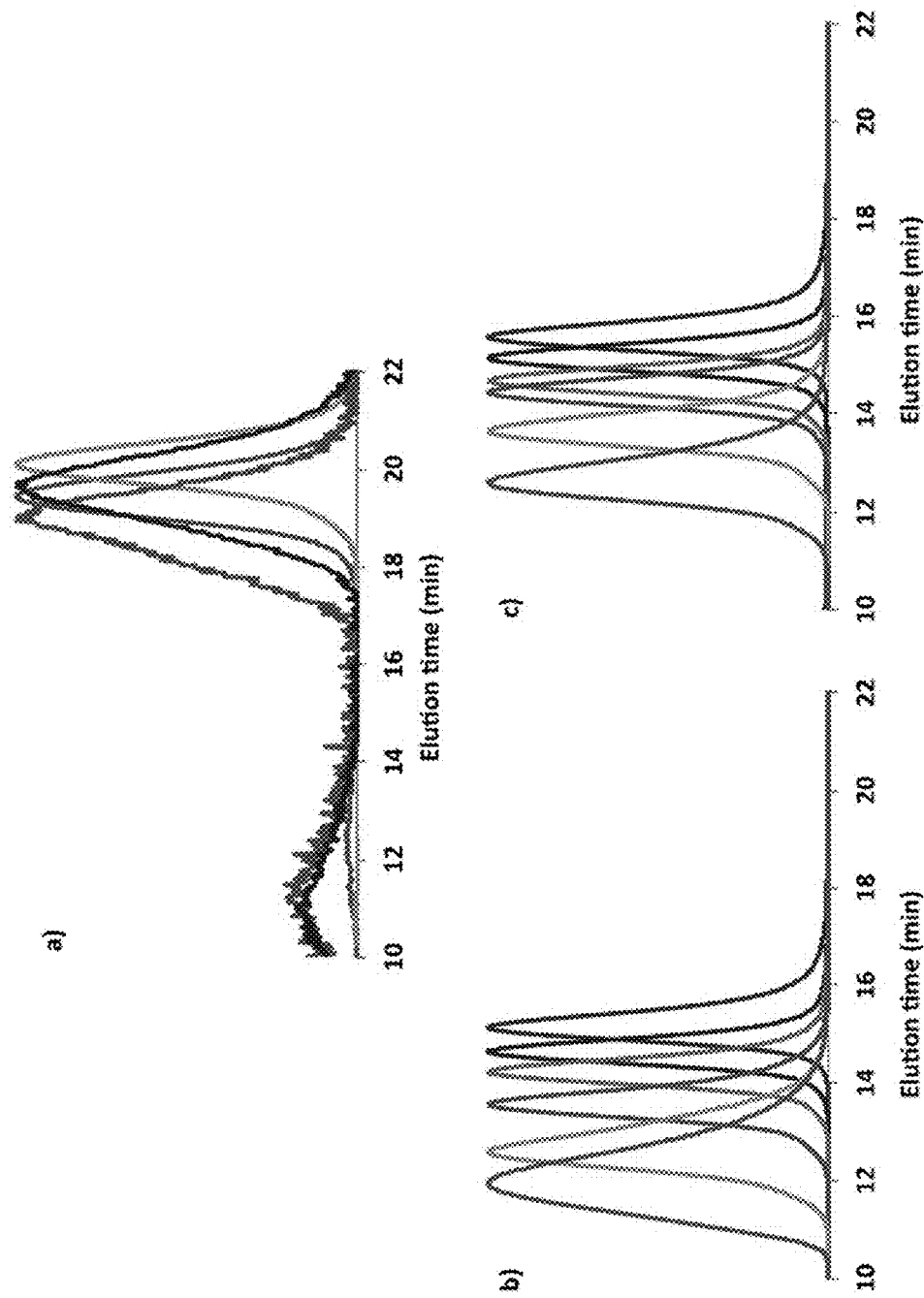
FIG. 11. GPC RI traces of the polymers synthesized. All traces were obtained from polymers purified by precipitation into methanol. a) The macromonomers made, red: $L_{4.5k}$; green: $S_{4.3k}$; blue: $L_{2.4k}$; orange: $S_{2.4k}$. b) Group I brush block copolymers of increasing DP from right to left (as shown in Table 1). c) Group II brush block copolymers of increasing DP from right to left (as shown in Table 1).

Here, we use a series of well-defined BrBCPs to study their self-assembly behavior in the bulk state. The general synthetic route and schematic diagram of those BrBCPs are shown in FIG. 1. More specifically, ω-norbornenyl macromonomers containing polystyrene (PS) and polylactide (PLA) were polymerized sequentially according to the reported procedure.[12,22] GPC data is provided in FIG. 11 which provides GPC RI traces of the polymers synthesized. All traces were obtained from polymers purified by precipitation into methanol. a) The macromonomers made, red: L$_{4.5k}$; green: S$_{4.3k}$; blue: L$_{2.4k}$; orange: S$_{2.4k}$. b) Group I brush block copolymers of increasing DP from right to left (as shown in Table 1). c) Group II brush block copolymers of increasing DP from right to left (as shown in Table 1). The brush side chain molecular weight and degree of polymerization of each block were intentionally controlled to be symmetric. Table 1 summarizes two sets of samples ([g-S$_x$]$_p$-b-[g-LA$_y$]$_q$) used and the sample codes and characteristics of BrBCPs are clearly described there. Note that the subscripts x and y represent the molecular weight of side chains of each type and subscripts p and q represent the number of the side chains. Small-angle x-ray scattering (SAXS) experiments were used to determine the bulk morphology and the kinetic self-assembly process was also studied by performing an in situ SAXS experiment. The strong segregation theory and Monte Carlo simulation are in good agreement with those experimental results. Both experiments and computational results show that domain spacing increases approximately linearly with the degree of polymerization of the backbone, suggesting an extended conformation of the backbone.

RESULTS AND DISCUSSION

Self-Assembly of BRBCPs in Bulk.

Figure 3:
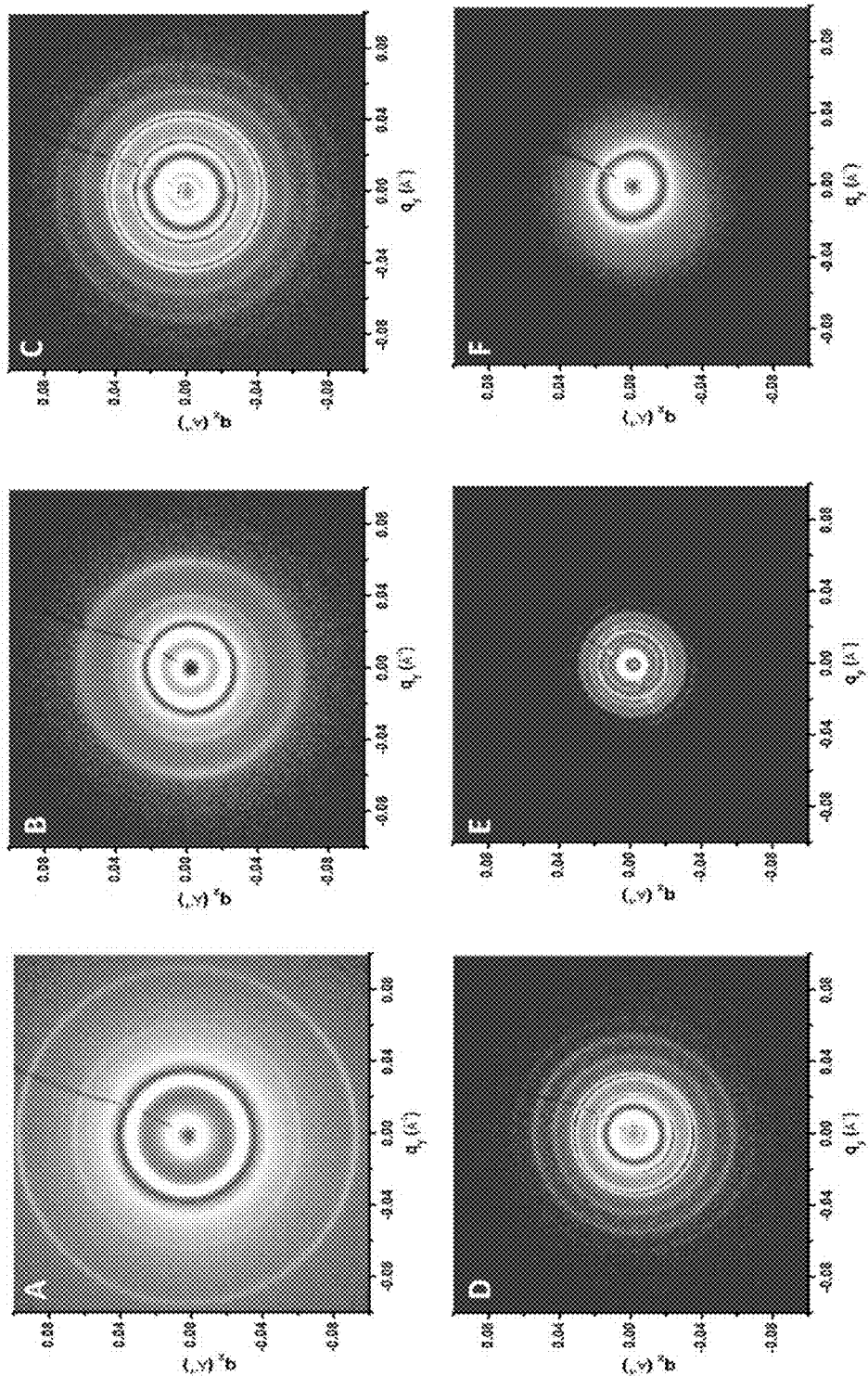
FIG. 3. Representative 2D SAXS patterns for (A): [g-$S_{4.3k}$]$_{11}$-b-[g-$LA_{4.5k}$]$_{14}$; (B) [g-$S_{4.3k}$]$_{19}$-b-[g-$LA_{4.5k}$]$_{25}$; (C) [g-$S_{4.3k}$]$_{32}$-b-[g-$LA_{4.5k}$]$_{42}$; (D) [g-$S_{4.3k}$]$_{42}$-b-[g-$LA_{4.5k}$]$_{58}$; (E) [g-$S_{4.3k}$]$_{93}$-b-[g-$LA_{4.5k}$]$_{128}$; and (F) [g-$S_{4.3k}$]$_{206}$-b-[g-$LA_{4.5k}$]$_{278}$.
Figure 4:
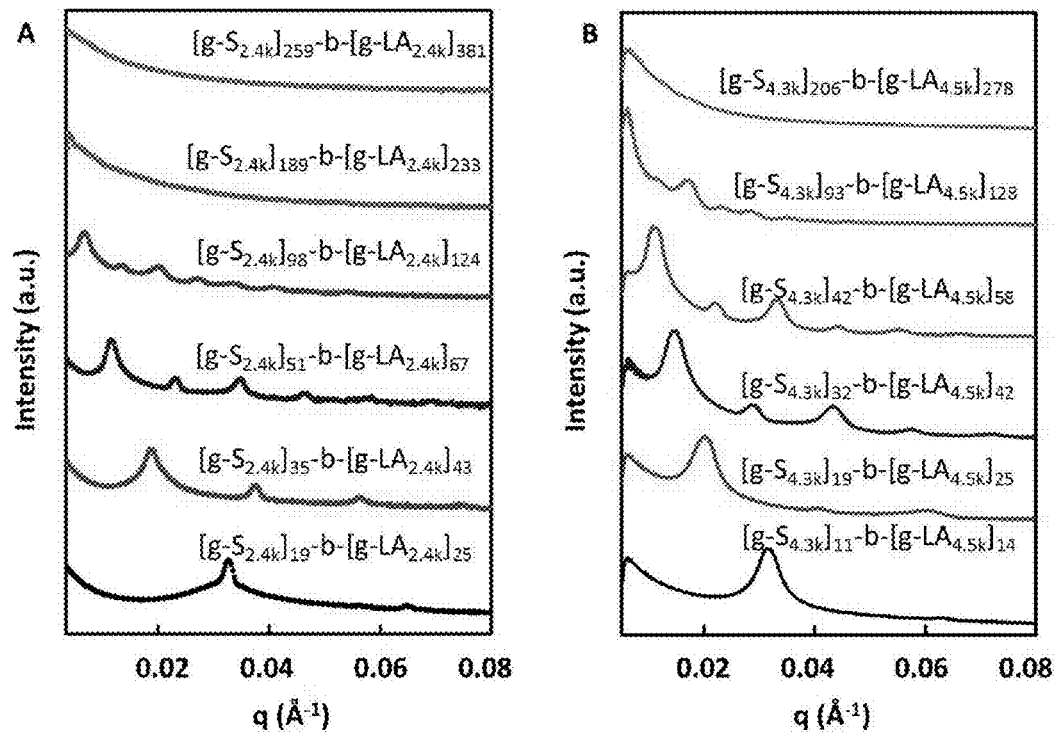
FIG. 4. 1-D SAXS Profiles calculated from the 2-D SAXS patterns in FIG. 1 and FIG. 2, respectively. (A) Group I; (B) Group II. Profile curves were offset for clarity.

Bulk samples were prepared in aluminum washers which were sandwiched by Kapton films and kept in a vacuum oven for 12 hours or longer to achieve thermal equilibrium before SAXS measurements were taken (details see Experimental SAXS section). Circular patterns were observed in the 2D SAXS results from bulk samples of Group I and Group II (see, FIG. 2 and FIG. 3). Samples with low MW in each series showed distinguishable multiple ring patterns (see, FIG. 2A-2D and FIG. 3A-3E), indicating that well-ordered microphase structures were formed isotropically in the bulk state. Meanwhile, the domain spacing of high MW samples (see, FIG. 2E, 2F and FIG. 3F) may have been too large and beyond the limit of SAXS or microdomains were not as well ordered. Profiles of the scattering intensity vs. scattering vector were also generated from FIG. 2 and FIG. 3 and are shown in FIGS. 4A and 4B, respectively. A systematic decrease in q*, the scattering vector of the first order reflection, was observed from low MW BrBCP to high MW BrBCP, indicating the anticipated increase of the domain spacing, ranging from 19.2 nm to 235 nm (see, Table 2). Strong reflections were also seen at integral multiples of q* in most cases, indicating the lamellar nature of the microdomains with long-range lateral ordering, as expected due to the near symmetric volume fractions of the PS and PLA segments.

TABLE 2

Bulk domain spacing of BrBCPs.

| Group | Sample Codes | Degree of Polymerization | L$_o$$^a$ |
|---|---|---|---|
| I | [g-S$_{2.4k}$]$_{19}$-b-[g-LA$_{2.4k}$]$_{25}$ | 44 | 19.2 |
|  | [g-S$_{2.4k}$]$_{35}$-b-[g-LA$_{2.4k}$]$_{43}$ | 78 | 33.6 |
|  | [g-S$_{2.4k}$]$_{51}$-b-[g-LA$_{2.4k}$]$_{67}$ | 118 | 54.6 |
|  | [g-S$_{2.4k}$]$_{98}$-b-[g-LA$_{2.4k}$]$_{124}$ | 222 | 91.0 |
|  | [g-S$_{2.4k}$]$_{189}$-b-[g-LA$_{2.4k}$]$_{233}$ | 422 | 157 |
|  | [g-S$_{2.4k}$]$_{259}$-b-[g-LA$_{2.4k}$]$_{381}$ | 640 | —$^b$ |
| II | [g-S$_{4.3k}$]$_{11}$-b-[g-LA$_{4.5k}$]$_{14}$ | 25 | 19.8 |
|  | [g-S$_{4.3k}$]$_{19}$-b-[g-LA$_{4.5k}$]$_{25}$ | 44 | 31.2 |
|  | [g-S$_{4.3k}$]$_{32}$-b-[g-LA$_{4.5k}$]$_{42}$ | 74 | 43.9 |
|  | [g-S$_{4.3k}$]$_{42}$-b-[g-LA$_{4.5k}$]$_{58}$ | 100 | 58.7 |
|  | [g-S$_{4.3k}$]$_{93}$-b-[g-LA$_{4.5k}$]$_{128}$ | 221 | 102.9 |
|  | [g-S$_{4.3k}$]$_{206}$-b-[g-LA$_{4.5k}$]$_{278}$ | 484 | 235$^c$ |

$^a$The domain spacing L$_o$ is calculated from the corresponding first order peak position of the 1-D SAXS profiles (L$_o$ = 2π/q*) unless noted;
$^b$peaks are absent during the given experimental condition;
$^c$the first peak value is derived from the higher order peaks.

Figure 5:
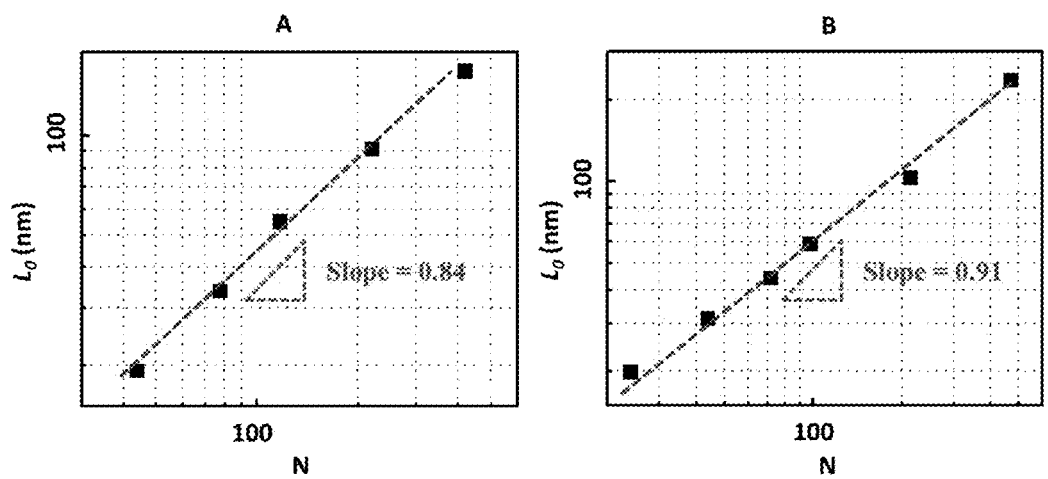
FIG. 5. Scaling law between $L_o$ and DP. (A) Group I; (B) Group II.

To analyze the relationship between the measured domain spacing, L$_o$, and DP of the backbone further, L$_o$ is plotted against DP in log-log plot (FIG. 5). The exponents ν in the scaling form L$_o$~N$^ν$ for both cases were determined from the slope: ν=0.84 for Group I and ν=0.91 for Group II, respectively. Both values are greater than the power law index determined in the SSL region, which is ⅔, and they were also even greater than the greatest value previously reported, to the best of our knowledge, for a polystyrene-block-polylactide (PS-b-PLA) based BCP system (0.81).[13,14] This suggests that the backbones of BrBCPs are highly stretched as the PS and PLA side chains are segregated from each other since the stretching of the backbone decreases PS/PLA interfacial area per unit volume. Since Group II BrBCPs have longer brush side chains compared with Group I, steric hindrance may make the backbone more rigid and, thus, cause the ν value to be even larger.

In order to analyze this scaling relation that must be strongly related to the molecular packing of BrBCPs into a lamellar phase, we also simulated a model system of a molten BrBCP by the Metropolis Monte Carlo method with the 8-site bond fluctuation model.[15,16] The detailed description of simulation method and parameters are given in Experimental Simulation section.

Figure 6:
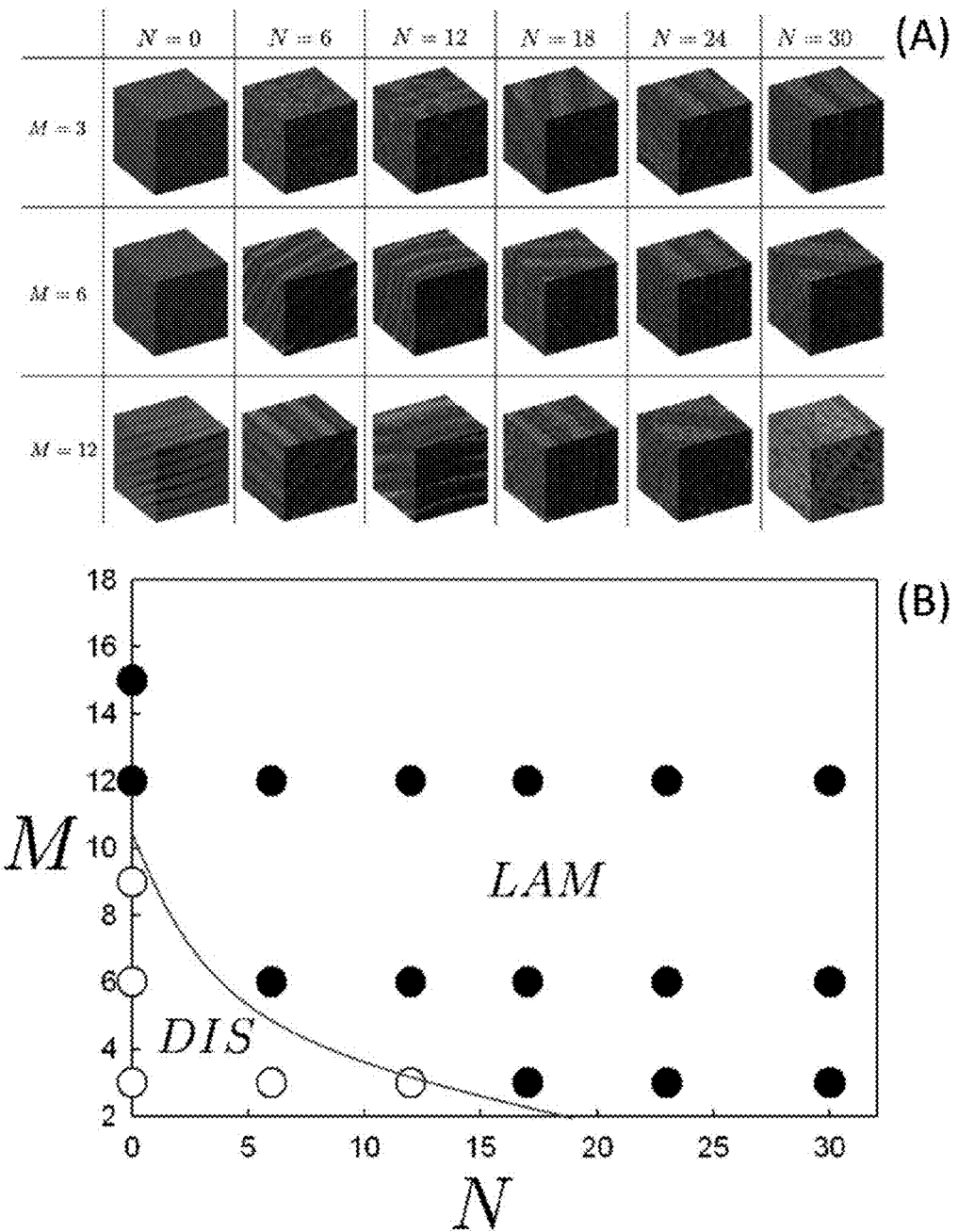
FIG. 6. (A) The simulated morphologies of BrBCPs with various set of variables (N, M). The regions of high density of A-brush, B-brush, and backbone are colored blue, red, and black, respectively. (B) The phase map of molten BrBCP in the (N, M) space constructed from the simulation results. The filled circles represent the ordered lamellar phase (LAM) whereas the open circles denote the disordered state (DIS). The red line represents a guide to eye for the phase transition line from DIS to LAM.

The morphologies of BrBCPs were simulated with various combinations of parameters (N, M) where the backbone length N and the length of side chain M vary from N=6 to N=30 and from M=3 to M=12, respectively (FIG. 6A). For comparison, the case of N=0, which corresponds to symmetric diblock copolymer with chain length 2M, was also simulated. The morphologies show that the system undergoes transition from disordered to lamellar phase by increasing either N or M, as summarized in the phase map shown in FIG. 6B. A large reduction of translational entropy of A and B side chains attached to the backbone leads to the promotion of the phase separation when compared to the AB diblock case (N=0).

Figure 7:
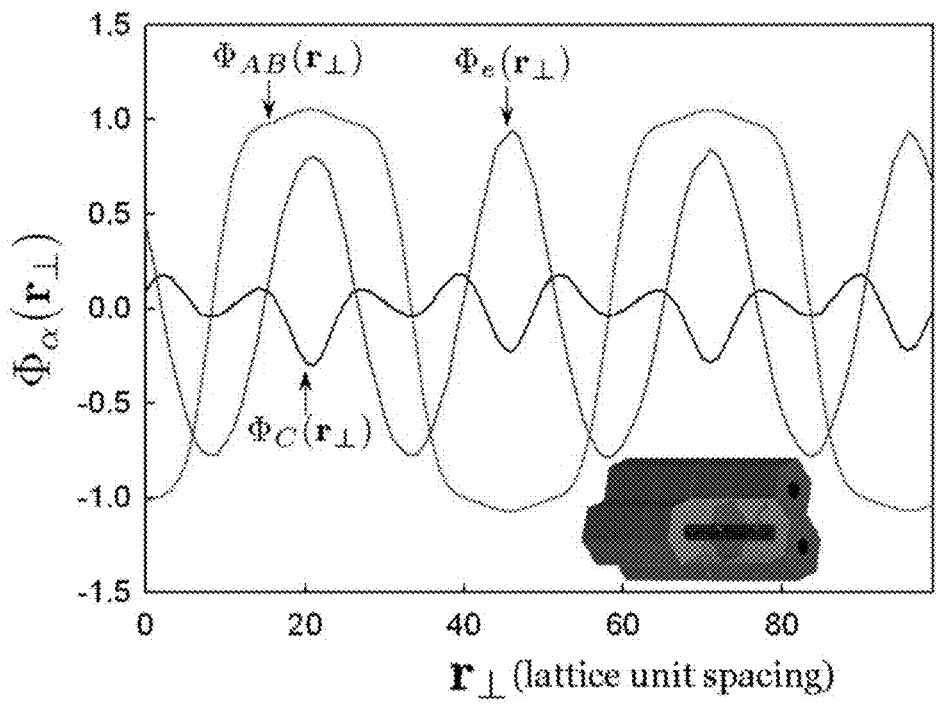
FIG. 7. The local density difference between A- and B-brush ($\Phi_{AB}$), the local density of the backbone ($\Phi_C$), and the local density of the end segment of backbone chains ($\Phi_e$) as a function of the position along the direction perpendicular to the lamellar interface for N=18 and M=12.

The detailed molecular packing of BrBCPs into the lamellar phase was examined by the density profiles of the system components across the lamellar interfaces, using the local fractions of $\Phi_{AB}(r_\perp)=\phi_A(r_\perp)-\phi_B(r_\perp)$, $\Phi_C(r_\perp)=\phi_C(r_\perp)-<\phi_C>$, and $\Phi_e(r_\perp)=\phi_e(r_\perp)-<\phi_e>$, where $\phi_\alpha(r_\perp)$ is the volume fraction of α-segment at the position $r_\perp$ along the direction perpendicular to the lamellar interface, $<\phi_\alpha>$ is the average volume fraction of α-segment, and the subscript e stands for the end segment of backbone chain C. The three density profiles $\Phi_{AB}(r_\perp)$, $\Phi_C(r_\perp)$, and $\Phi_e(r_\perp)$ for N=18 and M=12 were plotted as an example (FIG. 7). It is noted from the density profiles that the distribution of backbone chain ends $\Phi_e(r_\perp)$ are maximal in the midplane of lamellar phase while the period in the profile of $\Phi_C(r_\perp)$ is half of that of $\Phi_{AB}(r_\perp)$ with small density depletion at the A/B interfaces. The other cases with (N≠0, M) show qualitatively similar profiles. This indicates that BrB-CPs in the lamellae form bilayers with backbones orienting perpendicular to A/B interface and with side chains orienting parallel to A/B interface (See schematic in inset of FIG. 7).

Figure 8:
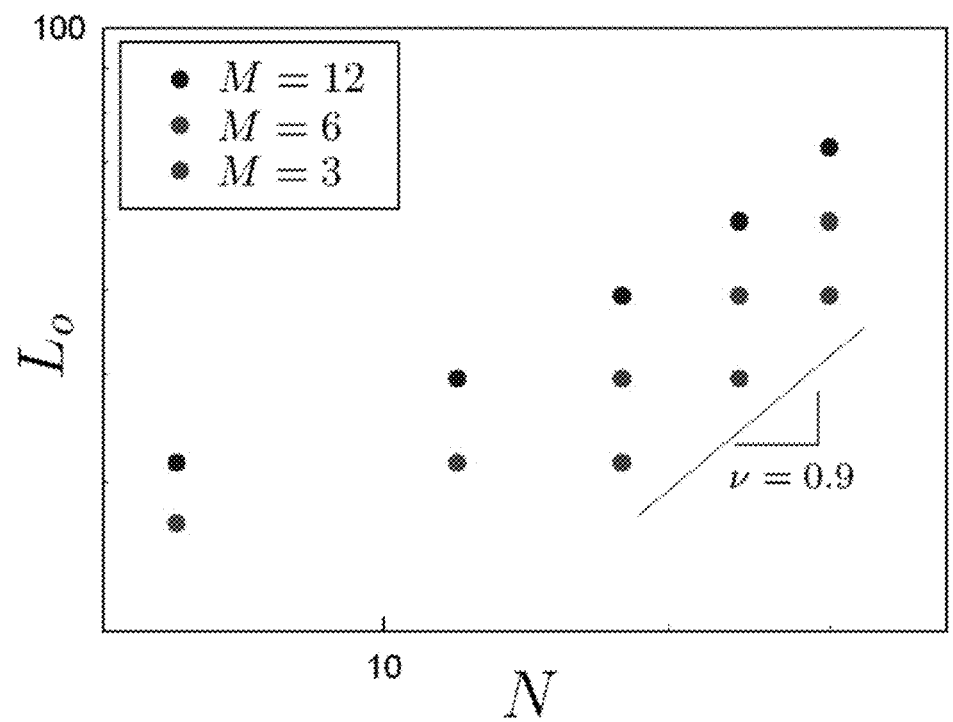
FIG. 8. The interlamellar spacing $L_o$ (in unit of lattice spacing) of the simulated BrBCP melt as a function of N for M=12, M=6, and M=3.

FIG. 8 shows the interlamellar spacing L, as a function of backbone length N for different side chain length M. The interlamellar spacing was computed from the dominant scattering vector q* in the scattering function defined by $$S(q) = V^{-1} \sum_m \sum_n \langle \exp[iq \cdot (r_m - r_n)] \Phi_{AB}(r_m) \Phi_{AB}(r_n) \rangle \quad (1)$$

where q is the scattering vector, V is the system volume, and $\Phi_{AB}(r_m)$ is the volume fraction difference between A and B segment at position $r_m$. The simulation results show that the exponent in the power from L$_o$~N$^ν$ asymptotically approaches v≅0.9 as the backbone length N increases, in good agreement with the experimental result, suggesting that the backbones are stretched due to the steric force between side chains and due to the phase separation between A- and B-side chains that are grafted to the backbone in blocky manner. The deviation from the power v≅0.9 for small N may be attributed to the weaker steric force. The steric effect from the brushes becomes reduced when a long backbone chain with many side chains is cut into some pieces of short backbones due to the significant backbone-end effect where the steric effect is vanished. In addition, the weak degree of incompatibility is also responsible for the decrease of the exponent (recall that the system is disordered if N→0).

Figure 9:
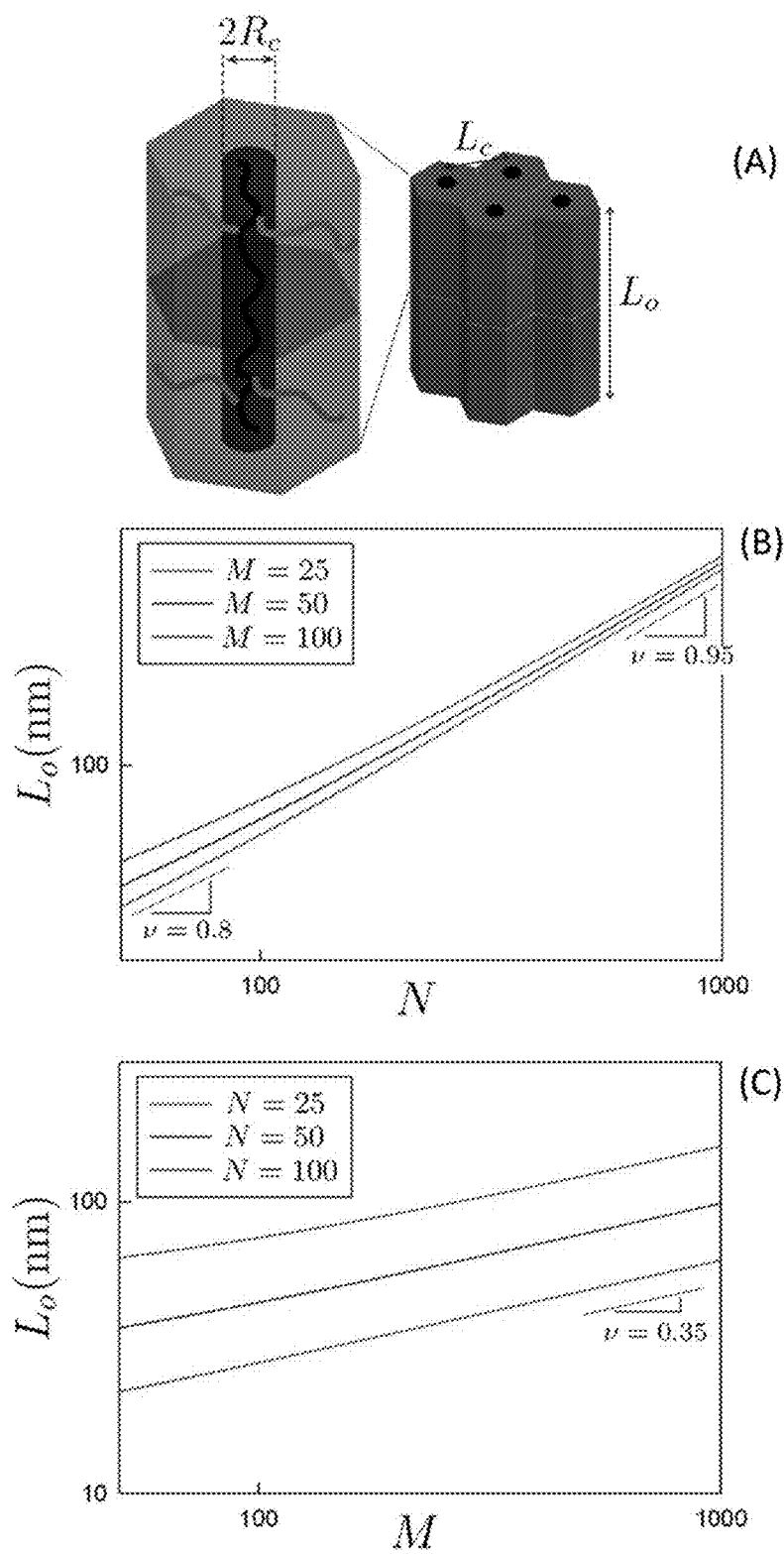
FIG. 9. (A) The schematic of unit cell of lamellar phase formed by BrBCP. (B) Theoretical results for interlamellar spacing $L_o$ as a function of N for M=25, M=50, and M=100. (C) Theoretical results for interlamellar spacing $L_o$ as a function of M for N=25, N=50, and N=100.

This near-linear dependence of the backbone length on the lamellar spacing can also be shown by a strong segregation theory.[17] Assuming that the molecular packing of BrBCPs in the unit cell of lamellar phase follows the geometry shown in FIG. 9A, the total free energy (F) can be expressed in terms of interfacial and stretching energies, $F=F_{AB}+F_{AC}+F_{BC}+F_b+F_s$ where $F_{AB}$, $F_{AC}$, and $F_{BC}$ are A/B, A/C, and B/C interfacial energies, and $F_b$ and $F_s$ are the stretching energies of backbone and side chains, respectively. Considering the geometry of unit cell (FIG. 8A), each contribution of F (in unit of thermal energy $k_BT$) turns out to be $$F_{AB} = \frac{\sqrt{6}\, \chi_{AB}^{\frac{1}{2}} R_c^2 Na[M(3a-R_c)-R_c]}{3L_o(3a-R_c)} \quad (2)$$

$$F_{AC} = \frac{N}{3a-R_c}\left[\frac{R_c}{2}\chi_{AC} + \frac{\chi_{AC}^{\frac{1}{2}} a^2}{2\sqrt{6}\, R_c}(6-a\rho_o R_c^2)\right] \quad (3)$$

$$F_{BC} = \frac{N}{3a-R_c}\left[\frac{R_c}{2}\chi_{BC} + \frac{\chi_{BC}^{\frac{1}{2}} a^2}{2\sqrt{6}\, R_c}(6-a\rho_o R_c^2)\right] \quad (4)$$

$$F_b = \frac{\pi^2 L_o^2}{4Na^2} \quad (5)$$

$$F_s = \frac{3R_c}{2(3a-R_c)} + \frac{\pi^2 N(3R_s^4 - 8R_s^3 R_c + 6R_s^2 R_c^2 - R_c^4)}{16a^2(3Ma-MR_c-R_c)(R_s^2-R_c^2)} \quad (6)$$

with a constraint for volume conservation, $$R_s\left[\frac{(1+M)(3a-R_c)R_c^2}{3a}\right]^{\frac{1}{2}} \quad (7)$$

where $X_{\alpha\beta}$ is the Flory interaction parameter between $\alpha$ and $\beta$ segment, $R_c$ is the radius of cylindrical domain formed by backbone C segments, a is the segment size, $\rho_o$ is the mean segmental density, and $R_s$ is a measure for the lateral size of unit cell relating to the center-to-center distance between cylindrical C domains $L_c(R_s/L_c=(\sqrt{3}/2\pi)^{1/2}$; see the schematic in FIG. 9). Numerically minimizing the total free energy with respect to $L_o$ and $R_c$, gives the dependence of the lamellar spacing on the backbone length N and the side chain length M.

FIG. 9 presents the theoretical results of interlamellar spacing $L_o$ as a function of the backbone length N (FIG. 8B) and the side chain length M (FIG. 8C) for BrBCPs with the molecular parameters of $\{a=0.7$ nm, $\rho_o=6$ nm$^{-3}$, $\chi_{AB}=1.0$, $\chi_{AC}=1.0$, $\chi_{BC}=1.0\}$ where the degree of incompatibility (i.e., $N\chi_{\alpha\beta}$ and $M\chi_{\alpha\beta}$) are large enough to validate the strong segregation approximation. The value of a and $\rho_o$ are chosen as typical values in block copolymer melt. As shown in FIGS. 9B and 9C, it is found from strong segregation theory that the dependence of the interlamellar spacing asymptotically approach $L_o \sim N^{0.95}$ for large N and $L_o \sim M^{0.35}$ for large M, which is in good agreement with both experimental and simulation results.

Fast Kinetics of Self-Assembly in the Bulk.

Figure 10A:
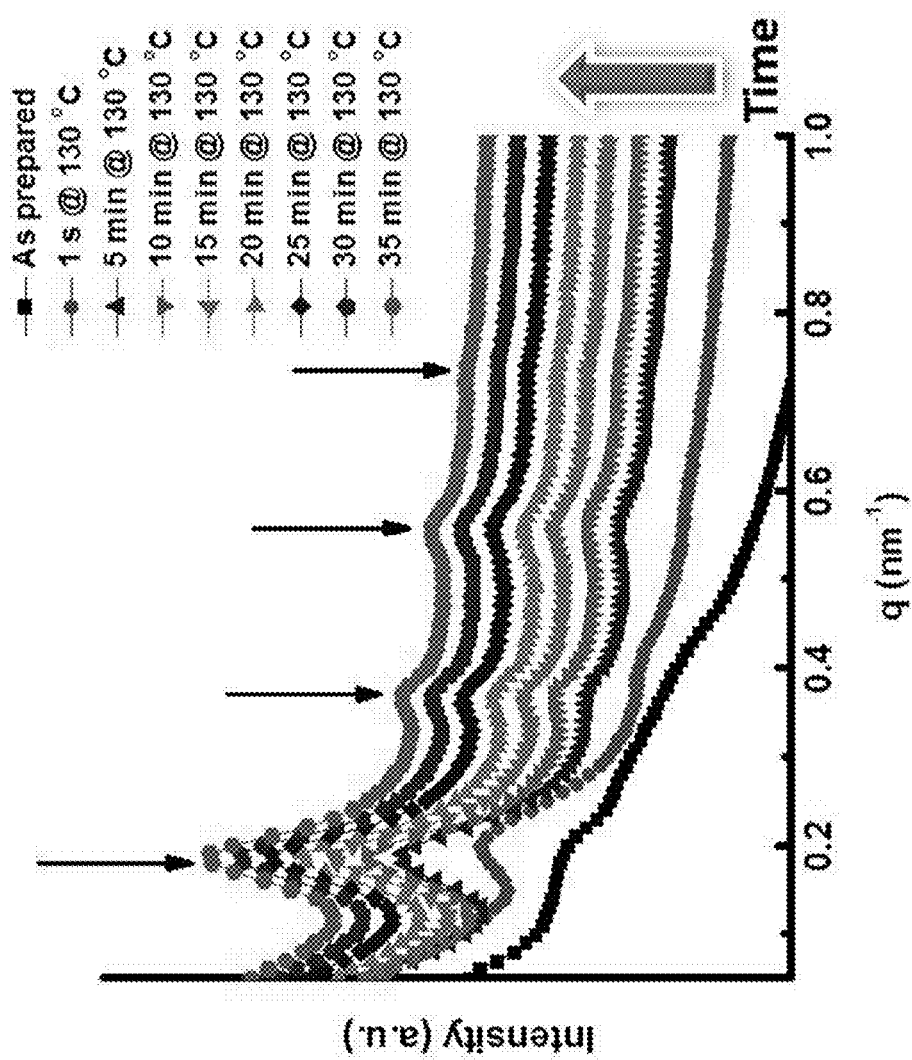
(FIG. 10A) [g-$S_{2.4k}$]$_{35}$-b-[g-$LA_{2.4k}$]$_{43}$, (FIG. 10B) [g-$S_{2.4k}$]$_{51}$-b-[g-$LA_{2.4k}$]$_{67}$ and (FIG. 10C) [g-$S_{2.4k}$]$_{98}$-b-[g-$LA_{2.4k}$]$_{124}$, respectively.
Figure 10B:
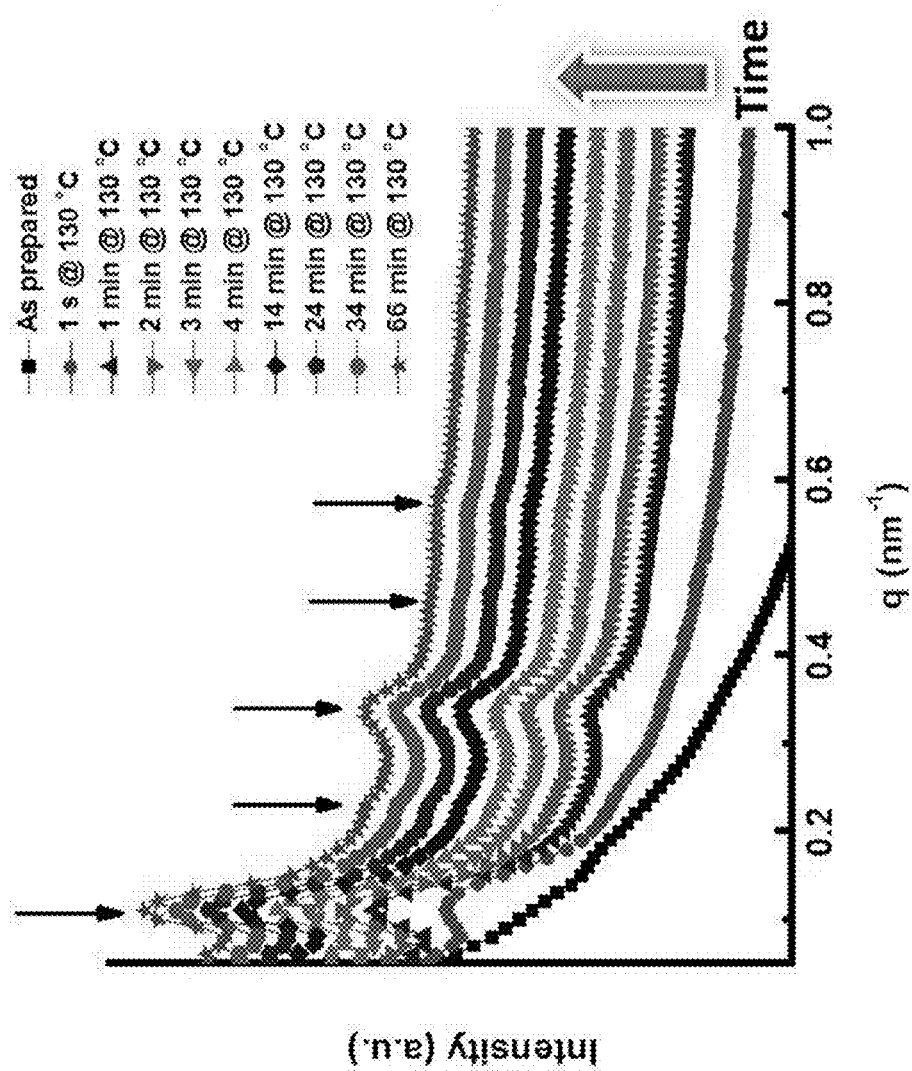
FIG. 10. In situ SAXS of sample.
Figure 10C:
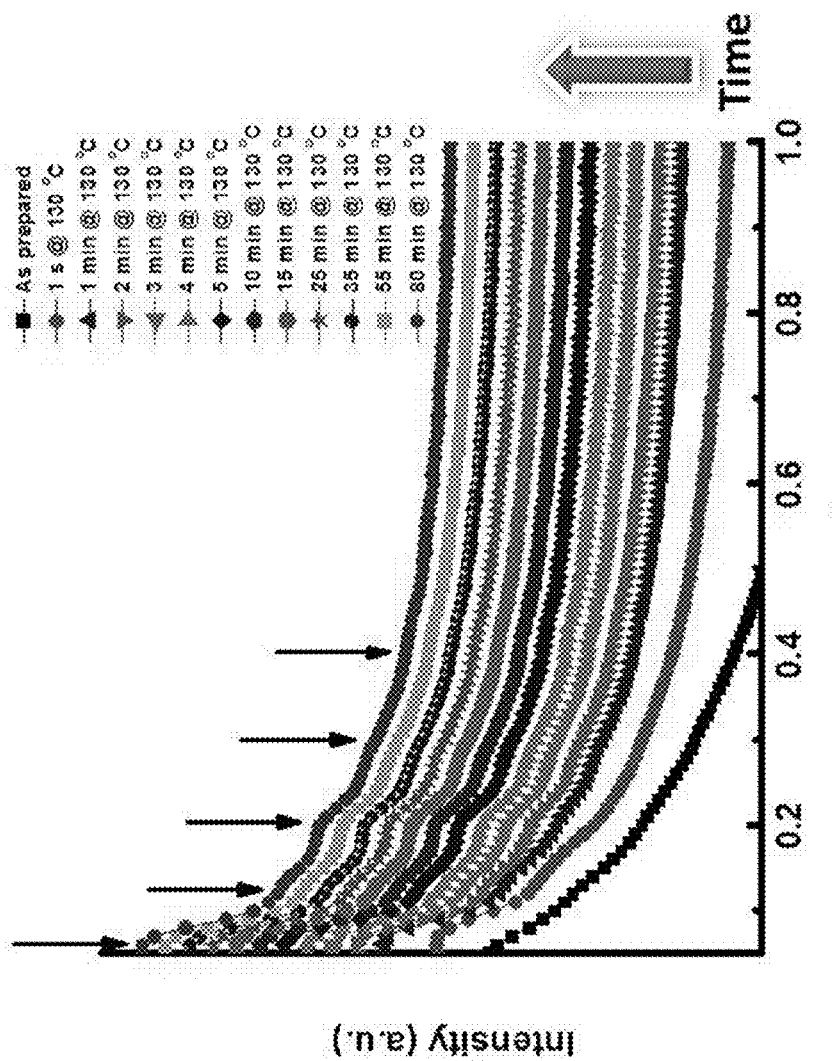
Figure 13:
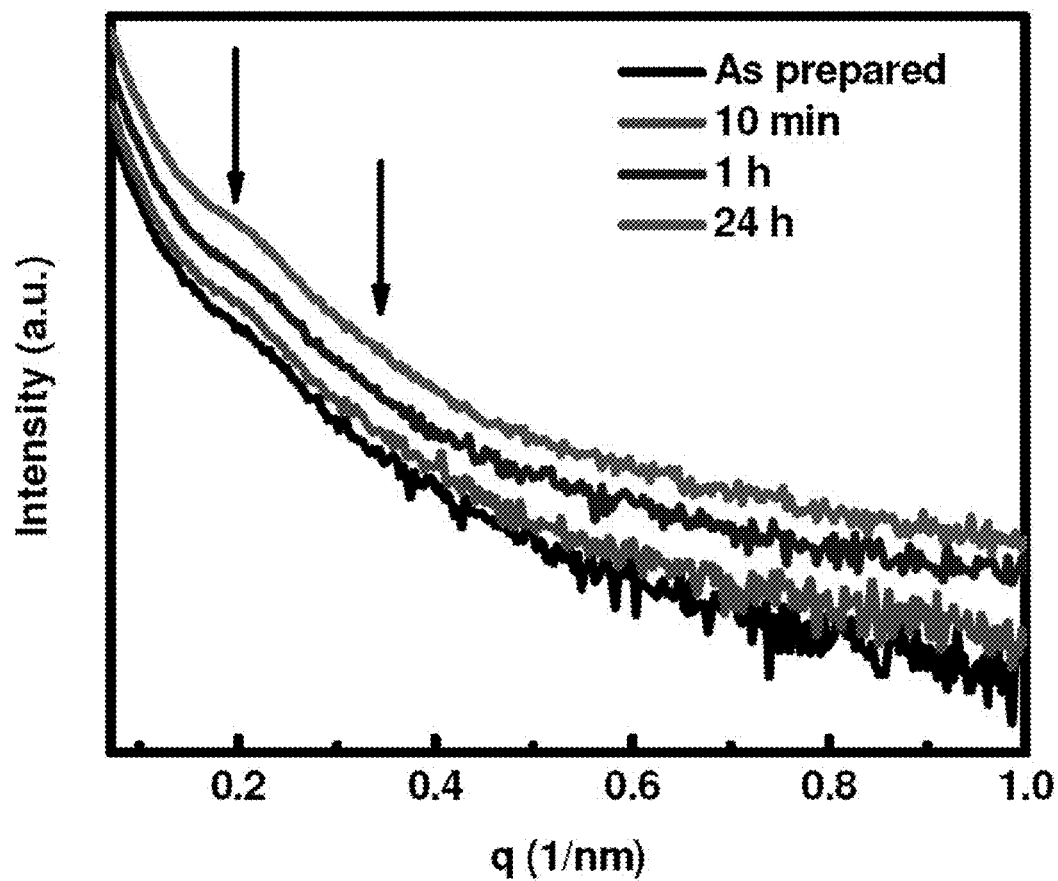
FIG. 13. SAXS measurements of a conventional lamellar forming PS-b-PLA (21k-b-24.3k) BCP.

Polymer entanglement causes kinetic barrier for polymers to self-assemble, thus leading to a slow kinetic process of the self-assembly. As the polymers grow bigger, entanglement can have increased effect on the self-assembly process. The typical value of the entanglement molecular weight $M_e$, above which the self-diffusion constant D of the chain molecules is changed from $D \sim N^{-1}$ (non-entangled, Rouse dynamics) to $D \sim N^{-2.4}$, is order of O(1)~O(10) kDa. Brush polymers have, on the other hand, been reported to show non-entangled dynamics at the high MW regime up to several thousand kDa,[18] which allows us to expect a more rapid self-assembly process even for the ultra-high MW (hundreds kDa to thousands kDa as indicated in Table 1) of BrBCPs. This inspired us to take a closer look at the unique properties of those BrBCPs and their self-assembly behavior in the bulk state. In situ SAXS was used to monitor the kinetics of the self-assembly process. FIG. 10 shows representative examples of sample $[g\text{-}S_{2.4k}]_{35}\text{-}b\text{-}[g\text{-}LA_{2.4k}]_{43}$, $[g\text{-}S_{2.4k}]_{51}\text{-}b\text{-}[g\text{-}LA_{2.4k}]_{67}$ and $[g\text{-}S_{2.4k}]_{98}\text{-}b\text{-}[g\text{-}LA_{2.4k}]_{124}$. For instance in FIG. 10B, the initial state as indicated by the bottom black curve did not show any distinct peak and exhibited a gradual decrease in intensity, suggesting that chains of BrBCPs were in random arrangements. A measurement was taken immediately (1 s, red curve) once the temperature was raised to 130° C. and a primary peak at ~0.012 Å$^{-1}$ appeared. This implies that a characteristic distance was developed, although not too well defined due to its broad shape. Upon longer annealing time, the primary scattering wavevector q* shifted a little bit to smaller q value (0.011 Å$^{-1}$) and higher order reflections were profoundly enhanced at integral multiples of q*, an evidence of improvement in lateral order of lamellar structures. Notably, low MW BrBCP (FIG. 10A) self-assembled much more rapidly (~5 min) in comparison to the high MW (FIG. 10C, ~1 h). It is understandable that low MW BrBCP has less entanglement between chains and thus the mobility is higher. Nevertheless, these results show that well-ordered lamellar structures were formed within an hour for all of the samples shown. As a comparison, we also tried ex situ SAXS experiments with the largest MW of a linear lamellar forming PS-b-PLA BCP that we have (Polymer Source, 21k-b-24.3k, PDI=1.14). We found that even after thermal annealing for 24 hours at 130° C., the order was not well developed (see. FIG. 13 providing SAXS measurements of a conventional lamellar forming PS-b-PLA (21k-b-24.3k) BCP. This reflects the advantage of BrBCPs for its rapid kinetics on the other side.

CONCLUSION

In summary, symmetric BrBCPs of PLA and PS side chains self-assemble rapidly into highly ordered lamellar domains ranging from 20 nm to 240 nm as revealed by SAXS. The domain size increased approximately linearly with the MW of the backbone, which indicated that the backbone was in an extremely extended conformation. Strong segregation theory and Monte Carlo simulation of ordered BrBCPs revealed that the direction of backbones are perpendicular to the interface between lamellar domains formed by PS and PLA brushes that are oriented parallel to the interface in the lamellar structure, which is essentially different from the molecular packing in linear diblock lamellae. This molecular packing is responsible for the near-linear dependence of the domain spacing on backbone length, rationalizing experimental results. Those BrBCPs provide an ideal system for the self-assembly of BrBCPs and provide insight as to structure designing of BCPs that are capable of fast self-assembly into nanostructures with a wide range of domain spacing.

EXPERIMENTAL

Small Angle X-Ray Scattering (SAXS)

Figure 2:
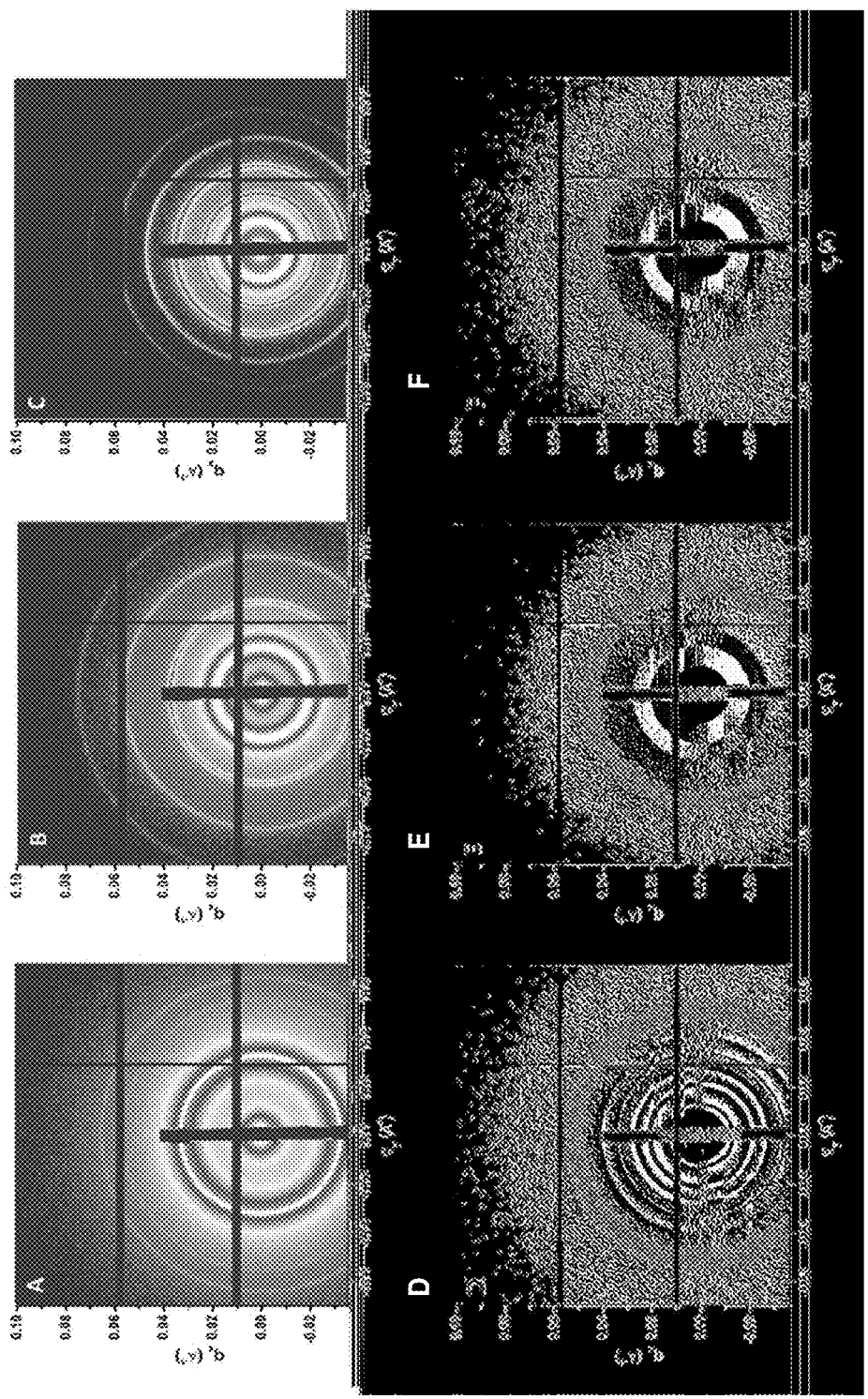
FIG. 2. Representative 2D SAXS patterns for (A): [g-$S_{2.4k}$]$_{19}$-b-[g-$LA_{2.4k}$]$_{25}$; (B) [g-$S_{2.4k}$]$_{35}$-b-[g-$LA_{2.4k}$]$_{43}$; (C) [g-$S_{2.4k}$]$_{51}$-b-[g-$LA_{2.4k}$]$_{67}$; (D) [g-$S_{2.4k}$]$_{98}$-b-[g-$LA_{2.4k}$]$_{124}$; (E) [g-$S_{2.4k}$]$_{189}$-b-[g-$LA_{2.4k}$]$_{233}$; and (F) [g-$S_{2.4k}$]$_{259}$-b-[g-$LA_{2.4}$]$_{381}$.
Figure 12:
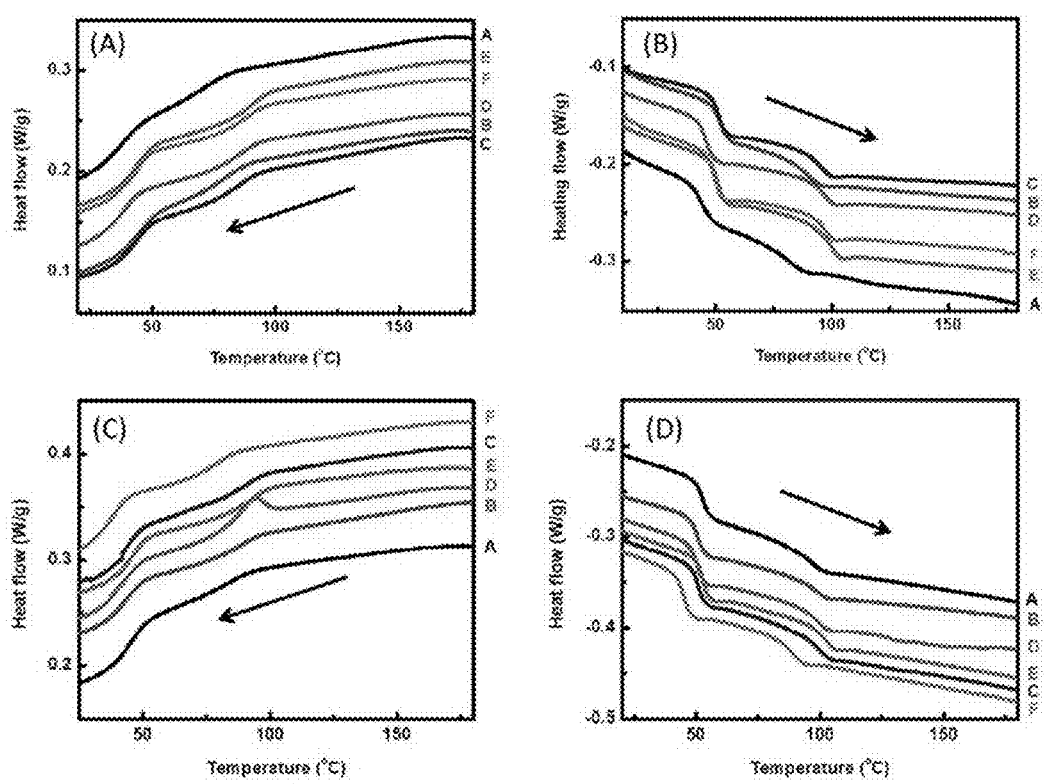
FIG. 12. DSC cooling (A, C) and heating (B, D) curves revealed two glass transitions around 95° C. and 50° C., respectively. Colored curves A-F in (A) and (B) represents samples of Group I in Table 1 sequentially; colored curves A-F in (C) and (D) represents samples of Group II in Table 1 sequentially.

We investigated the self-assembly of BrBCPs in the bulk state using small-angle x-ray scattering (SAXS). Since $T_g$ of PS was determined to be around 95° C. and $T_g$ of PLA in the BrBCP was found to be around 50° C. (see, FIG. 12), an elevated temperature of 130° C. was chosen to perform the thermal annealing experiments of those BrBCPs. FIG. 12 provides DSC cooling (A, C) and heating (B, D) curves revealed two glass transitions around 95° C. and 50° C., respectively. Colored curves A-F in (A) and (B) represents samples of Group I in Table 1 sequentially; colored curves A-F in (C) and (D) represents samples of Group II in Table 1 sequentially. The solid samples were pressed in aluminum washers which are windowed by Kapton films and kept in vacuum oven for 12 hours or longer to achieve thermal equilibrium. SAXS measurements for Group I BrBCPs were performed at beamline 7.3.3 at the Advanced Light Source, Berkeley National Laboratory (FIG. 2). The wavelength of incident x-ray was 0.124 nm. The sample-to-detector distance was 3889.2 mm. Scattering signals were collected by a Pilatus 100k fast detector with pixel size of 0.172 mm. SAXS measurements for Group II BrBCPs were performed at beamline X27C, National Synchrotron Light Source, Brookhaven National Laboratory. The wavelength of incident x-ray was 0.1371 nm. The sample-to-detector distance was 1786.5 mm. A marCCD detector with pixel size of 0.158 mm was used to collect the scattering signals. For both beamlines the exposure time was kept between 30-60 s.

In Situ Small Angle X-Ray Scattering (In Situ SAXS):

In situ SAXS measurements were performed at beamline 8-ID-E, Advanced Photon Source, Argonne National Laboratory. The wavelength of incident X-ray was 0.1687 nm. The sample-to-detector distance was 1641.0 mm. The samples were mounted onto an Instec HCS410 hot stage equipped with liquid-nitrogen cooling and nitrogen gas purging accessories. The temperature was programmed to increase fast from room temperature to 130° C. at a rate of 50° C./min and hold at that temperature. The exposure time for each snapshot was limited to 0.5-1 s in order to minimize the damage to the samples that can be probably caused by the X-ray photons.

Simulations:

Dynamic Metropolis Monte Carlo method with the 8-site bond fluctuation model[15,16] is used. For the simulation of the bulk morphology of BrBCPs, bead spring chains of BrBCP chains, each with N backbone beads of type C to which equal numbers of A and B side chains with M beads each were sequentially grafted, were generated on a cubic box with L×L×L under periodic boundary conditions. The system was then equilibrated with the set of interaction parameters of $\epsilon=\epsilon_{AB}=\epsilon_{BC}/2=\epsilon_{AC}/2=0.4\,k_BT$ where the segmental interaction parameters $\epsilon_{\alpha\beta}$ between the component $\alpha$ and $\beta$ were given considering the solubility parameters of the PS, PLA, and polynorbornene.[19,20] The number of segments of backbone N and the number of segments of side chain M are varied from N=6 to N=30 and from M=3 to M=12, respectively. For comparison, the case of N=0, which corresponds to symmetric diblock copolymer with chain length 2M, was also simulated. A lattice occupation density is set to be $\phi=0.5$ for polymer chains in the simulation box, which corresponds to a polymer melt in the bond fluctuation model.[21] Starting from a random initial configuration, the film system is allowed to equilibrate for $5\times10^7$ Monte Carlo steps. (MCS). Configurations sampled at every $10^4$ MCS after equilibration and the mean local densities of the simulation components are obtained by averaging the densities over 100 samples.

REFERENCES (1) Bates, F. S.; Fredrickson, G. H. Block Copolymer Thermodynamics: Theory and Experiment. *Annu Rev Phy Chem* 1990, 41, 525-557.
(2) Hamley, I. W. The Physics of Block Copolymers; Oxford University Press: Oxford; New York, 1998.
(3) Segalman, R. A. Patterning with Block Copolymer Thin Tilms. *Mat. Sci. Eng. R.* 2005, 48, 191-226.
(4) Tsui, O. K. C.; Russell, T. P. *Polymer Thin Films*; World Scientific: Singapore; Hackensack, N.J., 2008.
(5) Fredrickson, G. H.; Bates, F. S. Dynamics of Block Copolymers: Theory and Experiment. *Annu Rev Mater Sci* 1996, 26, 501-550.
(6) Park, S.; Lee, D. H.; Xu, J.; Kim, B.; Hong, S. W.; Jeong, U.; Xu, T.; Russell, T. P. Macroscopic 10-Terabit-per-Square-Inch Arrays from Block Copolymers with Lateral Order. *Science* 2009, 323, 1030-1033.
(7) Cushen, J. D.; Otsuka, I.; Bates, C. M.; Halila, S.; Fort, S.; Rochas, C.; Easley, J. A.; Rausch, E. L.; Thio, A.; Borsali, R. et al. Oligosaccharide/Silicon-Containing Block Copolymers with 5 nm Features for Lithographic Applications. *ACS Nano* 2012, 6, 3424-3433.
(8) Kang, Y.; Walish, J. J.; Gorishnyy, T.; Thomas, E. L. Broad-Wavelength-Range Chemically Tunable Block-Copolymer Photonic Gels. *Nat. Mater.* 2007, 6, 957-960.
(9) Miyake, G. M.; Weitekamp, R. A.; Piunova, V. A.; Grubbs, R. H. Synthesis of Isocyanate-Based Brush Block Copolymers and Their Rapid Self-Assembly to Infrared-Reflecting Photonic Crystals. *J. Am. Chem. Soc.* 2012, 134, 14249-14254.
(10) Leibler, L. Theory of Microphase Separation in Block Copolymers. *Macromolecules* 1980, 13, 1602-1617.
(11) Runge, M. B.; Bowden, N. B. Synthesis of High Molecular Weight Comb Block Copolymers and Their Assembly into Ordered Morphologies in the Solid State. *J. Am. Chem. Soc.* 2007, 129, 10551-10560.
(12) Xia, Y.; Olsen, B. D.; Kornfield, J. A.; Grubbs, R. H. Efficient Synthesis of Narrowly Dispersed Brush Copolymers and Study of Their Assemblies: The Importance of Side Chain Arrangement. *J. Am. Chem. Soc.* 2009, 131, 18525-18532.
(13) Oono, Y.; Bahiana, M. ⅔-Power Law for Copolymer Lamellar Thickness Implies a ⅓-Power Law for Spinodal Decomposition. *Phys. Rev. Lett.* 1988, 61, 1109-1111.
(14) Zalusky, A. S.; Olayo-Valles, R.; Wolf, J. H.; Hillmyer, M. A. Ordered Nanoporous Polymers from Polystyrene-Polylactide Block Copolymers. *J. Am. Chem. Soc.* 2002, 124, 12761-12773.
(15) Carmesin, I.; Kremer, K. Static and Dynamic Properties of Two-Dimensional Polymer Melts *J. Phys.* (Paris) 1990, 51, 915-932.
(16) Deutsch, H. P; Binder K. Interdiffusion and Self-Diffusion in Polymer Mixtures: A Monte Carlo Study. *J. Chem. Phys.* 1991, 94, 2294-2304.
(17) Grason, G. M. The Packing of Soft Materials: Molecular Asymmetry, Geometric Frustration and Optimal Lattices in Block Copolymer Melts. *Phys. Rep.* 2006, 433, 1-64.

(18) Hu, M.; Xia, Y.; McKenna, G. B.; Kornfield, J. A.; Grubbs, R. H. Linear Rheological Response of a Series of Densely Branched Brush Polymers. *Macromolecules* 2011, 44, 6935-6943.
(19) Vayer, M.; Hillmyer, M. A.; Dirany, M.; Thevenin, G.; Erre, R.; Sintrurel, C. Perpendicular Orientation of Cylindrical Domains Upon Solvent Annealing Thin Films of Polystyrene-b-Polylactide. *Thin Solid Films* 2010, 518, 3710-3715.
(20) Li, Z.-H.; Ying, X.-G.; Liu, G. *J. Chem. Eng. Chin. Univ.* 2001, 15, 206.
(21) Thompson, R. L.; McDonald, M. T.; Lenthall, J. T.; Hutchings, L. R. Solvent Accelerated Polymer Diffusion in Thin Films. *Macromolecules* 2005, 38, 4339-4344.
(22) Sveinbjörnsson, B. R.; Weitekamp, R. A.; Miyake, G. M.; Xia, Y.; Atwater, H. A.; Grubbs, R. H. Rapid Self-assembly of Brush Block Copolymers to Photonic Crystals. *P. Nat. Acad. Sci. USA* 2012, 109, 14332-14336.
(23) Poelma, J. E.; Ono, K.; Miyajima, D.; Aida, T.; Satoh, K.; Hawker, C. J. Cyclic Block Copolymers for Controlling Feature Sizes in Block Copolymer Lithography. *ACS Nano* 2012, 6, 10845-10854.
(24) Hawker, C. J.; Russell, T. P. Block Copolymer Lithography: Merging "Bottom-Up" with "Top-Down" Processes. *MRS Bull.* 2005, 30, 952-966.
(25) Bang, J.; Jeong, U.; Ryu, D. Y.; Russell, T. P.; Hawker, C. J. Block Copolymer Nanolithography: Translation of Molecular Level Control to Nanoscale Patterns. *Adv. Mater.* 2009, 21, 4769-4792.

Example 2

Periodic Nanostructures Form Self-Assembly of Brush and Wedge-Type Block Copolymers Summary Here, we describe a simple method for fabrication of well-aligned, periodic nanostructures with large feature sizes upon either hard or flexible surfaces by using brush polymers. Brush BCPs can be made from a few different approaches such as grafting from, grafting onto and grafting through. All of them can be used for the fabrication of our system, but for our studies we used the grafting through approach for its guaranteed complete grafting and convenience with ring-opening metathesis polymerization to make a number of graft block copolymers of a variety of sizes. The grafting from approach is very compatible but not limited to norbornene derived macro monomers and gives good control over the backbone length and can be easily purified by methods such as but not limited to precipitation into an appropriate solvent. The primary purpose of the side chains is to stretch the backbone and minimize chain-entanglement, and can therefore be any polymer (e.g. polylactide, polystyrene, poly tert-butyl acrylate) as well as large non-polymeric chains such as, but not limited to, "wedge" side chains (FIG. 14e). When these graft block copolymers are big enough they start to exhibit photonic properties by reflecting specific colors. They can self-assemble rapidly into photonic materials through a variety of annealing techniques such as, but not limited to, vapor annealing, thermal annealing and slow evaporation from a solvent. The combination of the simple and rapid self-assembly of these polymers and the improved synthesis of them in the past few years make them an excellent platform for the fabrication of well-aligned, periodic nanostructures.

General Description of the Invention

The present invention can be employed in many applications, in the general fields of optics, photonics, chemical sensing, mechanical sensing and radiation management. Specifically, we have demonstrated the facile self-assembly of these brush polymers to afford one-dimensional periodic nanostructures. Two- and three-dimensional periodic nanostructures can also be afforded by changing the size of the different blocks, different annealing methods, or through the incorporation of multiple blocks in either the main- or side-chain of the brush polymer. Furthermore, one or more of these materials can serve as a sacrificial template for the incorporation of other media, such as but not limited to ceramics, polymers or metals.

As mentioned above, brush polymers can be made via 3 different routes. Since the same principles hold for the self-assembly of these brush polymers, regardless of the approach used to make them, we decided to utilize the MM approach and will confine further discussion here to graft polymers made with that approach.

We chose to use a norbornene backbone in our studies that we polymerized via ROMP since it has proven a successful approach to obtain well-defined graft polymers, as mentioned earlier. Other backbones can also be polymerized via other polymerization routes (e.g. controlled radical polymerizations) but in the subsequent discussion here we'll focus on our results utilizing the ROMP of norbornene based MMs.

The norbornene is functionalized with the polymer side chain either by using a norbornene derivative as an initiator for a polymerization such as but not limited to ring-opening polymerization (ROP) and controlled radical polymerization (CRP). It is also possible to click or couple a previously made polymer on an appropriately functionalized norbornene.

When the backbone has been functionalized it is polymerized (here via ROMP) in a block-wise manner, i.e. first one type of MM is polymerized followed by a different type of MM to yield the block copolymer.

Figure 14:
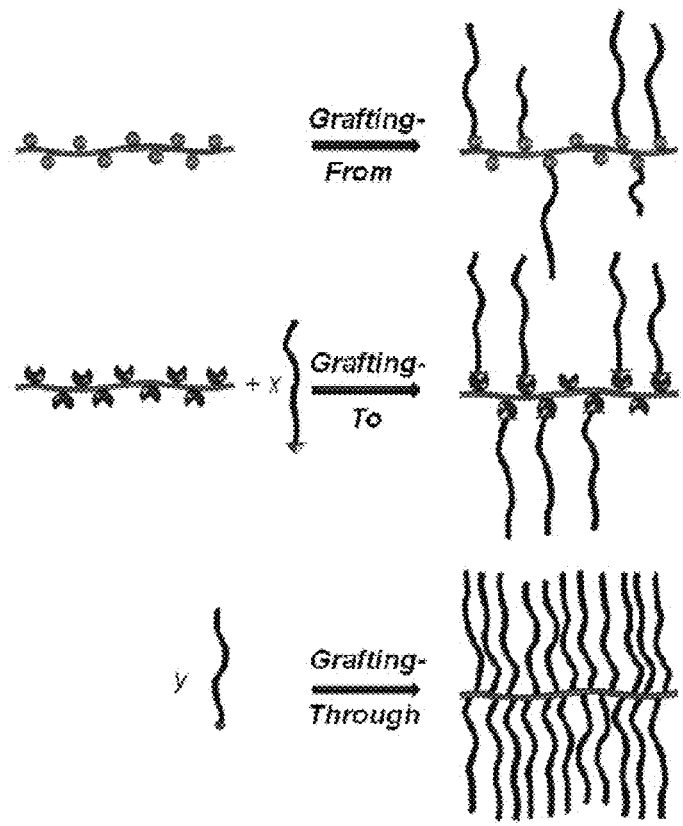

We have been able to obtain photonic crystals with various combinations of side chains such as polylactide (PLA), polystyrene (PS), poly tert-butyl acrylate (PtBA), and even non-polymeric yet long side chains such as dodecanyl norbornene (C12) and norbornene "wedge" MMs (see, FIG. 14). ROMP of norbornenes with various combinations of the above mentioned side chains have yielded photonic crystals in the visible spectrum (Table 1). This was done to show that any side chains could be used as long as each block is different. The side chains mainly affect how big the subsequent graft polymers need to be to correspond to different photonic band gaps. Incorporation of cross-linkable groups into the polymer can be useful to crosslink the brush polymer in its self-assembled form. With appropriate side chains it is also possible to incorporate metals and/or other additives into the brush polymer and/or selectively incorporate it into only one of the blocks.

TABLE 1

Preliminary tests of several combinations of macromonomers.

| Test # | Side chain A | Side chain B | A: catalyst ratio | B: catalyst ratio | Observed color |
|---|---|---|---|---|---|
| 1 | PLA | C12 | 200 | 1000 | Dark blue |
| 2 | PLA | C12 | 200 | 1500 | Light blue |
| 3 | PLA | Wedge | 200 | 1000 | Blue |
| 4 | PLA | Wedge | 200 | 2000 | Green |
| 5 | PLA | PS | 400 | 200 | Dark blue |
| 6 | PLA | PS | 400 | 400 | Green |

As shown in the table above the MMs were ROMPed in both symmetric ratios, giving rise to a lamellar structure (1D), and asymmetric ratios where the graft polymers result in a 2D or 3D structures. For the purpose of a systematic study of these materials we have further concentrated on a lamellar (1D) system using the PLA and PS side chains.

Figure 15:
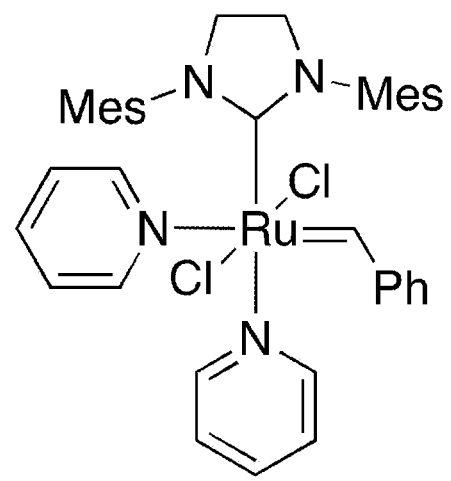
FIG. 15. A bis-pyridine derivative of the second generation Grubbs catalyst.
Figure 16:
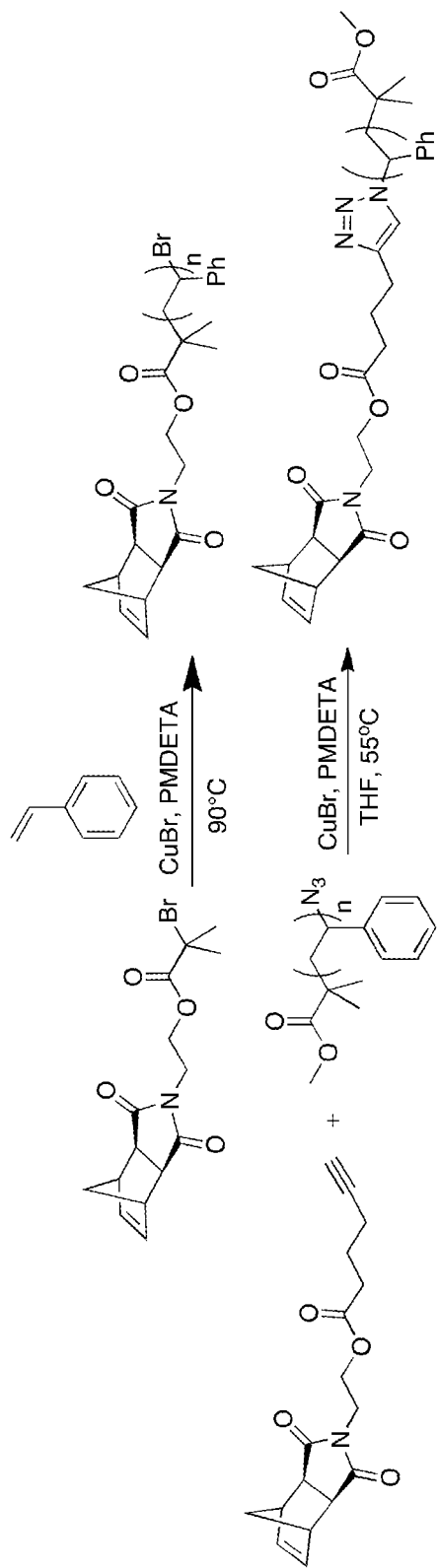
FIG. 16. There are a variety of methods to functionalize norbornenes with a polymer side chain such as direct polymerization from a norbornene initiator (top) and clicking the polymer side chain onto a norbornene alkyne (bottom).
Figure 17:
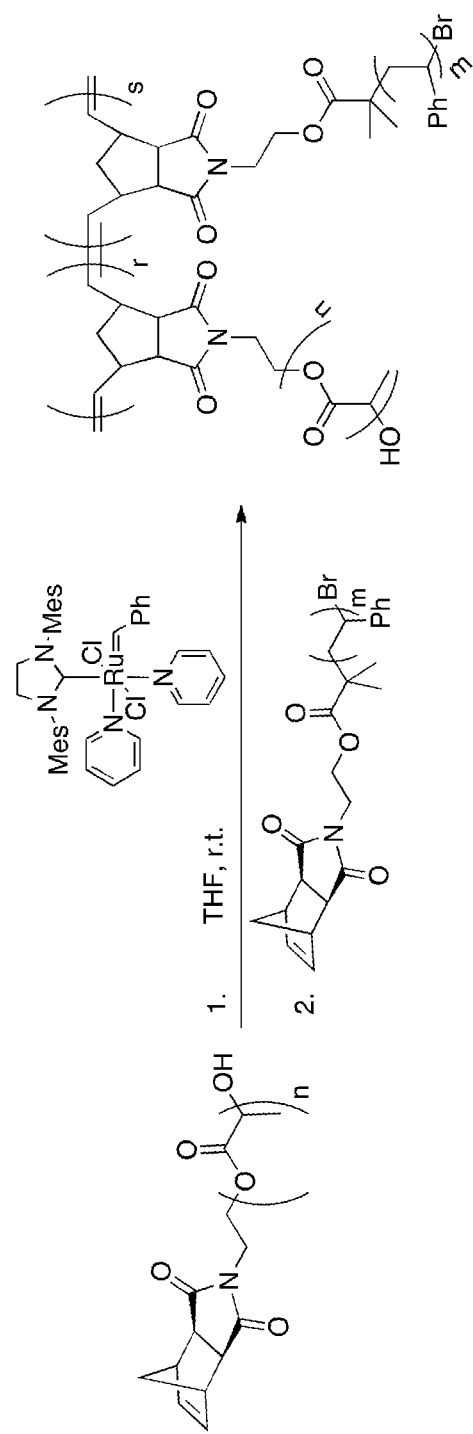
FIG. 17. An example of the synthesis of a graft block copolymer (g-PNB-[PS-b-PLA]).
Figure 18:
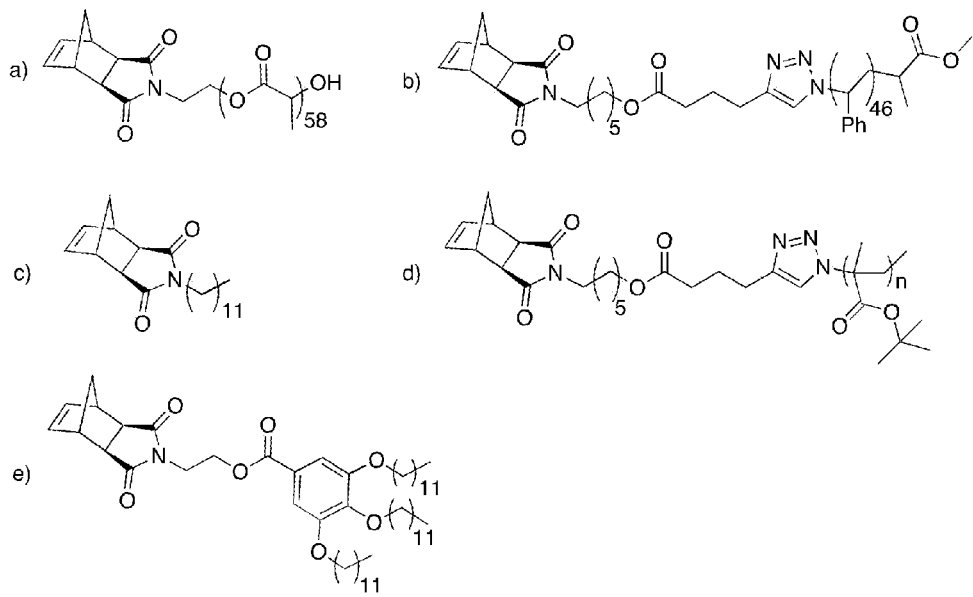
FIG. 18. Chemical structure of the macromonomers tested and the catalyst used: a) Norbornene-polylactide (NB-PLA). b) Norbornene-polystyrene (NB-PS). c) Dodecanyl norbornene (NB-C12). d) Norbornene tert-butyl acrylate (NB-tBA). e) Norbornene wedge (NB-wedge).
Figure 19:
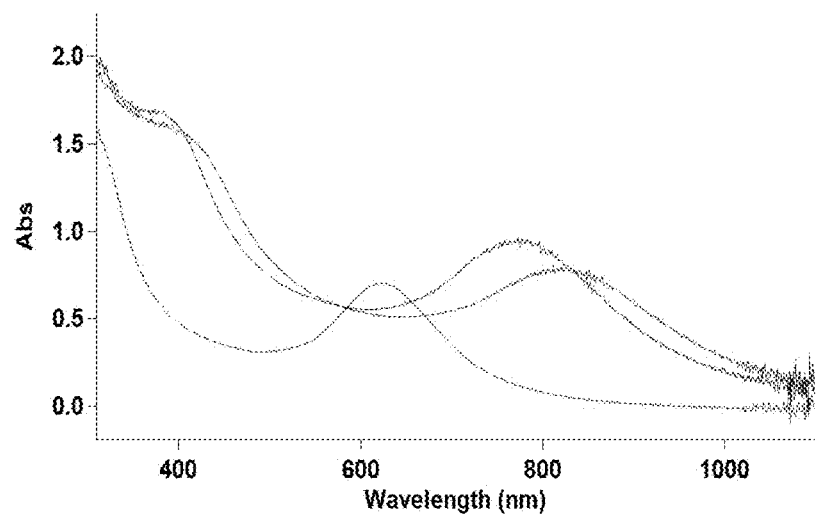
FIG. 19. UV-VIS spectrum of three g-PNB-[PS-b-PLA] of different sizes (Mw=3.4 MDa, PDI=1.17 (red); Mw=4.3 MDa, PDI=1.29 (blue); Mw=5.4 MDa, PDI=1.34 (purple)).
Figure 20:
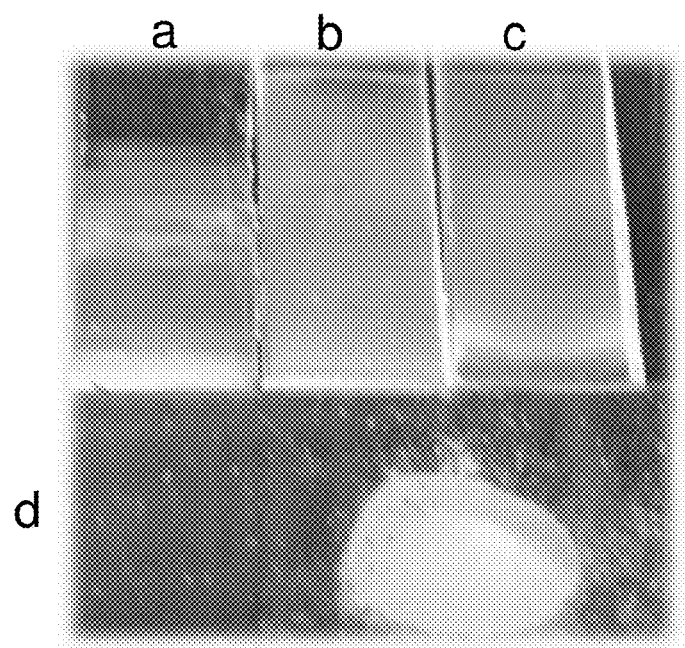
FIG. 20. A g-PNB-[PS-b-PLA] with Mw=4.3 MDa (PDI=1.29) annealed in several different ways: a) slow evaporation from dichloromethane (top left), b) slow evaporation from tetrahydrofuran (top center), c) slow evaporation from tetrahydrofuran followed by heating at 120° C. for 2 h and d) solid polymer thermally annealed under the pressure of two glass slides clamped together at 140° C. for 30 min under vacuum.

With the PLA/PS system we have now been able to synthesize graft polymers with unprecedented sizes that when self-assembled reach domain sizes not only large enough to give a variety of photonic band gaps throughout all of the visible spectrum but we have UV-VIS (FIG. 15) and integrating sphere data showing that we can even reach into the IR (>1200 nm). The location of the photonic band gap can be easily controlled with the degree of polymerization of the backbone. We have also found that the size of the side chains affect the required degree of polymerization of the backbone to reach the same photonic band gaps. Larger side chains seem to lengthen the domain sizes relative to analogous graft polymers with smaller side chains.

These materials can be annealed in a variety of ways on both hard and soft surfaces. The annealing techniques range from proper solvent annealing with solvents such as but not limited to tetrahydrofuran, dichloromethane, chloroform or mixtures of solvents to methods as simple as dissolving it in a solvent and letting it evaporate over a few hours or just heating the solid polymer for as little as 10-15 minutes at 120-130° C. Detailed studies have been done on the thin films obtained by solvent annealing techniques and are included below. Due to the low amount of entanglement between graft polymers, these materials self-assemble very rapidly compared to many other materials such as linear block copolymers. This is an important factor since time-dependent cost can be significantly decreased with these rapidly self-assembling materials. The different annealing techniques can also be used to reach different domain sizes and thus different band gaps as can be seen by the different colors observed depending on annealing technique.

We have specifically demonstrated the thermomechanical response, as well as solvent-dependent self-assembly of these systems. This opens up the possibility for an array of compliant photonic devices, and novel sensors. A number of potential devices are outlined here. The change in color due to the mechanical stretching or compression yields a pressure and/or stress sensor. The change in color due to the change in index of refraction through chemical adsorption, as well as the potential swelling due to solvation, yields an optically read chemical sensor. The ability to tune the spacing of the polymer brushes through any external stimuli, such as temperature, electric field gradients, solvation or stretching yields a dynamic photonic filter. This could be employed as an optical switch, or other active optical element. The ability to remove one of the incorporated polymers, and infill with another material such as a metal affords the ability to template complex nanostructures, such as metamaterials. We have demonstrated the use of these self-assembled polymer brushes as photonic crystals. We have specifically demonstrated one-dimensional photonic crystals (Bragg reflectors), but higher dimensional photonic crystals can be afforded with the methods described above. These photonic crystals can be employed as frequency selective filters, e.g. as band reject filters or polarizers in the UV, visible or infrared parts of the electromagnetic spectrum. This has many potential applications in optics, as well as in thermal management (via IR reflecting coatings or "paints").

In summary, we have discovered and demonstrated a simple route to fabricate well-ordered, periodic nanostructures on either hard or flexible surfaces that may or may not be transparent using brush block copolymers. Nanostructures with extremely large feature sizes are easily obtained owing to the unique properties of brush block copolymers, which would be an ideal candidate for applications such as but not limited to polarizers and photonic band gap materials for visible, ultraviolet and even infrared light. Thin films of brush block copolymers can be directly served as templates and scaffolds for pattern transferring the original patterns onto either hard or flexible surfaces that may or may not be transparent, and the etching contrast for effective pattern transferring can be significantly enhanced by selective etching of one component.

Example 1

Results of Annealing Studies

Table 2 shows the sample codes and characteristics of brush block copolymers (BrBCPs) used in this study. ω-norbornenyl macromonomers containing polystyrene (PS) and polylactide (PLA) were synthesized and used to prepare BrBCPs according to the previously reported procedure, which was mentioned above [6f]. Thin films of BrBCPs were prepared on either hard or flexible and transparent surfaces and, to effectively induce well-developed nanostructures, thin films of BrBCPs, were then solvent annealed with tetrahydrofuran (THF) and/or chlorobenzene (CBz). Scanning force microscopy (SFM), transmission electron microscopy (TEM), and grazing incidence small angle scattering (GI-SAXS) were used to quantitatively and qualitatively characterize and analyze thin films of brush block copolymers.

TABLE 2

Sample codes and characteristics of brush block copolymers.

| Sample Codes | Molecular Weight of | | Degree of Polymerization[c] | [g-S/C]:[g-LA/C][d] |
|---|---|---|---|---|
| | g-S[a] | g-LA[b] | | |
| [g-$S_{5.1k}$]$_{50}$-b-[g-$LA_{4.4k}$]$_{50}$ | 5.1k | 4.4k | 105 | 50:50 |
| [g-$S_{2.4k}$]$_{20}$-b-[g-$LA_{2.4k}$]$_{20}$ | 2.4k | 2.4k | 44 | 20:20 |
| [g-$S_{2.4k}$]$_{35}$-b-[g-$LA_{2.4k}$]$_{35}$ | | | 77 | 35:35 |
| [g-$S_{2.4k}$]$_{50}$-b-[g-$LA_{2.4k}$]$_{50}$ | | | 117 | 50:50 |
| [g-$S_{2.4k}$]$_{100}$-b-[g-$LA_{2.4k}$]$_{100}$ | | | 220 | 100:100 |
| [g-$S_{2.4k}$]$_{200}$-b-[g-$LA_{2.4k}$]$_{200}$ | | | 420 | 200:200 |

[a]Macromonomer of polystyrene;
[b]macromonomer of polylactide;
[c]determind by THF GPC using RI and MALLS detectors;
[d]ratio of each macromer to Ru catalyst.

Figure 25:
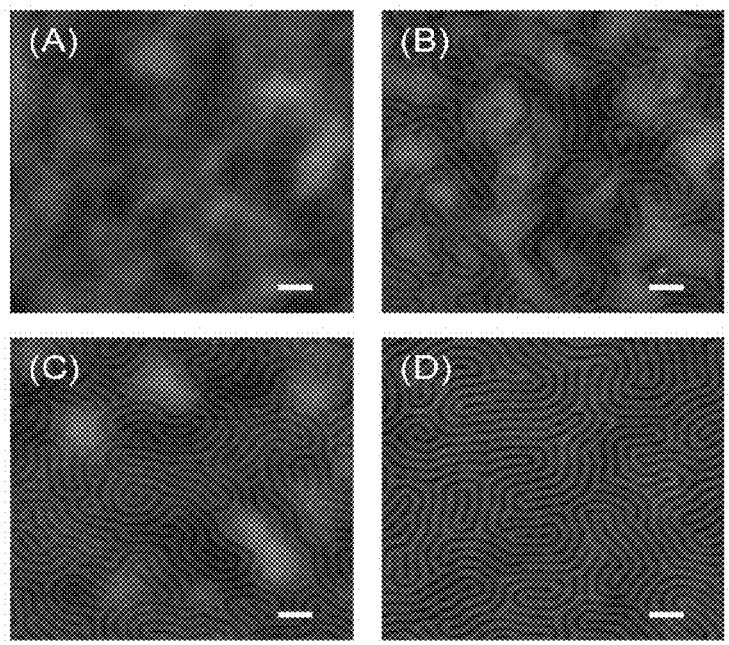
FIG. 25. SFM height images of thin films of [g-$S_{5.1k}$]$_{50}$-b-[g-$LA_{4.4k}$]$_{50}$ on Si substrate. The film thicknesses are 40.7 nm and thin films are solvent annealed by THF/CBz. The solvent-annealing times are 0 h for (A), 1.0 h for (B), 2 h for (C), and 4 h for (D). The scale bar is 200 nm.
Figure 26:
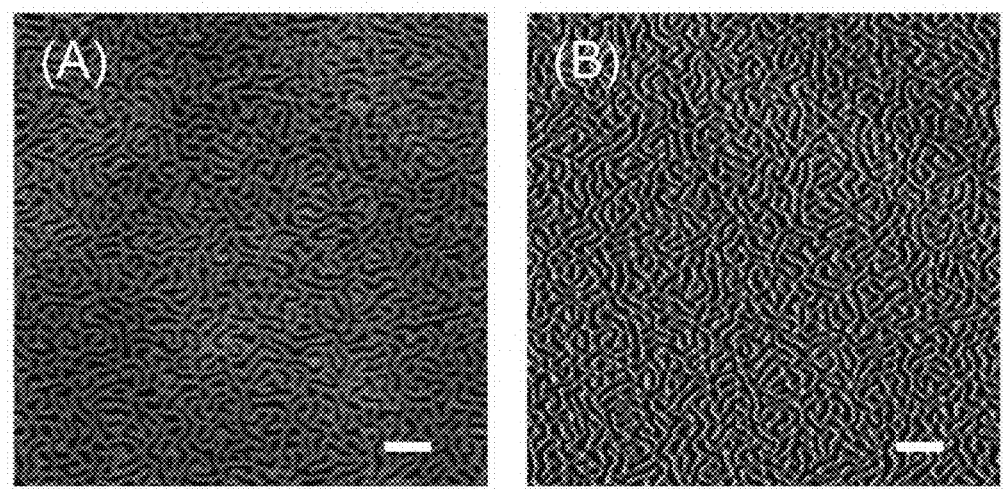
FIG. 26. SFM (A) height and (B) phase images of solvent-annealed thin films of [g-$S_{2.4k}$]$_{200}$-b-[g-$LA_{2.4k}$]$_{200}$ on Si substrate. The scale bar is 1000 nm.

When thin films of [g-$PS_{5.1k}$]$_{50}$-b-[g-$PLA_{4.4k}$]$_{50}$ with a thickness of 40.7 nm were solvent annealed with pure CBz, no clear microphase separation and no significant morphological changes before and after solvent annealing were observed even upon longer annealing time (data not shown). From the calculations of polymer-solvent interaction parameters [9], $X_{PS-CBz}$ and $X_{PLA-CBz}$ were determined to be 0.01 and 1.21, respectively, indicating that CBz is strongly poor solvent for PLA compared with PS. Therefore, chain mobility needed for effective microphase separation of [g-PS$_{5.1k}$]$_{50}$-b-[g-PLA$_{4.4k}$]$_{50}$ is insufficient due to the poor solvent property of CBz. On the other hand, when thin films of [g-PS$_{5.1k}$]$_{50}$-b-[g-PLA$_{4.4k}$]$_{50}$ were solvent annealed with mixed solvents of THF and CBz (THF/CBz), well-developed, clear microphase separation was observed, as shown in FIG. 25. FIG. 25 shows scanning force microscopy (SFM) images of thin films of [g-PS$_{5.1k}$]$_{50}$-b-[g-PLA$_{4.4k}$]$_{50}$ with a thickness of 40.7 nm after solvent annealing with THF/CBz. Effective microphase separation was propagating over the entire film as solvent annealing proceeds, and well-developed lamellae oriented perpendicular to the surface were finally obtained at the late stage of solvent annealing. It is noted that the polymer-interaction parameters of $X_{PS-THF}$ and $X_{PLA-THF}$ are calculated to be determined to be 0.15 and 0.62 [9], respectively, which means THF/CBz can give more mobility to [g-PS$_{5.1k}$]$_{50}$-b-[g-PLA$_{4.4k}$]$_{50}$ than CBz alone. A center-to-center distance (L$_2$) of well-ordered lamellar microdomains was determined to be 65.0 nm, and the step height between [g-PS] domain and [g-PLA] domain was determined to be 2.4 nm from the depth profiling of SFM images indicating the surface was almost flat without significant surface roughness. One of the important advantages of BrBCPs is that BrBCPs with ultra-high MW can easily self-assemble into well-ordered nanostructures with extremely large feature sizes due to the significantly reduced degree of entanglements. When thin films of [g-PS$_{2.4k}$]$_{200}$-b-[g-PLA$_{2.4k}$]$_{200}$ were solvent annealed with THF/CBz, well-developed lamellar microdomains oriented normal to the substrate were obtained, as shown in FIG. 26. From SFM analysis, L$_2$ is calculated to be 228.5 nm, which is large enough to be used for practical applications, for example, like polarizers and photonic band gap materials for visible lights.

Figure 27:
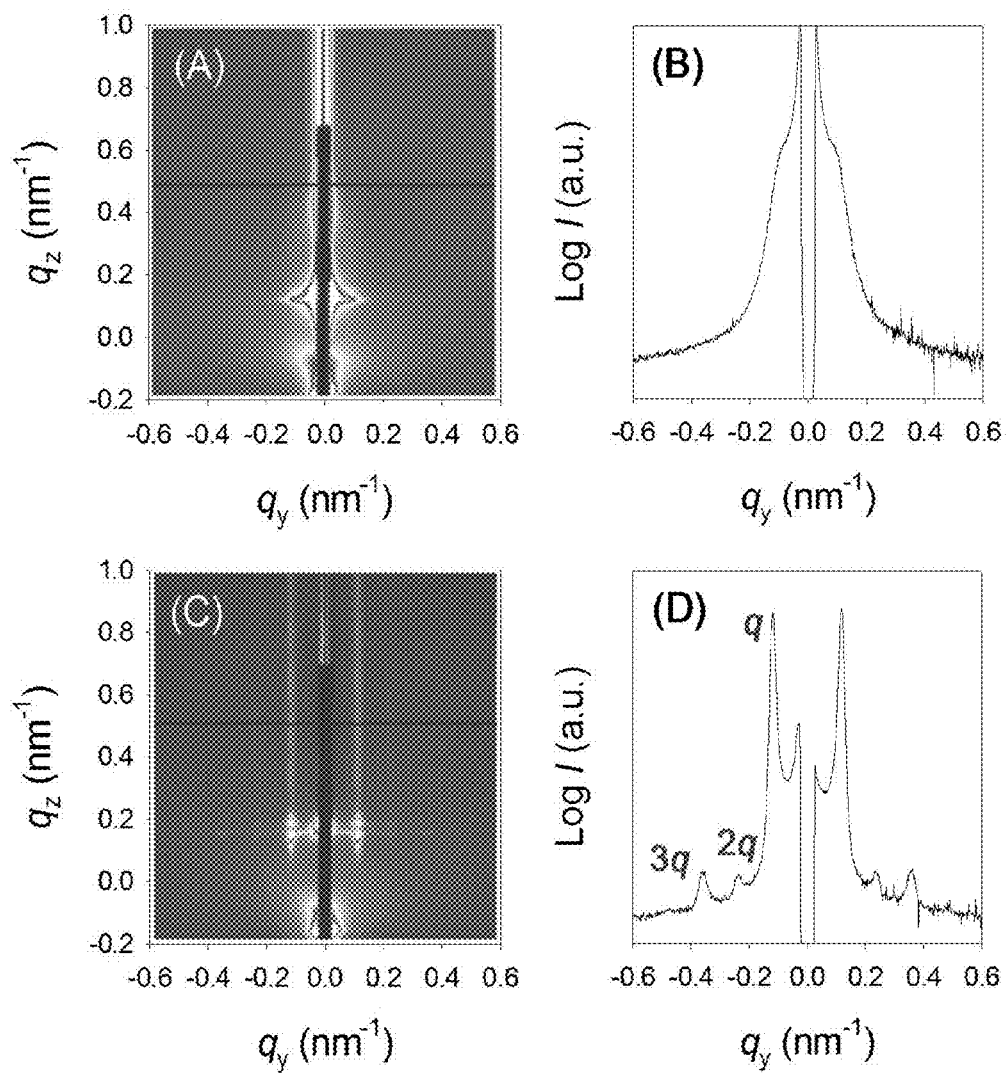
FIG. 27. GI-SAXS patterns of thin films of [g-$S_{5.1k}$]$_{50}$-b-[g-$LA_{4.4k}$]$_{50}$ on Si substrate where (A) and (C) are corresponding to the samples in FIGS. 8A and 8D, respectively. The line profiles of scattering as a function of the scattering vector in (B) and (D) are corresponding to (A) and (C). $q_y$ is the in-plane scattering vector.
Figure 28:
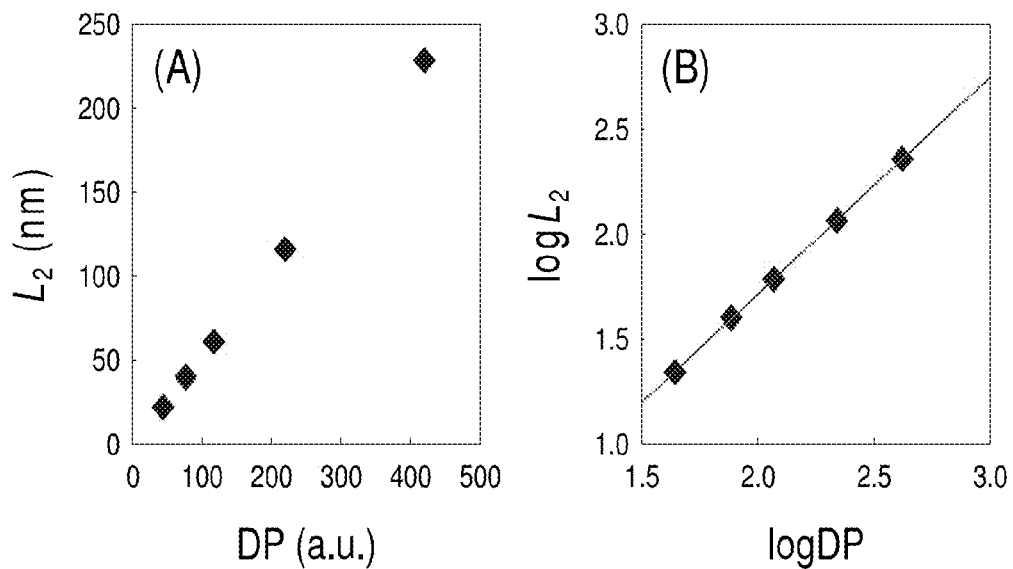
FIG. 28. (A) Plot of the center-to-center distance ($L_2$) as a function of degree of polymerization and (B) plot of log $L_2$ as a function of logDP where the red line is obtained from the results of linear regression ($R^2=0.9999$).

Grazing incidence small angle x-ray scattering was also performed to analyze the structure of thin films of BrBCPs. FIG. 27 shows the GI-SAXS patterns and the line scans along the horizon of the GI-SAXS patterns of thin films of [g-PS$_{5.1k}$]$_{50}$-b-[g-PLA$_{4.4k}$]$_{50}$ corresponding to the samples in FIG. 25. The incident angle was fixed at 0.18°, which is above the critical angle of the BrBCPs, so that the x-ray beam penetrates the polymer film. Upon solvent annealing, Bragg rods were observed at scattering vectors with magnitudes of n(L$_2$/2π), where n is an integer, as shown in FIG. 27C. FIG. 27D shows the one-dimensional profile of FIG. 27C along q$_y$ (in the plane of the film) where multiple orders of scattering were seen from this monolayer of well-developed lamellar microdomains oriented perpendicular to the substrate. From the first scattering vector, L$_2$ is calculated to be 62.0 nm, which is consistent to L$_2$ obtained from SFM image in FIG. 25D. A Series of BrBCPs were solvent annealed with THF/CBz where the MWs of g-PS and g-PLA were kept constant while degree of polymerization (DP) was varied to investigate the effect of degree of polymerization on L$_2$. GI-SAXS experiments were performed and L$_2$s for [g-S$_{2.4k}$]$_{20}$-b-[g-LA$_{2.4k}$]$_{20}$, [g-S$_{2.4k}$]$_{35}$-b-[g-LA$_{2.4k}$]$_{35}$, [g-S$_{2.4k}$]$_{50}$-b-[g-LA$_{2.4k}$]$_{50}$, and [g-S$_{2.4k}$]$_{100}$-b-[g-LA$_{2.4k}$]$_{100}$ were obtained from each first scattering vector and, due to the limitation in the sample-to-detector distance, L$_2$ for [g-S$_{2.4k}$]$_{200}$-b-[g-LA$_{2.4k}$]$_{200}$ was obtained from SFM analysis. FIG. 28 shows plots of the calculated L$_2$ as a function of DP and Table 2 shows the summary of data in FIG. 28. It should be noted that L$_2$ is proportional to the DP to the 1.03 from the results of the linear regression of FIG. 28. Considering L$_2$ of conventional BCPs in the strong segregation regime is proportional to the DP to the two third, it is reasonable to conclude that BrBCP chains in microdomains are significantly stretched compared with conventional BCPs and, to our best knowledge, this relationship has never been reported before. Currently, more details are under investigation using theories and simulations and will be reported in the separated papers soon. Interestingly, when L$_2$ (61.0 nm) for [g-PS$_{2.4k}$]$_{50}$-b-[g-PLA$_{2.4k}$]$_{50}$ and that (62.0 nm) for [g-S$_{5.1k}$]$_{50}$-b-[g-LA$_{4.4k}$]$_{50}$ are compared with each other, it is realized that the main important factor affecting L$_2$ is DP rather than the MW of brush side chains.

TABLE 3

Summary of the center-to-center distance (L$_2$) as a function of degree of polymerization (DP).

| Sample Codes | DP | L$_2$ (nm) |
| --- | --- | --- |
| [g-S$_{2.4k}$]$_{20}$-b-[g-LA$_{2.4k}$]$_{20}$ | 44 | 22.0$^a$ |
| [g-S$_{2.4k}$]$_{35}$-b-[g-LA$_{2.4k}$]$_{35}$ | 77 | 40.0$^a$ |
| [g-S$_{2.4k}$]$_{50}$-b-[g-LA$_{2.4k}$]$_{50}$ | 117 | 61.0$^a$ |
| [g-S$_{2.4k}$]$_{100}$-b-[g-LA$_{2.4k}$]$_{100}$ | 220 | 116.0$^a$ |
| [g-S$_{2.4k}$]$_{200}$-b-[g-LA$_{2.4k}$]$_{200}$ | 420 | 228.5$^b$ |

$^a$Obtained from GI-SAXS analysis;
$^b$obtained from SFM analysis due to the limitation in the sample-to-detector distance.

Figure 29:
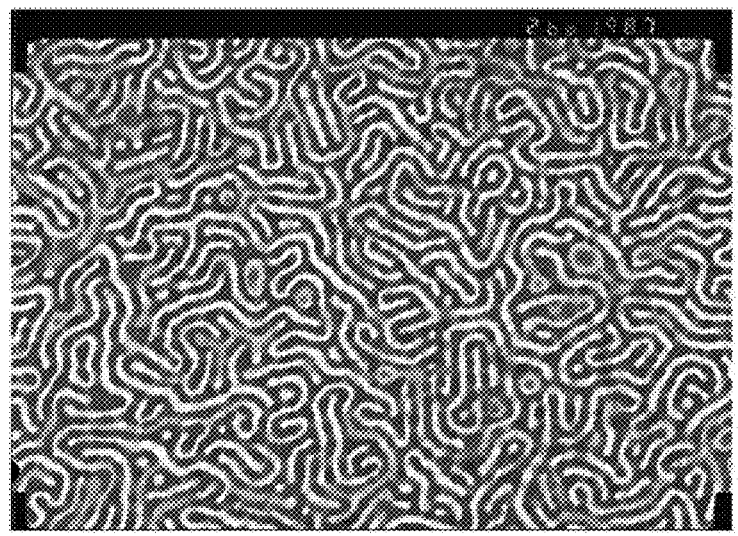
FIG. 29. TEM images of solvent-annealed thin film of [g-$S_{5.1k}$]$_{50}$-b-[g-$LA_{4.4k}$]$_{50}$ after selective etching of PLA domains by hydrolysis under basic condition.
Figure 30:
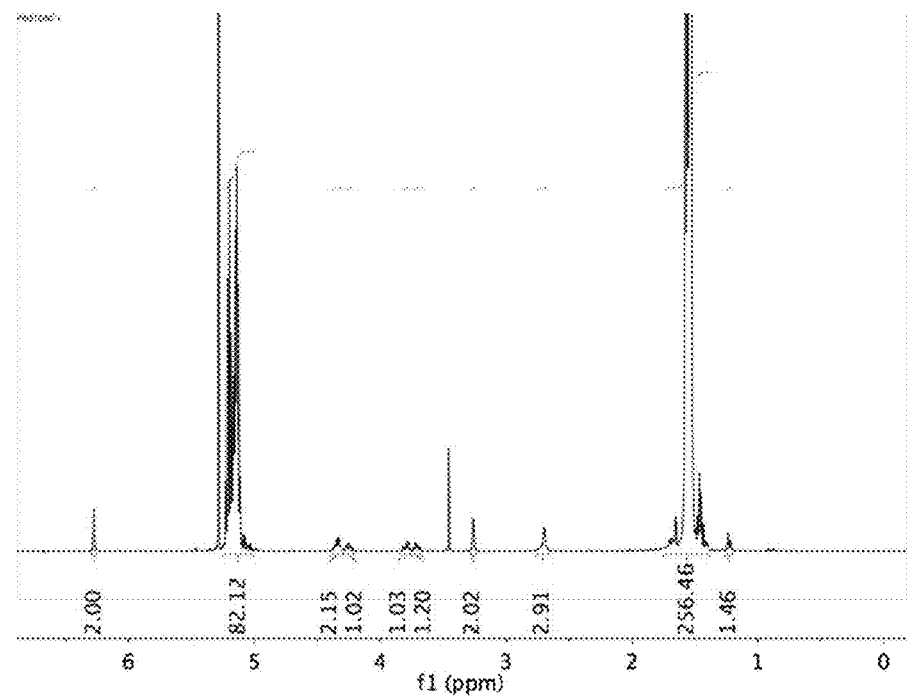
FIG. 30. $^1$H NMR spectra of L-MM.
Figure 31:
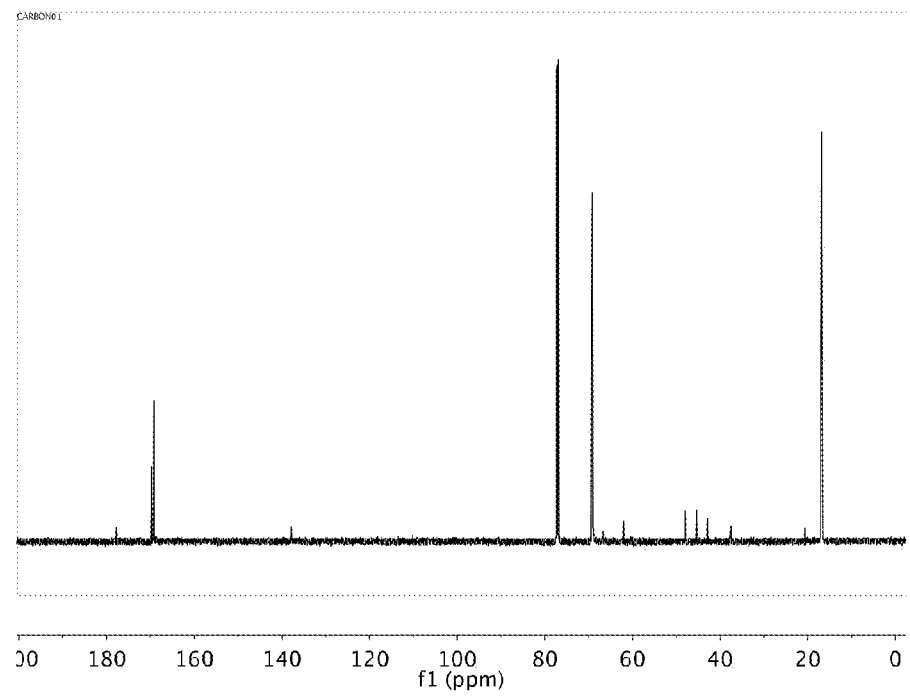
FIG. 31. $^{13}$C NMR spectra of L-MM.
Figure 32:
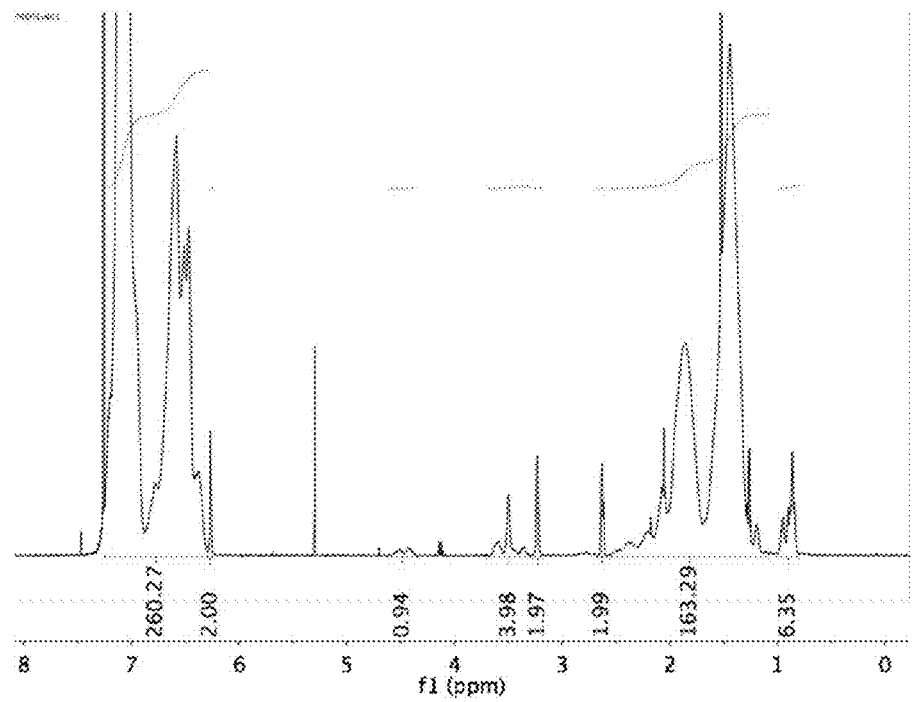
FIG. 32. $^1$H NMR spectra of S-MM.
Figure 33:
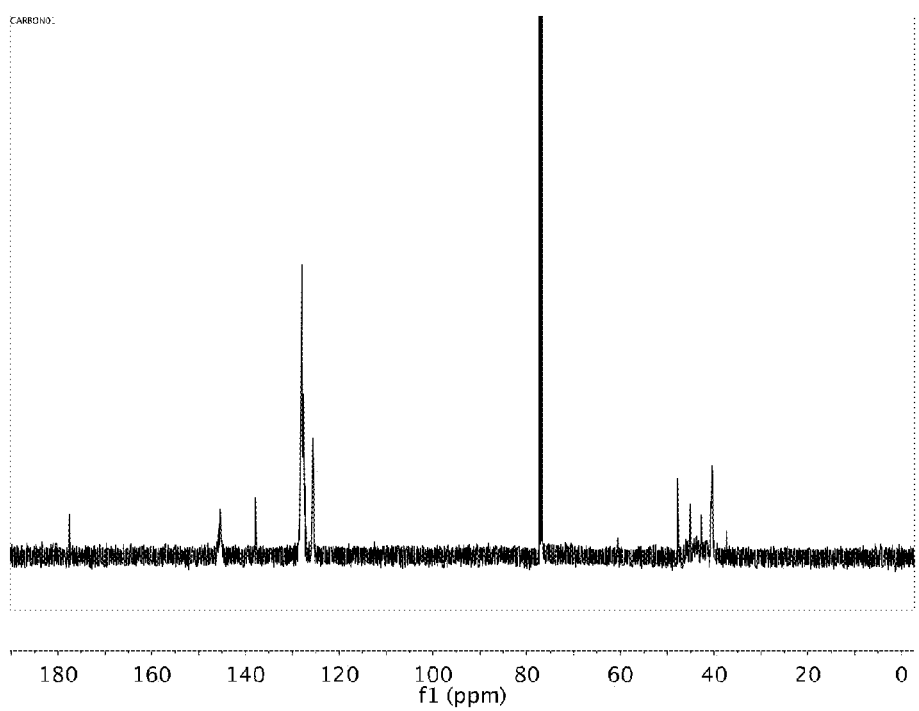
FIG. 33. $^1$H NMR spectra of a S-MM.
Figure 34:
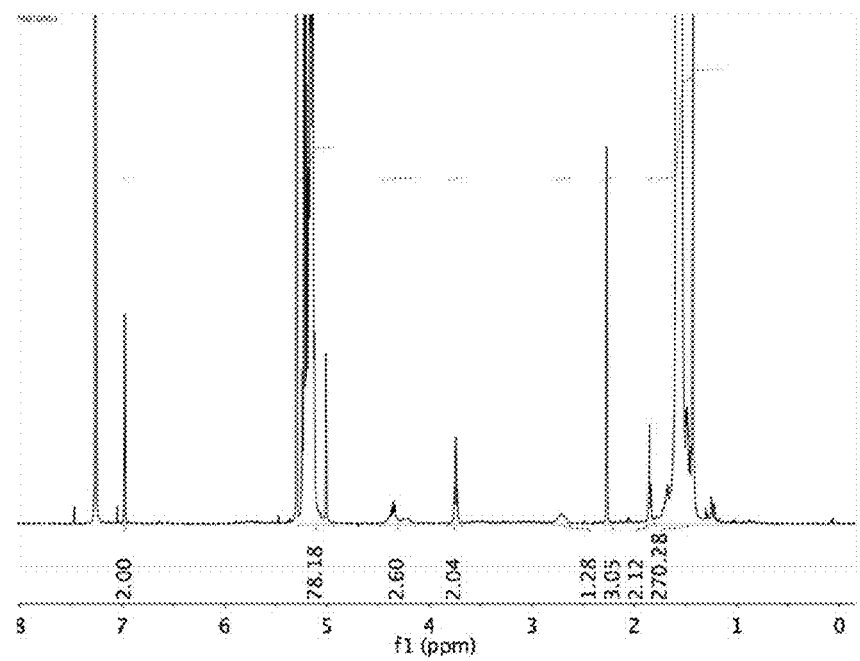
FIG. 34. $^1$H NMR spectra of M (a polylactide brush homopolymer).
Figure 35:
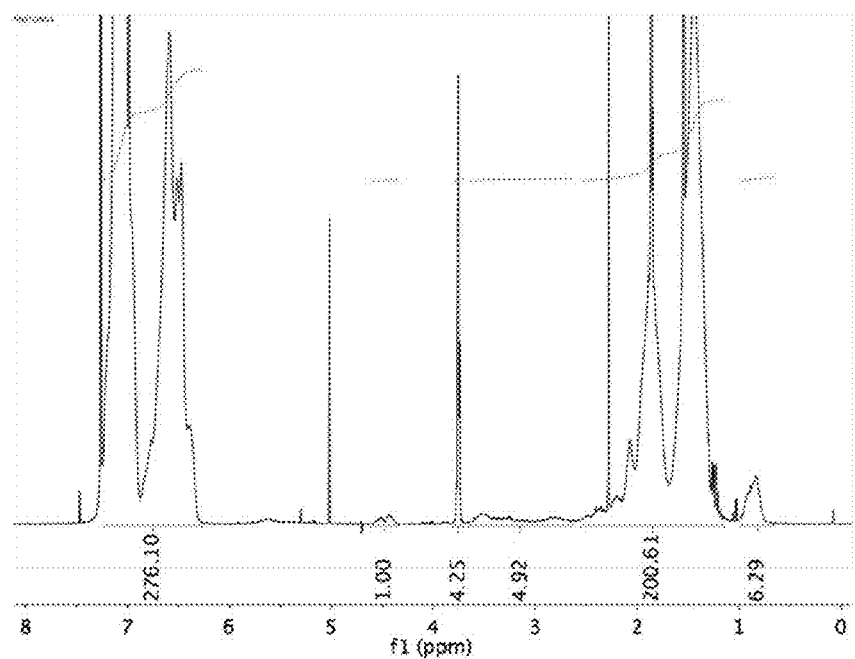
FIG. 35. $^1$H NMR spectra of N (a polystyrene brush homopolymer).
Figure 36:
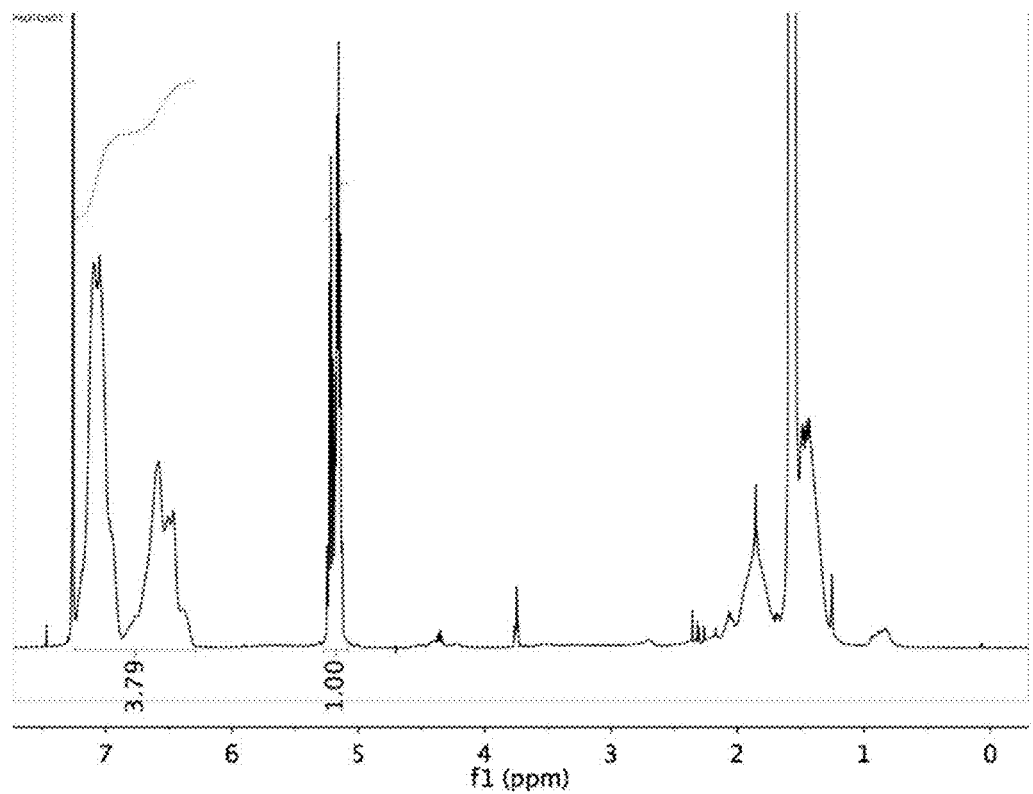
FIG. 36. $^1$H NMR spectra of E as an example of a brush block copolymer NMR spectra.
Figure 37:
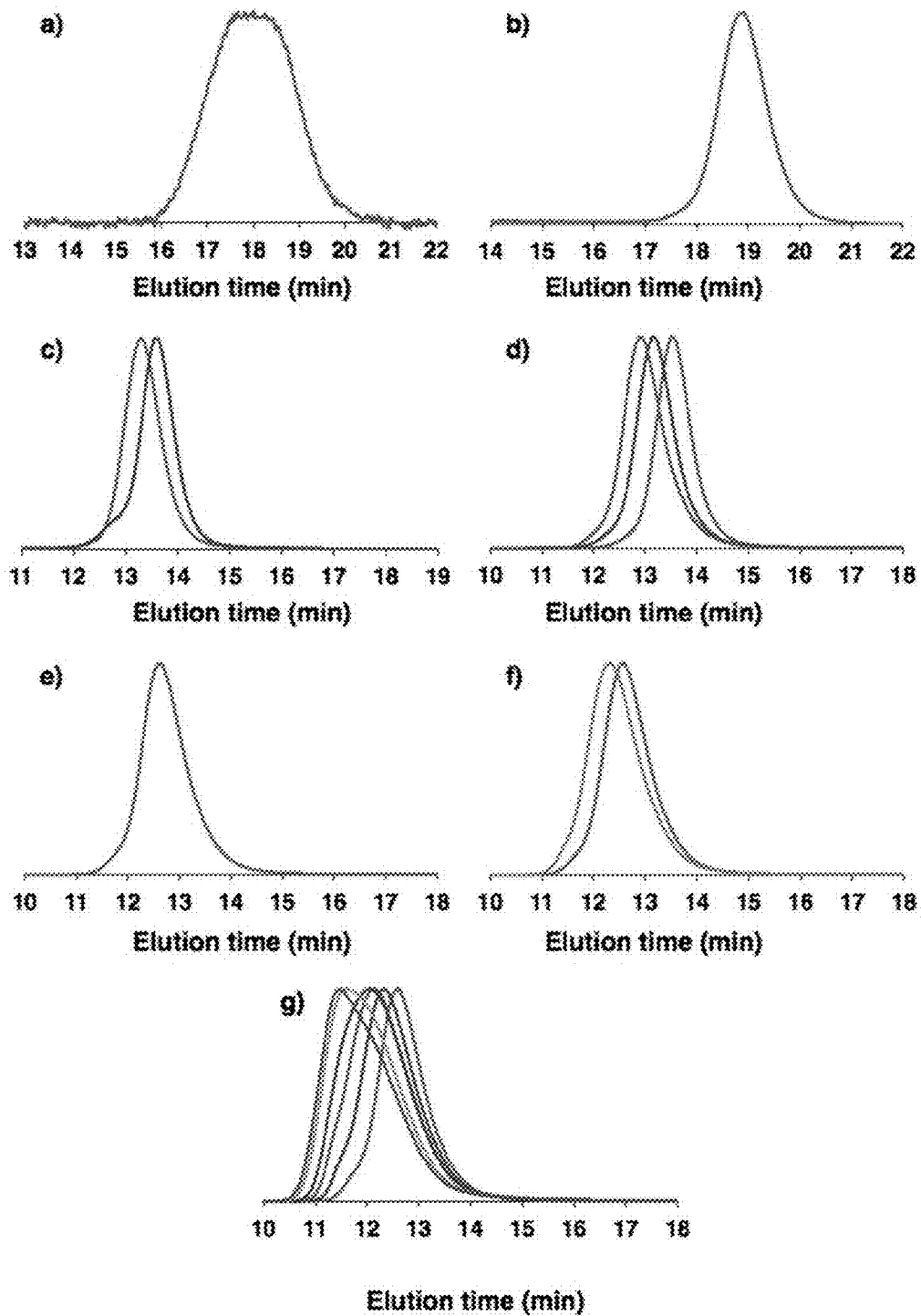
FIG. 37. GPC RI traces of the polymers synthesized using L-MM, S-MM or both. All traces were obtained from polymers purified by precipitation into methanol. Each figure represents a single sample or a group of samples that were measured as one sample set. Traces in d-g are from samples in Table 51. (a) L-MM; (b) S-MM; (c) red: M; blue: N; (d) red: A; blue: B; green: C; (e) E; (f) red: D; green: G; (g) red: F; blue: H; green: I; purple: J; orange: K; brown: L.
Figure 38:
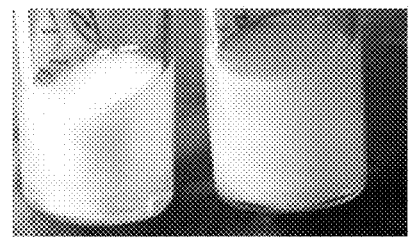
FIG. 38. A solution of a brush block copolymer reaction solution that turned colored even while it was still in solution.
Figure 39:
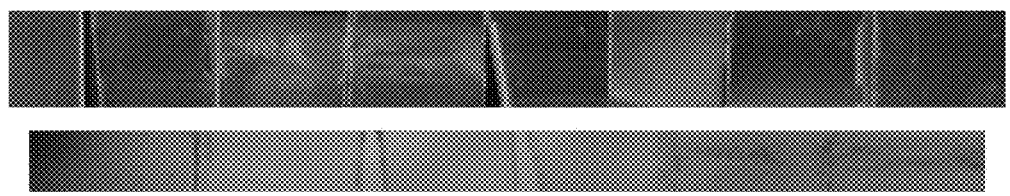
FIG. 39. Top: Reflection of films of the brush block copolymers made by controlled evaporation from DCM. From left to right are samples A-H as described in Table S1. Bottom: Transmission of films of the brush block copolymers made by controlled evaporation from DCM. From left to right are samples A-F as described in Table S1.
Figure 40:
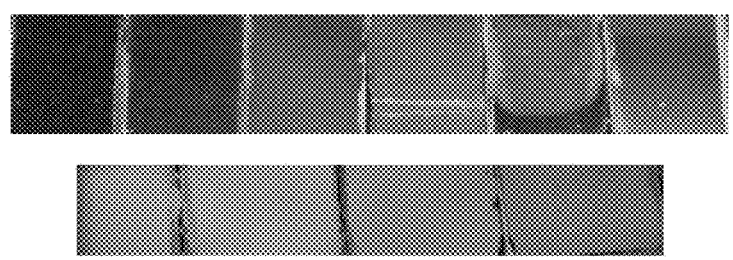
FIG. 40. Top: Reflection of films of the brush block copolymers made by controlled evaporation from THF. From left to right are samples C—H as described in Table S1. Bottom: Transmission of films of the brush block copolymers made by controlled evaporation from THF. From left to right are samples C—F as described in Table S1.
Figure 41:
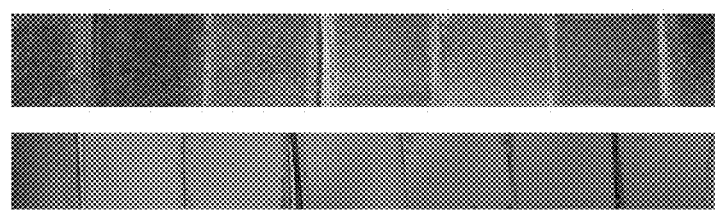
FIG. 41. Top: Reflection of films of the brush block copolymers made by controlled evaporation from THF after heating. From left to right are samples A-G as described in Table S1. Bottom: Transmission of films of the brush block copolymers made by controlled evaporation from THF after heating. From left to right are samples A-G as described in Table S1.
Figure 42:
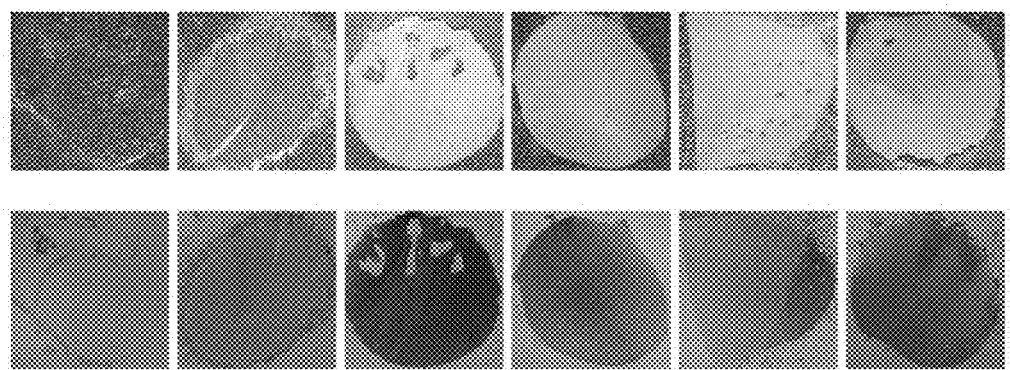
FIG. 42. Top: Reflection of films of the brush block copolymers made by thermally compression. From left to right are samples B-G as described in Table S1. Bottom: Transmission of films of the brush block copolymers made by thermal compression. From left to right are samples B-G as described in Table S1.
Figure 43:
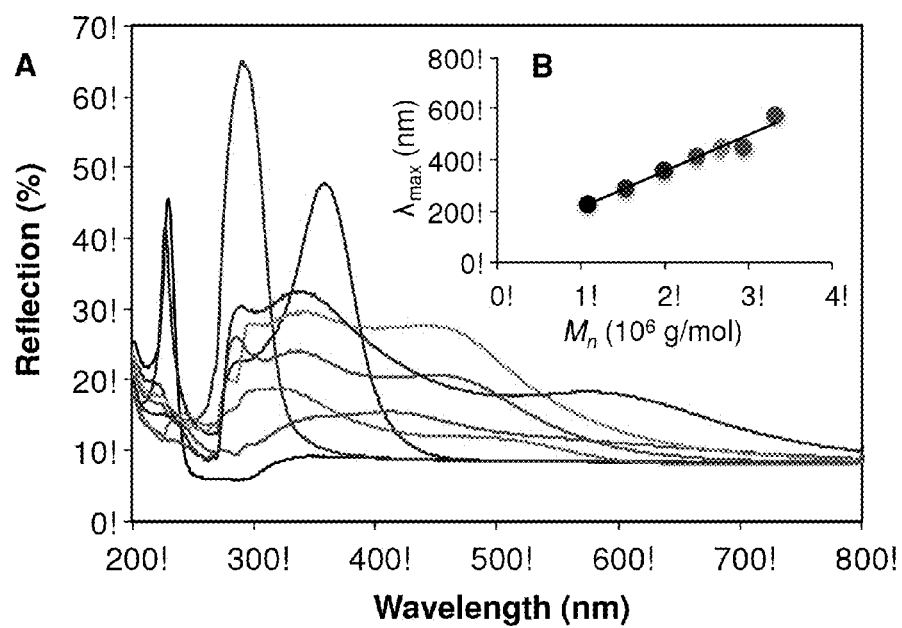
FIG. 43. A) Plot of reflectance as a function of wavelength for the films prepared from the controlled evaporation from DCM. B) Plot of $\lambda_{max}$ versus BCP MW for films prepared from the controlled evaporation from DCM.
Figure 44:
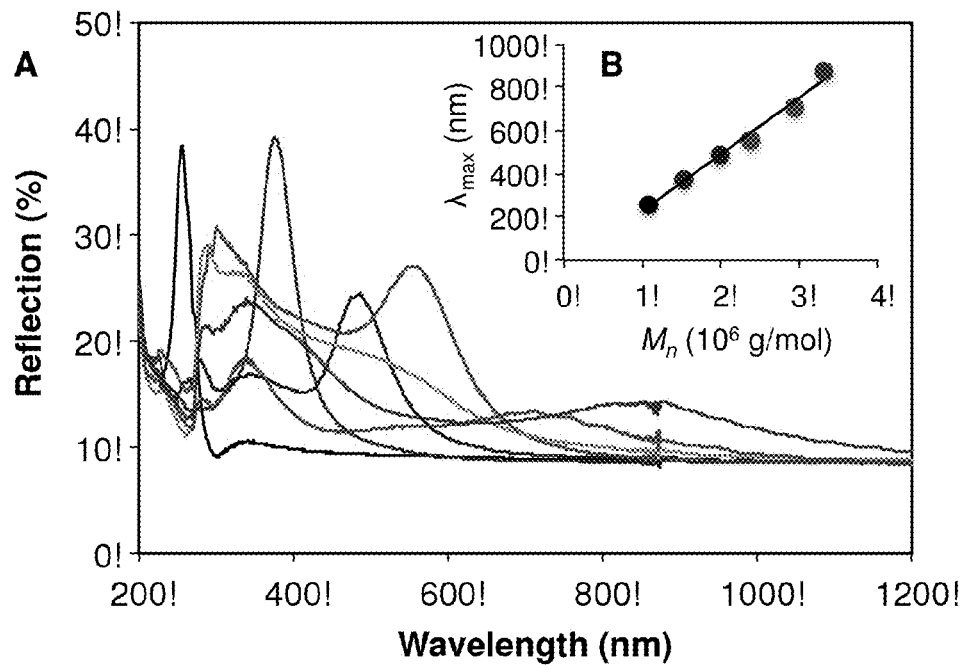
FIG. 44. A) Plot of reflectance as a function of wavelength for the films prepared from the controlled evaporation from DCM after heating. B) Plot of $\lambda_{max}$ versus BCP MW for films prepared from the controlled evaporation from DCM after heating.
Figure 45:
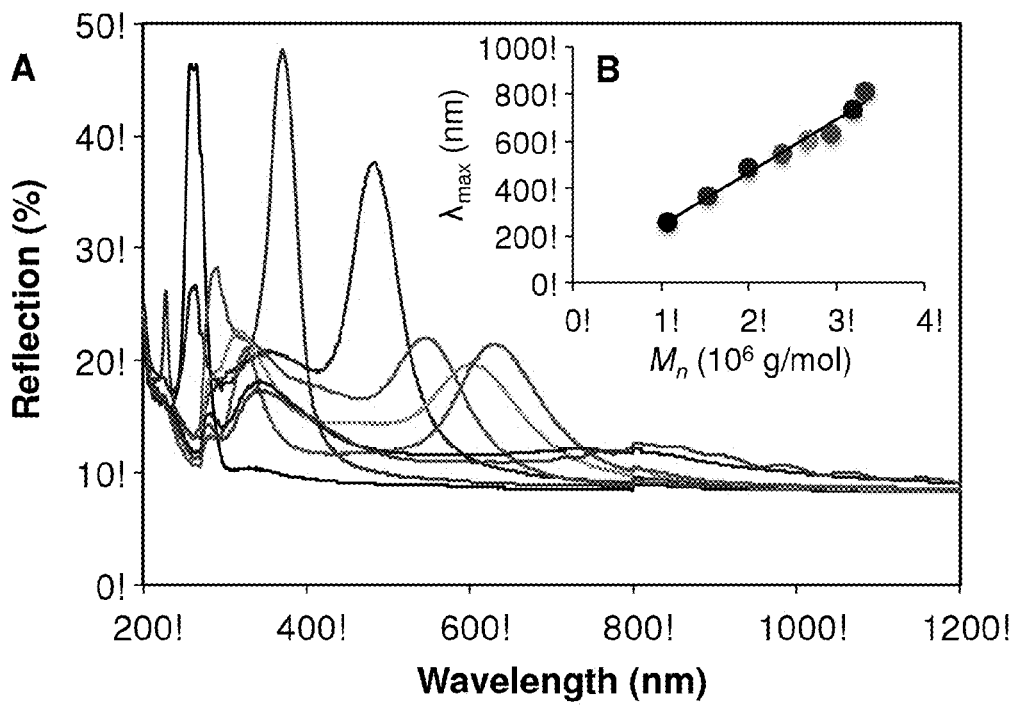
FIG. 45. A) Plot of reflectance as a function of wavelength for the films prepared from the controlled evaporation from THF after heating. B) Plot of $\lambda_{max}$ versus BCP MW for films prepared from the controlled evaporation from THF after heating.
Figure 46:
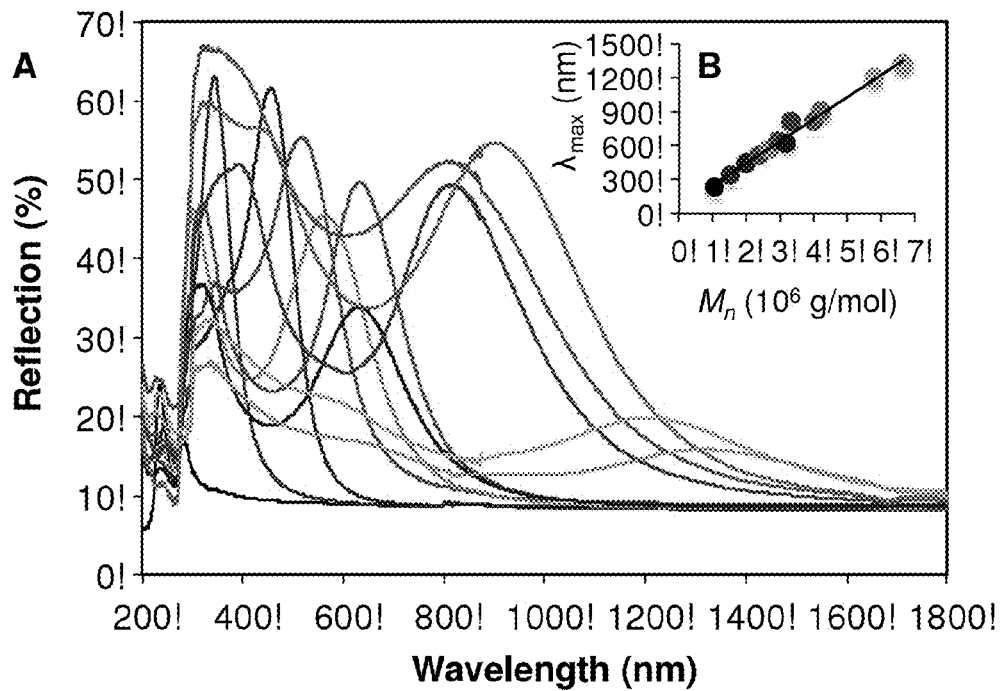
FIG. 46. A) Plot of the reflectance as a function of wavelength for the polymer side of films prepared from thermal compression. B) Plot of $\lambda_{max}$ versus BCP MW for the polymer side of films prepared from thermal compression.
Figure 47:
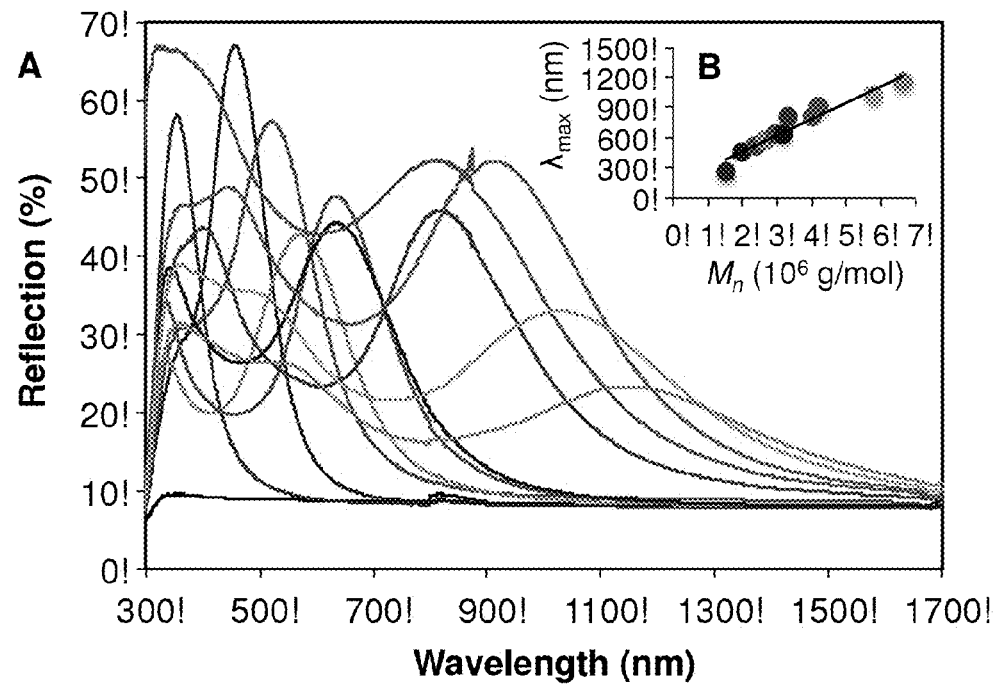
FIG. 47. A) Plot of the reflectance as a function of wavelength for the glass side of films prepared from thermal compression. B) Plot of $\lambda_{max}$ versus BCP MW for the glass side of films prepared from thermal compression.
Figure 48:
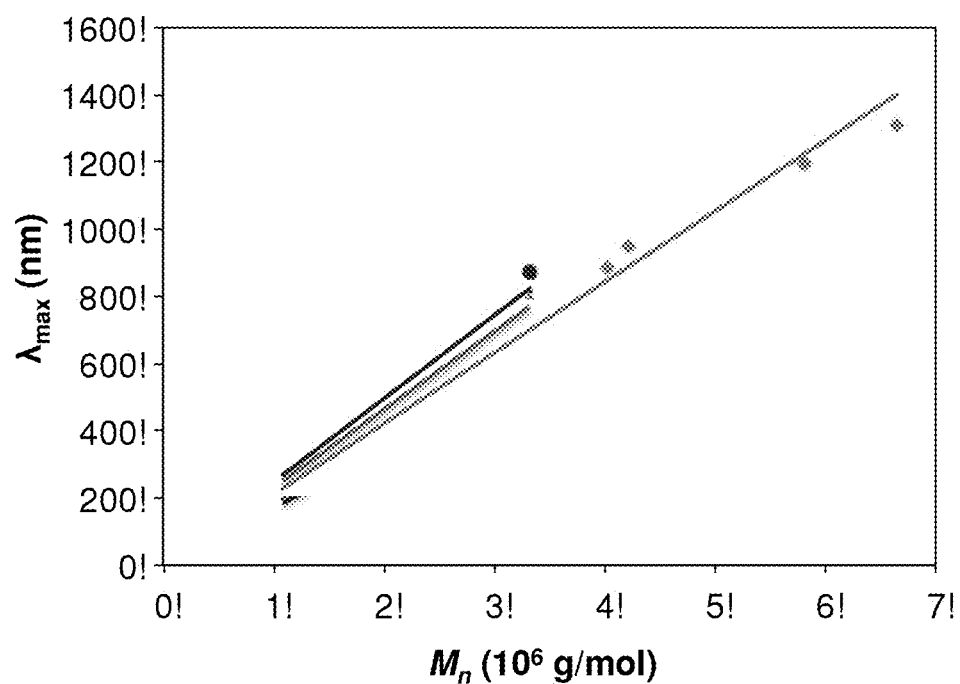
FIG. 48. Plot of $\lambda_{max}$ versus BCP MW for the glass side of films prepared from: controlled evaporation out of DCM, before (blue) and after (purple) heating, or THF, before (green) and after (red) heating, as well as by thermal compression (orange).
Figure 49:
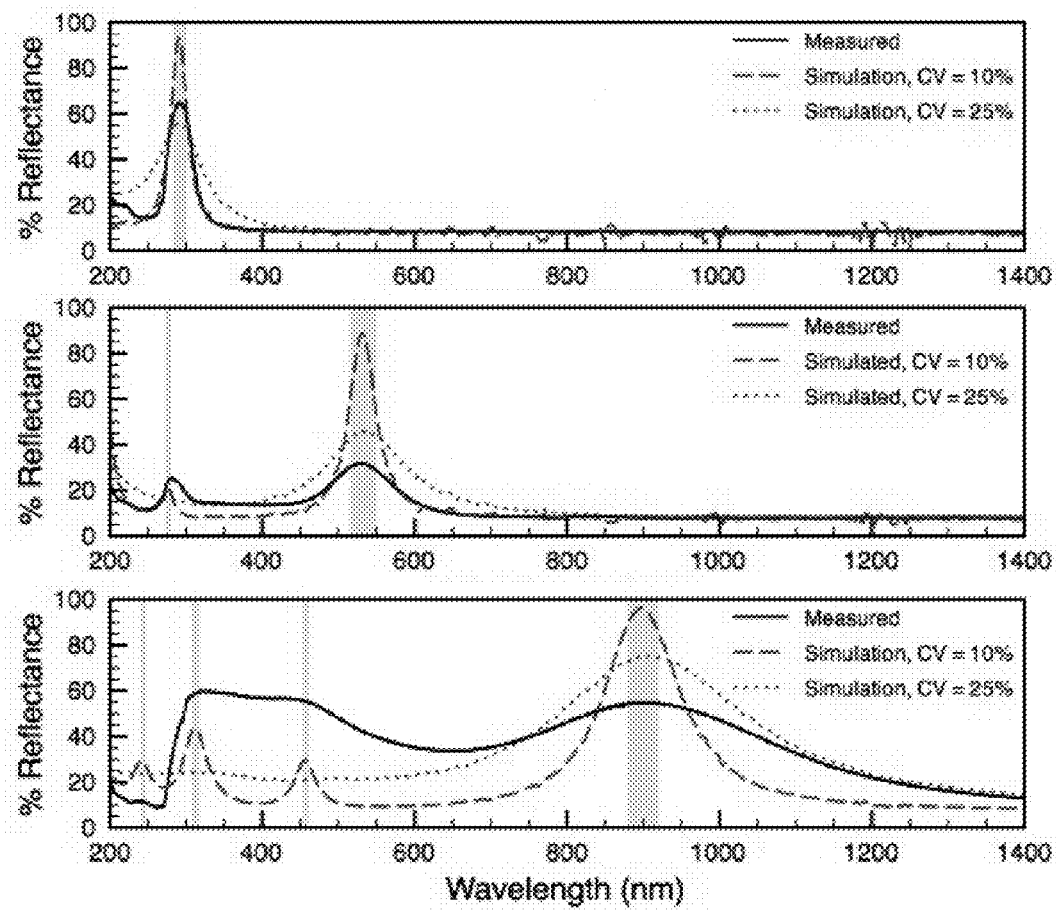
FIG. 49. The effect of the coefficient of variation of thickness on the optical simulations.
Figure 50:
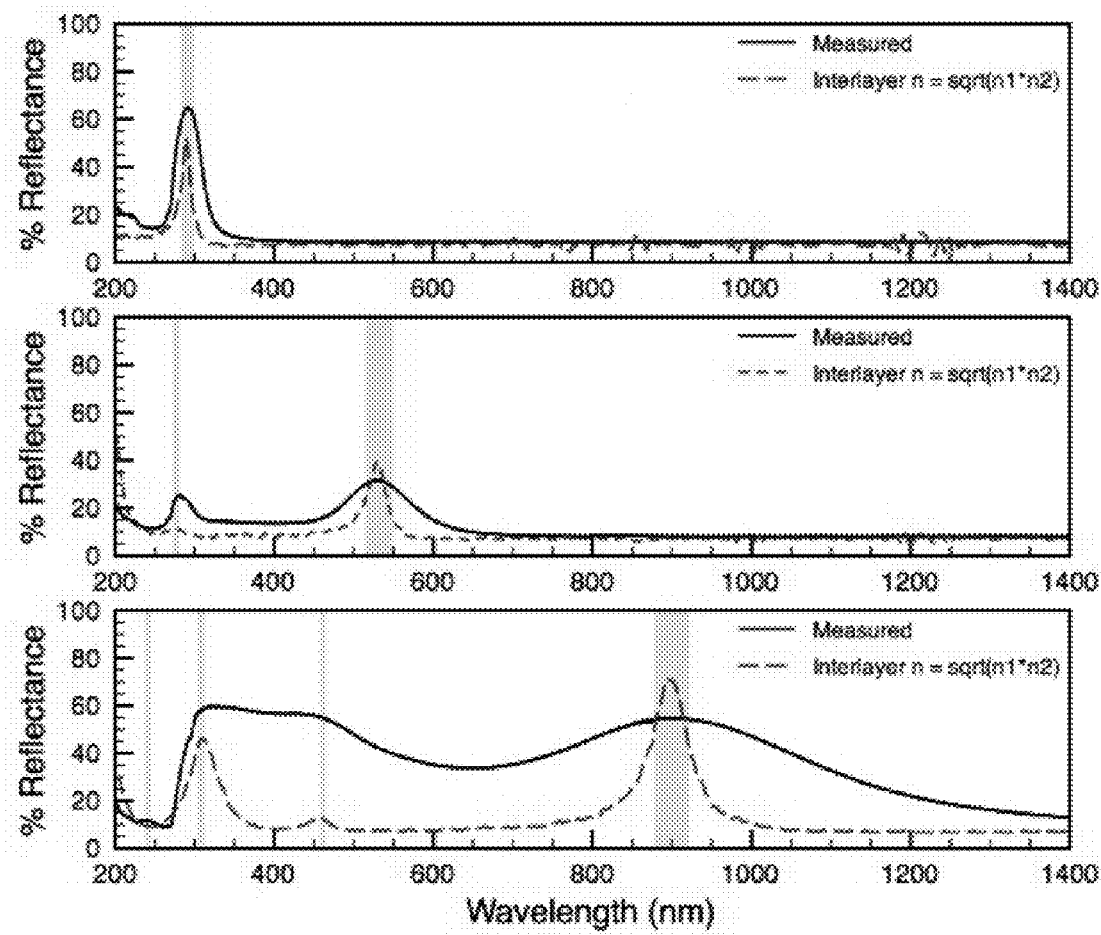
FIG. 50. Another model of roughness using an impedance matched interlayer between every PS/PLA interface.
Figure 51:
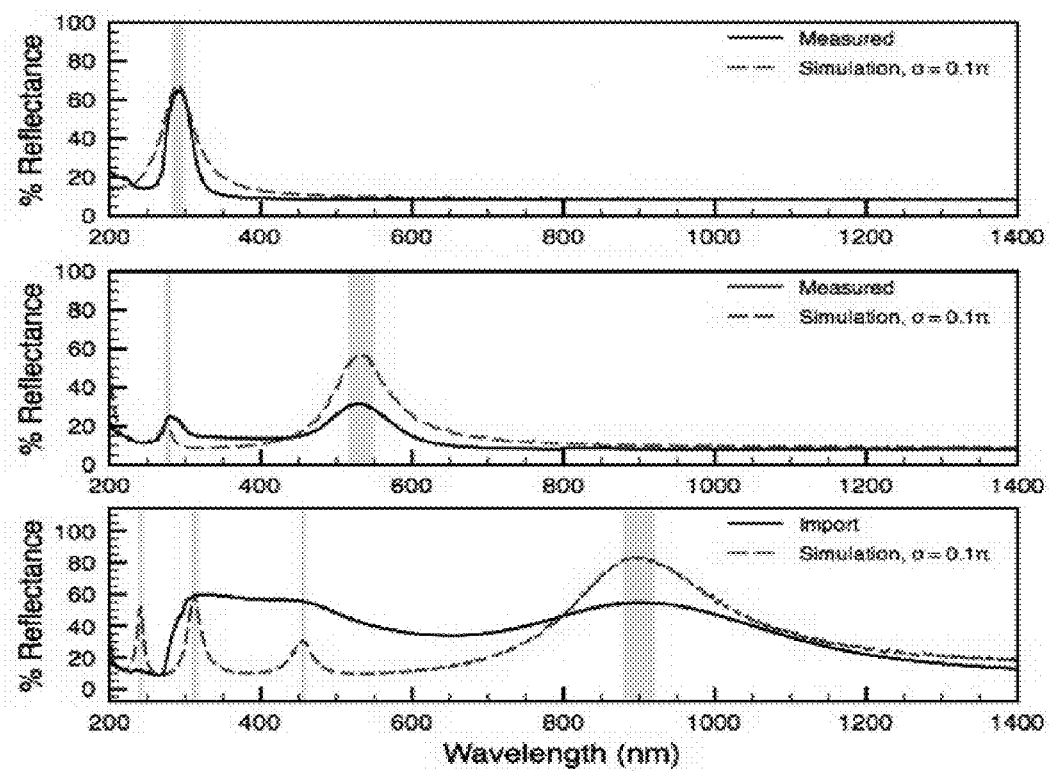
FIG. 51. Simulated spectra without any size dispersity, with partial decoherence.
Figure 52:
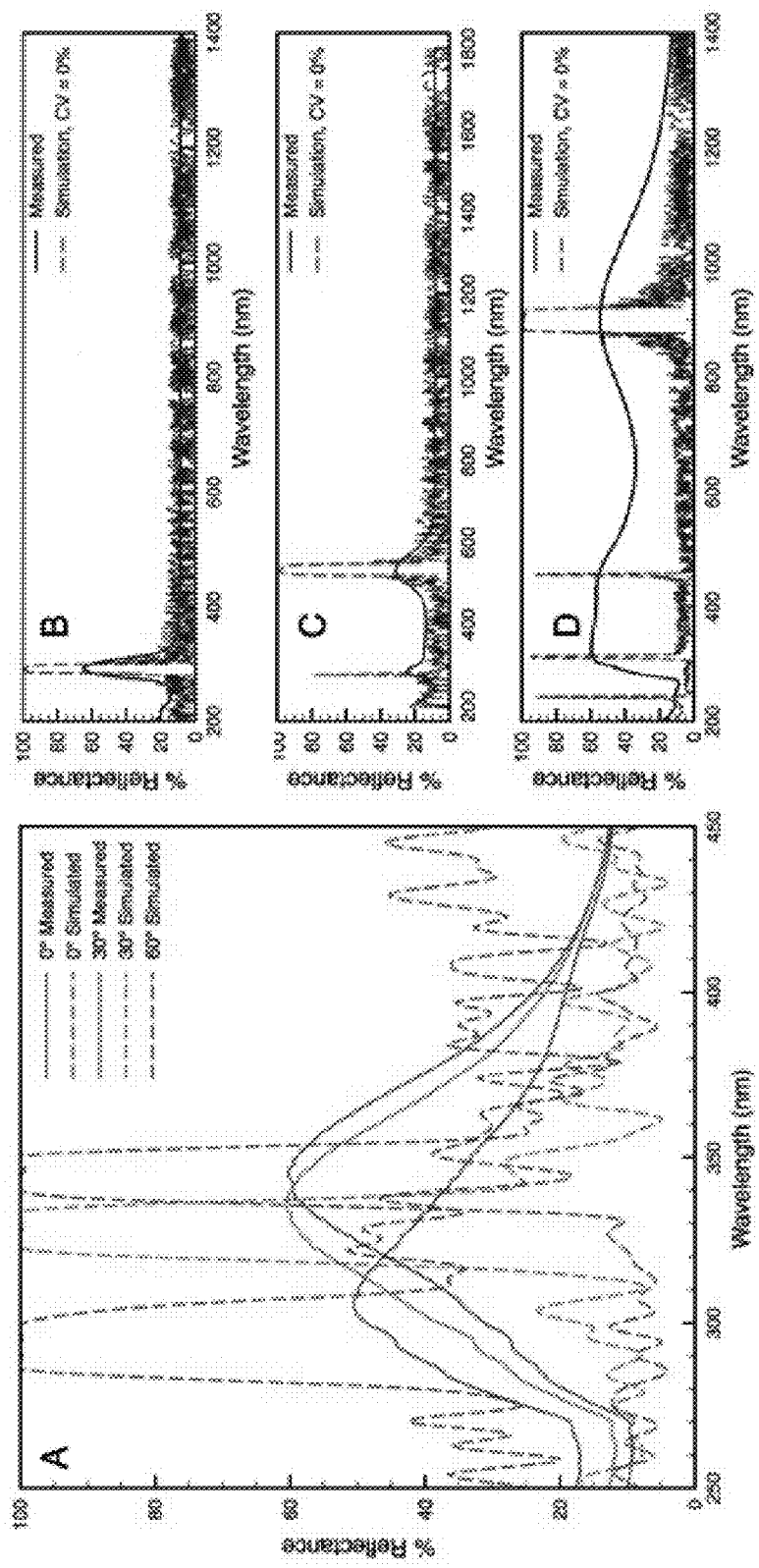
FIG. 52. Measured spectra compared to simulations of perfectly alternating multilayer structures. These plots were used to define the shaded regions of FIG. 4.
Figure 53:
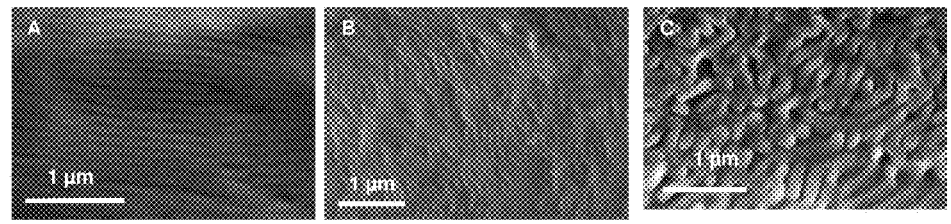
FIG. 53. SEM image of the center of a cross-section of A) B ($M_n$=1.53×10$^6$ g/mol) and B) C ($M_n$=1.99×10$^6$ g/mol) and C) F ($M_n$=2.94×10$^6$ g/mol) prepared by controlled evaporation from DCM before heating.
Figure 54:
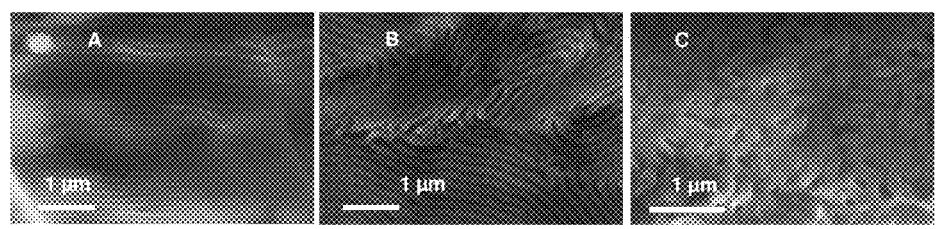
FIG. 54. SEM image of the center of a cross-section of A) B ($M_n$=1.53×10$^6$ g/mol) B) C ($M_n$=1.99×10$^6$ g/mol) and C) F ($M_n$=2.94×10$^6$ g/mol) prepared by controlled evaporation from DCM after heating.
Figure 55:
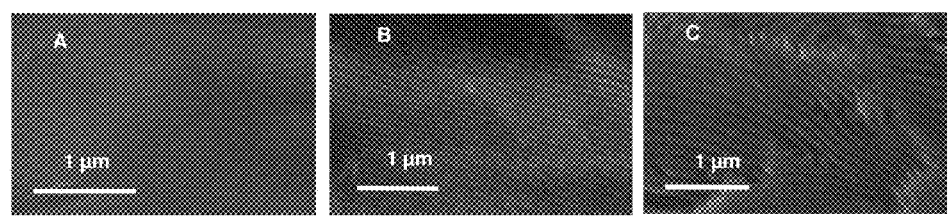
FIG. 55. SEM image of the center of a cross-section of A) B ($M_n$=1.53×10$^6$ g/mol) B) C ($M_n$=1.99×10$^6$ g/mol) and C) F ($M_n$=2.94×10$^6$ g/mol) prepared by controlled evaporation from THF before heating.
Figure 56:
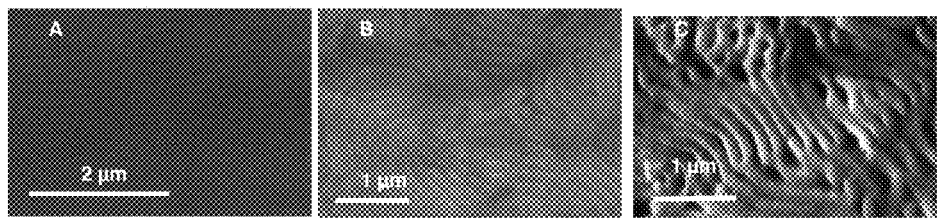
FIG. 56. SEM image of the center of a cross-section of A) B ($M_n$=1.53×10$^6$ g/mol) B) C ($M_n$=1.99×10$^6$ g/mol) and C) F ($M_n$=2.94×10$^6$ g/mol) prepared by controlled evaporation from THF after heating.
Figure 57:
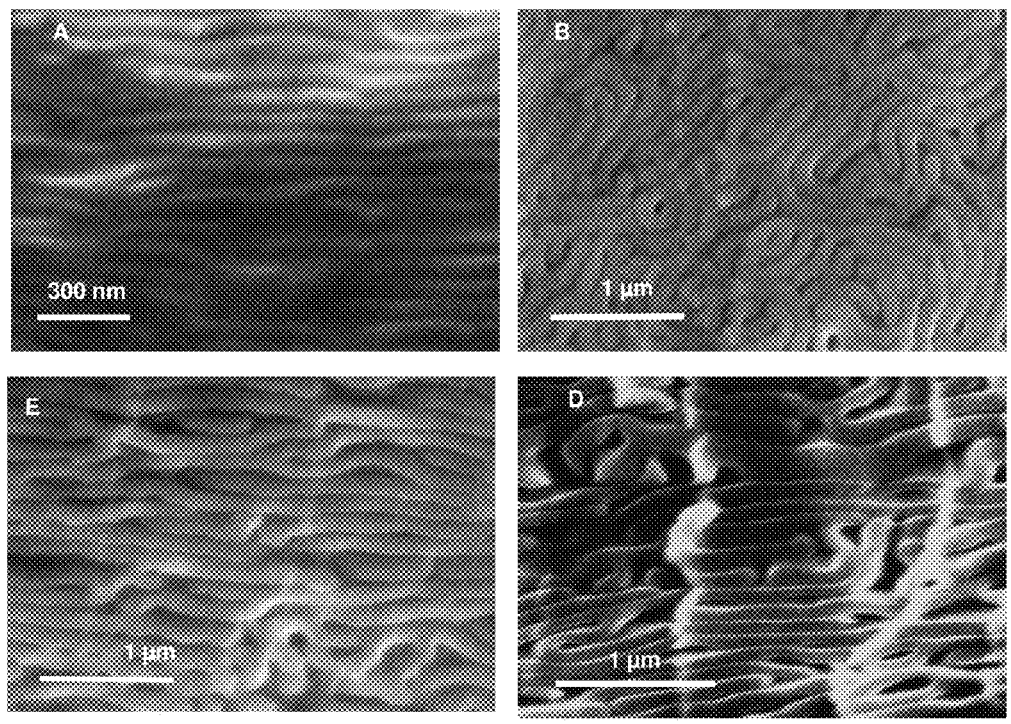
FIG. 57. SEM image of the center of a cross-section of A) B ($M_n$=1.53×10$^6$ g/mol) B) C ($M_n$=1.99×10$^6$ g/mol), C) F ($M_n$=2.94×10$^6$ g/mol) and D) K ($M_n$=5.80×10$^6$ g/mol) prepared by controlled evaporation from THF after heating.
Figure 58:
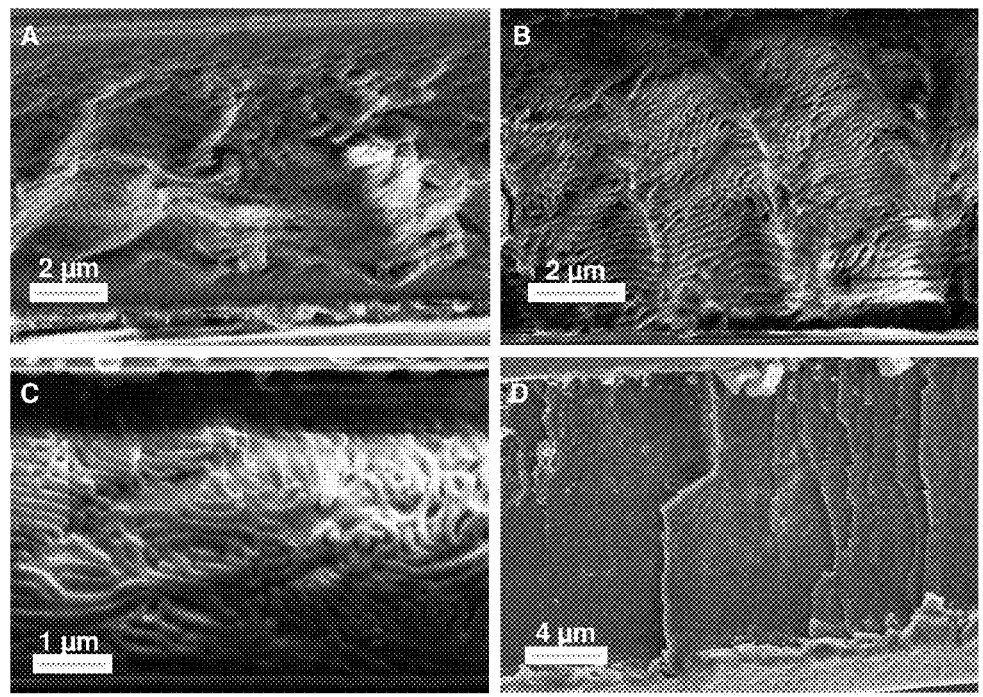
FIG. 58. SEM image of the thickness of a cross-section of F ($M_n$=2.94×10$^6$ g/mol) prepared by A) controlled evaporation from DCM, B) controlled evaporation from THF before heating and C) after heating as well as D) prepared by thermal compression. This shows that the thermally compressed film is significantly thicker than the films made from controlled evaporation. B) and C) also show that of the samples reflecting light, even the higher molecular weight films prepared by controlled evaporation from THF showed a lamellar orientation.

Importantly, porous templates and scaffolds from thin films of BrBCPs can be easily and directly obtained by selective etching PLA by either UV treatment and hydrolysis [9]. Thin films of [g-PS$_{5.1k}$]$_{50}$-b-[g-PLA$_{4.4k}$]$_{50}$ after solvent annealing with THF/CBz were immersed into basic aqueous solution to selectively remove PLA domains. From transmission electron microscopy (TEM) image in FIG. 29, it was observed that the structures of lamellae oriented perpendicular to the substrate were still preserved after hydrolysis, and those porous lamellar structures were consistent from the top surface of the film to the interface between the film and the substrate. These porous templates and scaffolds are expected to be used for enhancing an etching contrast for effective pattern transferring the original patterns onto either hard or flexible surfaces that may or may not be transparent.

Example 2

General Procedure for Norbornene-Polylactide Synthesis

In a typical experiment, the desired amount of 2 and 8 g of 3,6-dimethyl-1,4-dioxane-2,5-dione were added to a flame-dried Schlenk tube along with 2-3 drops of bis(2-ethylhexanoate)tin. This mixture was put under at least three vacuum-argon cycles and then allowed to stir at 130° C. for 2-3 hours. After cooling to room temperature the product was dissolved in dichloromethane, filtered through a small pad of celite to remove catalyst and precipitated into cold MeOH.

Example 3

General Procedure for ATRP of Polystyrene

In a typical experiment, 10 mL of styrene that had been passed through basic aluminum oxide were added to an oven-dried Schlenk tube fitted with a septum. Then, the styrene underwent three freeze-pump-thaw cycles and was subsequently frozen again. Next, the appropriate amount of CuBr (0.3 equiv to initiator) was added to the frozen styrene under argon. This mixture was put under three vacuum-argon cycles before allowing the styrene to melt under argon. The appropriate amount of PMDETA (1 equiv to CuBr) was added to the mixture via a microsyringe and the solution stirred for 5 minutes. The desired amount of initiator was subsequently added to the Schlenck tube via syringe and the reaction mixture stirred at 90° C. The reaction was stopped, before reaching 70% conversion as determined by NMR, by cooling it quickly down to room temperature using dry ice and adding THF to the mixture. The product was passed through neutral aluminum oxide to remove catalyst and precipitated into MeOH.

Example 4

General Procedure for Block Copolymerization of Two Macromonomers via ROMP

In a typical experiment, 150 mg of macromonomers were added to separate oven-dried small vials. The desired amount of catalyst was added to the third oven-dried small vial. The vials were brought into a drybox and the macromonomers were dissolved in the desired amount of THF ($[M]_0=0.05$-$0.10$ M) while the catalyst was dissolved in 1.00 mL of THF. The desired amount of catalyst solution was injected via a microsyringe to the solution of macromonomer that was estimated to polymerize faster. When the first block was estimated to have formed[21] [(REF)] the solution of the second macromonomer was added to the reaction mixture. This solution was allowed to stir for an additional 1-2 hours. The reaction was moved out of the dry box, quenched with ethyl vinyl ether and isolated by precipitation into MeOH.

Example 5

Slow Evaporation Annealing

The solid polymer is put in a vial and dissolved there in a solvent (e.g. dichloromethane or tetrahydrofuran). Then a glass slide is put into the solvent and the solvent is allowed to evaporate slowly at room temperature.
The glass slide can subsequently be heated at 120° C. for a few hours (2-3) which can result in a shift in the domain spacing and resulting photonic bandgap.

Example 6

Thermal Annealing Between Two Glass Slides

The solid polymer was put between a glass slide and another slide put on top and clamped together to provide some pressure on the polymer. The glass slides, clamped together are then heated in an oven or a vacuum chamber at elevated temperatures (such as 120-150° C. for the polylactide-polystyrene system). The polymer forms a film with photonic material properties.

REFERENCES

[1] [1] a) M. Park, C. Harrison, P. M. Chaikin, R. A. Register, D. H. adamson, Science 1997, 276, 1401; b) R. R. Li, et al., Appl. Phys. Lett. 2000, 76, 1689; c) T. Thurn-Albrecht et al., Science 2000, 290, 2126; d) H. C. Kim, et al., Adv. Mater. 2001, 13, 795; e) J. Y. Cheng, et al., Adv. Mater. 2001, 13, 1174; f) C. T. Black, Appl. Phys. Lett. 2001, 79, 409; g) W. A. Lopes, H. M. Jaeger, Nature, 2001, 414, 735; h) C. T. Black, Appl. Phys. Lett. 2005, 87, 163116; i) V. Pelletier, K. Asakawa, M. Wu, D. H. Adamson, R. A. Register, P. M. Chaikin, Appl. Phys. Lett. 2006, 88, 211114; j) Y. Kang, et al., Nat. Mater. 2007, 6, 957; k) J. Y. Cheng, C. A. Ross, H. I. Smith, E. L. Thomas, Adv. Mater. 2006, 18, 2505; l) R. Luttge, J. Phys. D: Appl. Phys. 2009, 42, 123001; m) J. Xu, S. W. Hong, W. Gu, K. Y. Lee, D. S. Kuo, S. Xiao, T. P Russell, Adv. Mater. 2011, 22, 5755.

[2] a) F. S. Bates, G. H. Fredrickson, Ann. Rev. Phys. Chem. 1990, 41, 525; b) I. W. Hamley, Nanotechnology 2003, 14, R39; c) C. Park, J. Yoon, E. L. Thomas, Polymer 2003, 44, 6725; d) R. A. Segalman, Materials Science and Engineering 2005, R48, 191; e) M. P. Stoykovich, P. F. Nealey, Materials Today 2006, 9, 20; f) J. Bang, U. Jeong, D. Y. Ryu, T. P. Russell, C. J. Hawker, Adv. Mater. 2009, 21, 1; g) A. P. Marencic, R. A. Register, Annu. Rev. Chem. Bimol. Eng. 2010, 1, 277; h) J. N. L. Albert, T. H. Epps, III, Materials Today 2010, 13, 24; i) Y.-C. Tseng, S. B. Darling, Polymers 2010, 2, 470.

[3] Y. Kang, J. J. Walish, T. Gorishnyy, E. L. Thomas, Nat. Mater. 2007, 6, 957.

[4] U. F. Gedde, Polymer Physics, Chapman & Hall, London 1995.

[5] a) J. D. Joannopoulos, R. D. Meade, J. N. Winn, Photonic crystals, Princeton University Press, Princeton 1995; b) A. C. Edrington, A. M. Urbas, P. DeRege, C. X. Chen, T. M. Swager, N. Hadjichristidis, M. Xenidou, L. J. Fetters, J. D. Joannopoulos, Y. Fink, E. L. Thomas, Adv. Mater. 2001, 13, 421.

[6] a) N. P. Hadjichristidis, M. Pitskalis, S. Pispas, H. Iatrou, Chem. Rev. 2001, 101, 3747; b) S. S. Sheiko, M. Möller, Chem. Rev. 2001, 101, 4099; c) M. Zhang, A. H. E. Müller, J. Polym. Sci., Part A: Polym. Chem. 2005, 43, 3461; d) M. B. Runge, N. B. Bowden, J. Am. Chem. Soc. 2007, 129, 10551; e) M. B. Runge, C. E. Lipscomb, L. R. Ditzler, M. K. Mahanthappa, A. V. Tivanski, N. B. Bowden, Macromolecules 2008, 41, 7687; f) Y. Xia, B. D. Olsen, J. A. Kornfield, R. H. Grubbs, J. Am. Chem. Soc. 2009, 131, 18525; g) J. Rzayev, Macromolecules 2009, 42, 2135.

[7] a) D. Neugebauer, B. S. Sumerlin, K. Matyjaszewski, B. Goodhart, S. S. Sheiko, Polymer 2004, 45, 8173; b) M. Schappacher, A. Deffieux, Macromolecules 2005, 38, 7209; c) H. Gao, K. Matyjaszewski, J. Am. Chem. Soc. 2007, 129, 6633; d) B. S. Sumerlin, D. Neugebauer, K. Matyjaszewski, Macromolecules 2007, 40, 5559; e) D. Lanson, M. Schappacher, R. Borsali, A. Deffieux, Macromolecules 2007, 38, 702; f) D. Lanson, M. Schappacher, R. Borsali, A. Deffieux, Macromolecules 2007, 40, 9503; g) H.-I. Lee, K. Matyjaszewski, S. Yu-Su, S. S. Sheiko, Macromolecules 2008, 41, 6073.

[8] N. Hadjichristidis, M. Pitsikalis, H. Iatrou, S. Pispas, Macromol. Rapid Commun. 2003, 24, 979.

[9] M. Vayer, M. A. Hillmyer, M. Dirany, G. Thevenin, R. Erre, C. Sinturel, Thin Solid Films 2010, 518, 3710.

Example 3

Rapid Self-Assembly of Block Copolymers to Photonic Crystals

Abstract

The reduced chain entanglement of brush polymers over their linear analogs drastically lowers the energetic barriers to reorganization. In this report, we demonstrate the rapid self-assembly of block copolymers to nanostructures with photonic bandgaps spanning the entire visible spectrum, from ultraviolet (UV) to near infrared (NIR). Linear relationships were observed between the peak wavelengths of reflection and polymer molecular weights. This work enables 'bottom-up' fabrication of photonic crystals with application-tailored bandgaps, through synthetic control of the polymer molecular weight and the method of self-assembly. These polymers could be developed into NIR-reflective paints, to combat the 'urban heat island effect' due to NIR photon thermalization.

The rich morphologies afforded by the self-assembly of block copolymers (BCPs) yield versatile hybrid materials with diverse applications (1), such as lithographic templates (2), solid electrolytes (3) and photonic crystals (PCs) (4). When the domain periodicities of typical copolymer structures reach hundreds of nanometers, the effective optical lengths of the domains approach visible wavelengths. The resulting periodic modulation of the dielectric function can yield a photonic bandgap near the visible; within this gap there are no allowed frequencies at which light can propagate through the material (5). The one-dimensional case, consisting of a stack of alternating layers, is termed a dielectric (or Bragg) mirror. This simple architecture forms the basis for a variety of modern optical elements, including filters, antireflection coatings and resonant cavities. Recently, very high molecular weight block copolymers have enabled chemically and mechanically tunable PCs at visible frequencies (4, 6-8), providing a versatile platform for the development of unique nanostructures with exciting possibilities for functional, moldable and paintable PCs.

For many applications, such as dielectric mirrors, broadband reflection is a requirement. Typically, this is accomplished by employing materials with high refractive index contrast (9). Size dispersity in multilayer structures offers another approach to broadband reflection. In this way, the inherent dispersity in self-assembled systems can be employed advantageously. In this report, we demonstrate broadband reflection into the NIR with two low index materials, with a refractive index contrast of only ~0.1. Because self-assembly methods easily provide dozens to hundreds of layers, a reflection coefficient of unity can, in principle, be obtained. To realize truly paintable photonic crystals, self-assembly must occur rapidly with little or no processing to yield dry, robust ordered nanostructures. This future technology has many potential applications, for example as photonic cladding for telecommunications fibers and NIR reflective paints, which could be employed as surface coatings to improve energy efficiency in urban environments, combating the 'urban heat island effect' by reflecting infrared radiation that would otherwise thermalize.

Traditionally, PCs have been fabricated using 'top-down' techniques such as layer-by-layer stacking (10), electrochemical etching (11), multibeam holography (12), and phase mask lithography (13). These techniques offer the advantage of precision, but require complex apparatus and many processing steps. Colloidal assembly represents a 'bottom-up' approach to PC fabrication (14,15), although it is generally limited to face-centered cubic geometries. While colloidal templating is rapid and inexpensive, infilling with high refractive index inorganic materials is usually required to access a full photonic bandgap (14,15). BCP nanostructures offer an attractive solution because they can be prepared from commodity chemicals and synthetically tuned to yield a wide range of geometries and functionalities with unique chemical, mechanical and optical properties.

The typically slow and complex self-assembly of BCPs inhibits their ability to assemble to domain sizes large enough to reflect long wavelengths of visible light. The primary antagonist to self-assembly is chain entanglement—a defining characteristic of polymers, which significantly impedes high molecular weight (MW) polymers from achieving large, ordered domains. The domain spacing beyond 100 nm is a significant challenge for BCPs (16-18), because the entanglement of high MW polymers presents a large kinetic barrier, despite the large thermodynamic driving force to microphase segregation. As a result, high MW BCPs often end up in a kinetically trapped state; equilibration is prohibited at a practical time scale. To overcome the practical limitations to the domain sizes and refractive indices of typical BCPs, assembled nanostructures are often swollen with additives, including small molecules (4,6,19), inorganic nanoparticles (20), or other polymers (17) to achieve photonic bandgaps in the visible and NIR. The complex annealing procedures and additives demanded by much of the work to date on polymer PCs represent a huge barrier to the practical implementation of BCPs as commercially viable optical elements. As chain entanglement presents a fundamental energetic barrier to the reorganization of high MW BCPs into large, ordered nanostructures, it is a logical focal point for developing methods to surmount these limitations. In this report we employ a non-linear macromolecular architecture with significantly reduced entanglement, the brush copolymer (22), to render rapid self-assembly into photonic crystals with tunable reflection across the entire visible spectrum and into the NIR.

Brush copolymers with high MW, low polydispersity index (PDI), and complete side chain grafting remain challenging targets for synthetic polymer chemists. There are many approaches to these macromolecules, each with their own obstacles (23,24). In the "grafting through" or macromonomer (MM) method, the side chain containing a terminal monomer is synthesized first and subsequently polymerized to yield the resulting brush polymer (23,25). This approach ensures complete grafting of a well-defined side chain on every backbone monomer unit, however it requires an extremely robust polymerization mechanism to achieve high MW while maintaining control of the PDI (24). Our group has recently utilized ruthenium (Ru) mediated ring-opening metathesis polymerization (ROMP) as an efficient means to convert MMs to well-defined high MW brush polymers (22, 26-29). Brush BCPs prepared by this route were observed to spontaneously assemble into large ordered nanostructures (>100 nm) (27), which piqued our interest in applying this approach to photonic crystals.

Figure 21:
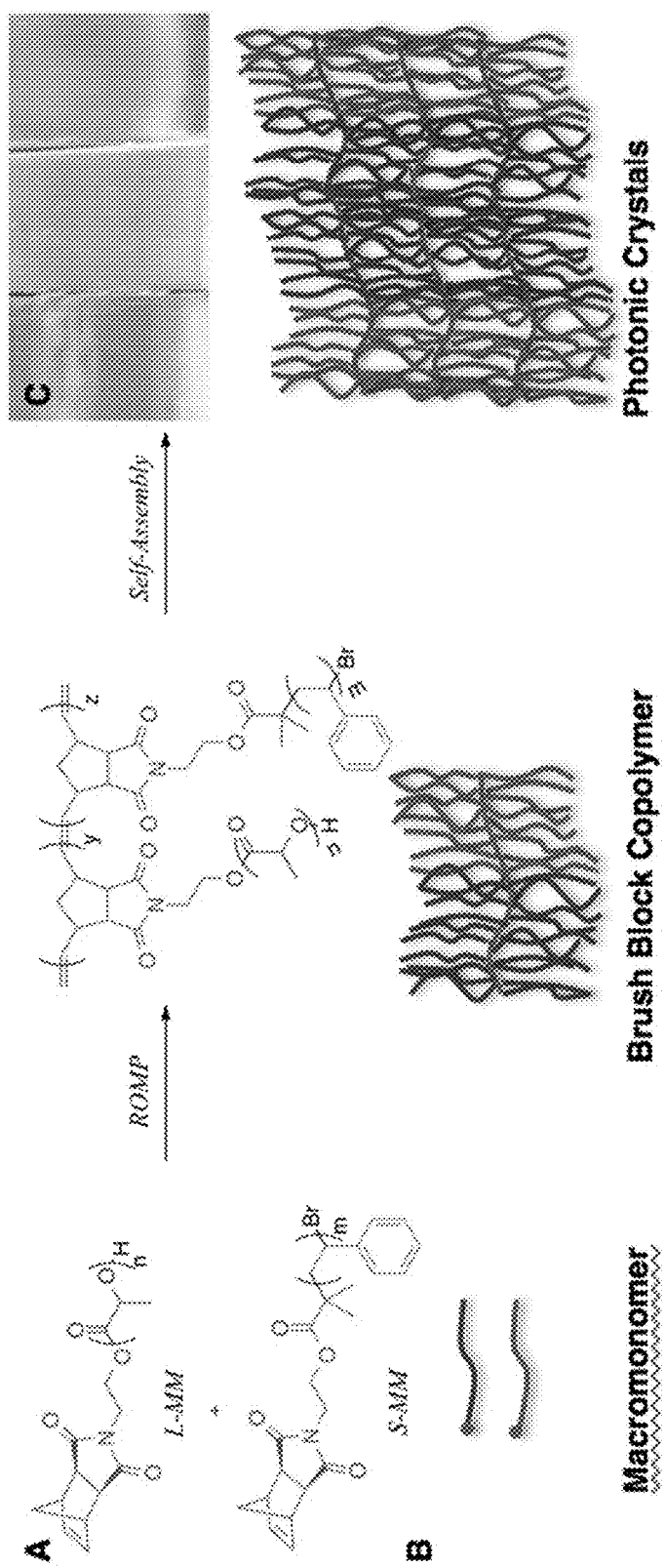
FIG. 21. (A) S- and L-based MMs were polymerized by ROMP to brush BCPs. (B) A schematic representation depicts the brush BCPs, and their assembly into ordered lamellar nanostructures. (C) Different annealing techniques render unique PCs for the same polymer, as shown in this photograph.

The lactide (L) and styrene (5) based macromonomers (MM) employed in this study were synthesized from exo-norbornene functionalized initiators, suited for the ring opening polymerization of L and the controlled radical polymerization of S. The MMs had similar MWs and narrow molecular weight distributions (MWDs) (L-MM: $M_n$=6.1× $10^3$ g/mol, PDI=1.20; S-MM: $M_n$=5.7×$10^3$ g/mol, PDI=1.02). More importantly, the advantageous characteristics (i.e. livingness, stability, functional group and steric tolerance) of Ru-mediated ROMP enables the sequential polymerization of the MMs to brush BCPs in high yields with controlled MWs and narrow MWDs (FIG. 21). The MW of the brush BCPs were controlled by the MM to Ru ratio, and ranged from 1.08×$10^6$ to 6.64×$10^6$ g/mol, while maintaining relatively narrow MWDs (PDI=1.07-1.58) considering the ultra-high MWs, highlighting the robustness of ROMP. For this study, we targeted blocks with near equal weight ratios with the goal of achieving lamellar nanostructures.

Figure 22:
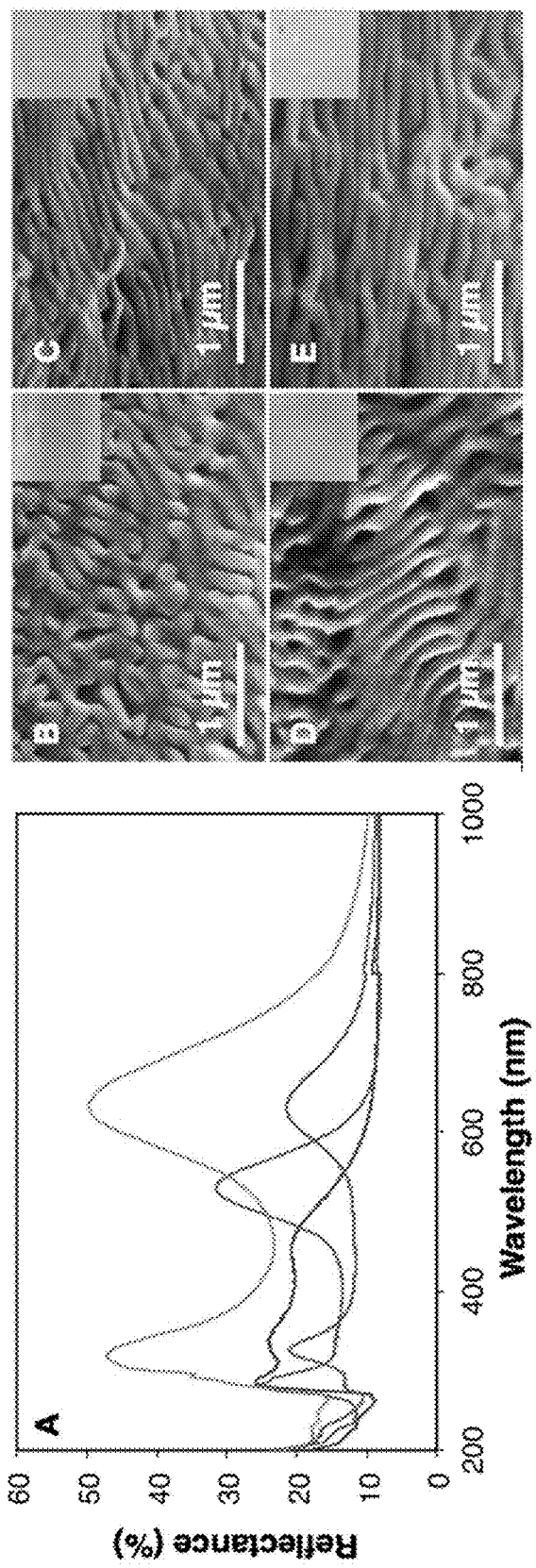
FIG. 22. (A) Reflection spectra are plotted for the brush BCP ($M_n=2.94\times10^6$ g/mol) films prepared from the controlled evaporation from DCM (blue), or THF, before (green) and after (red) thermal treatment, as well as via thermal annealing under compression (orange). (B) SEM cross-sections reveal the morphology of the middle of the brush BCP films prepared from the controlled evaporation from DCM (B), THF before (C) and after (D) thermal annealing, as well as by direct thermal annealing under compression (E). The insets are photographs of the samples.

After preparing a series of well-defined brush BCPs with a broad range of MWs, we investigated a number of simple self-assembly methods to yield thin, solid films. Our annealing methods included controlled evaporation from dichloromethane (DCM) and tetrahydrofuran (THF) solutions, before and after thermal annealing, as well as direct thermal annealing of the solid polymer powder under compression between two glass substrates. The drastic effect of the assembly method on the resulting nanostructures is most starkly visualized by a single brush BCP ($M_n$=2.94×10$^6$ g/mol), which appeared blue when cast from DCM, green when cast from THF, and red after thermally annealing the green film cast from THF (FIG. 21C). Quantitative reflection measurements were performed on a spectrophotometer equipped with an 'integrating sphere' diffuse reflectance accessory. The reflection spectra confirm the large differences between samples prepared by different annealing procedures (FIG. 22A). For the sample shown in FIG. 22, the first (longest wavelength) peak of reflection shifts by hundreds of nanometers, depending on the method of film preparation. The difference in color is not due to residual solvent; the films are completely dry and we did not observe any color change upon placing a sample in high vacuum for more than 50 hours.

Scanning electron micrograph (SEM) cross-sections were used to directly image the film morphologies to further investigate causes of the observed reflection spectra. Although the thermally annealed samples must be composed of larger domain sizes than the films prepared via controlled evaporation (as suggested by the greater $\lambda_{max}$), we were curious as to why the film cast from DCM provided the markedly altered reflection spectra. SEM images provided insight into the self-assembly of the films from different techniques, clearly visualizing the polymer morphologies and domain sizes (FIG. 22B-E). For this polymer, all of the films, except those prepared from DCM, showed the expected stacked lamellar morphology for symmetric BCPs. In the case of the film cast from DCM, a disordered morphology is observed in the SEM image. The evaporative self-assembly process is dictated by a number of factors, including the kinetics of evaporation, quality of solvent, S/L interaction parameters, as well as the energetics of the glass/polymer interface. For many samples, the degree of lamellar order decreased as a function of distance from the glass interface. For BCPs with approximately equal volume fractions, the lamellar morphology is the most thermodynamically stable, as it minimizes the interfacial surface energy between the two constituent polymers. THF afforded larger and better ordered domains than DCM, which we attribute to the fact that it is a good solvent for this copolymer system (30), as well as its decreased volatility, which allows improved chain mobility to rearrange during evaporation before all the chains enter the glassy state once all solvent is removed. After thermal annealing, these samples become more ordered, with larger domain sizes, as observed in the SEMs and evidenced by the reflection spectra. Films that were directly thermally annealed from dry polymer powder also formed well-ordered lamellae with long wavelength reflection. The improved reflection coefficient is a consequence of film thickness.

We observed the first order peak of reflection to be a linear function of MW, for all of the self-assembly techniques employed. This is in contrast to many linear copolymer systems, where the domain spacing is proportional to MW$^{0.81}$ (31). Because the peak wavelength and domain spacing are directly related by the equation $\lambda_{max}$=2($n_1x_1+n_2x_2$) (18), our results suggest that the brush BCPs studied yield a larger increase in domain spacing per monomer incorporated than a corresponding linear system. Given the high persistence lengths of these brush polymers (22), we rationalize this observation in terms of the degree of backbone extension enforced by the steric congestion of the brushes. Thus, the brush polymer architecture enables both a large equilibrium scaling for self-assembled structures as well as a very fast equilibration rate, due to the significantly reduced chain entanglement (even at ultra high MW).

Figure 23:
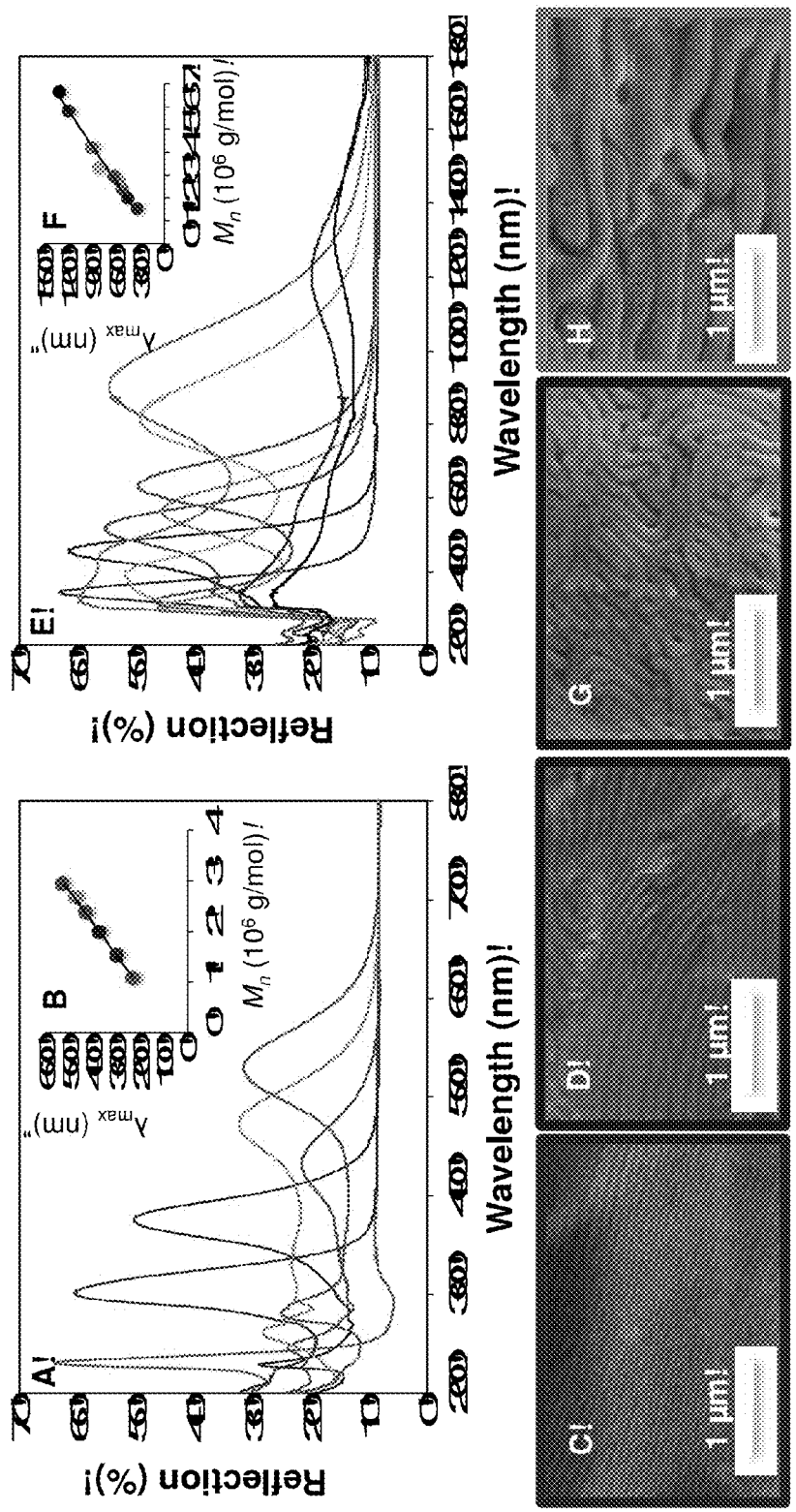
FIG. 23. (A) Reflectance is plotted as a function of wavelength for the films prepared from the controlled evaporation from THF for several different MW polymers. (B) $\lambda_{max}$ is plotted against MW for films prepared from the controlled evaporation of THF. SEM cross-sections are shown for the middle of BCP films with $M_n=1.53\times10^6$ g/mol. Linear fit $R^2=0.997$. (C) and $M_n=1.99\times10^6$ g/mol (D) prepared from the controlled evaporation of THF. (E) Reflectance is plotted as a function of wavelength for the films prepared by thermal annealing under compression for several different MW polymers. (F) $\lambda_{max}$ is plotted against MW for films prepared by thermal annealing under compression. SEM cross-sections are shown for the middle of BCP films with $M_n=1.99\times10^6$ g/mol. Linear fit $R^2=0.984$. (G) and $M_n=4.21\times10^6$ g/mol (H) prepared by thermal annealing under compression FIG. 24. (A) The angle-dependent reflection of a film thermally annealed under compression from a BCP with $M_n=1.53\times10^6$ g/mol shows good agreement between the simulated (dashed, size CV=10%, no decoherence) and measured (solid) spectra. Simulated (dashed, size CV=10%, with and without partial decoherence) and measured (solid) reflection spectra of three different samples are shown: (B) $M_n=1.53\times10^6$ g/mol, evaporated from DCM, (C) $M_n=2.94\times10^6$ g/mol, evaporated from THF, (D) $M_n=4.21\times10^6$ g/mol, thermally annealed under compression. The shaded areas represent the photonic bandgaps simulated for perfect alternating multilayers with no layer thickness dispersity.

Direct thermal annealing of the polymer powders under compression proved to be the most successful assembly technique, in that it enabled ultra-high MW polymers to reach ordered nanostructures with PC characteristics at NIR wavelengths (FIG. 23E-F). By contrast, in the case of controlled evaporation, most of the high molecular weight polymers ($M_n$>3×10$^6$ g/mol) did not assemble into films with distinct Bragg reflection peaks. The unmatched structural order achieved through thermal annealing is highlighted by the fact that the ultra-high MW polymers possessed photonic band-gaps well into the NIR (up to $\lambda_{max}$=1311 nm), an unprecedented wavelength regime for unswelled BCP photonic crystals. Furthermore, the low energetic barriers to reorganization enable the application of any BCP self-assembly technique to our system, to achieve improved lamellar order and optical performance. As NIR dielectric mirrors, these robust solid state PCs enable a host of exciting applications for BCPs to telecommunications and thermal radiation management.

To justify the proposed mechanism of the observed reflection spectra, transfer matrix simulations (9) were employed to model the measured reflection spectra of the polymer photonic crystals. The refractive indices of each block were measured for the corresponding brush homopolymers by ellipsometry. The inputs to our script are: the frequency dependent refractive indices, measured first order peak of maximum reflectance, number of layers approximated by SEM, and the weight fractions of each block measured by NMR. An initial guess of the size of each block domain was made using the first order peak of reflection, using the equation $\lambda_{max}$=2($n_1x_1+n_2x_2$), assuming equal polymer densities. To account for the increased bandwidth of the reflection peaks due to size dispersity and disorder in the nanostructure, two free parameters were introduced: coefficients of variation (CV) for layer thickness and phase decoherence. Introducing partial phase decoherence in transfer matrix simulations has been previously demonstrated as a means of approximating interfacial roughness (32). A normal distribution of thickness and phase perturbation was used, averaged over 1000 simulations and smoothed to remove noise.

Figure 24:
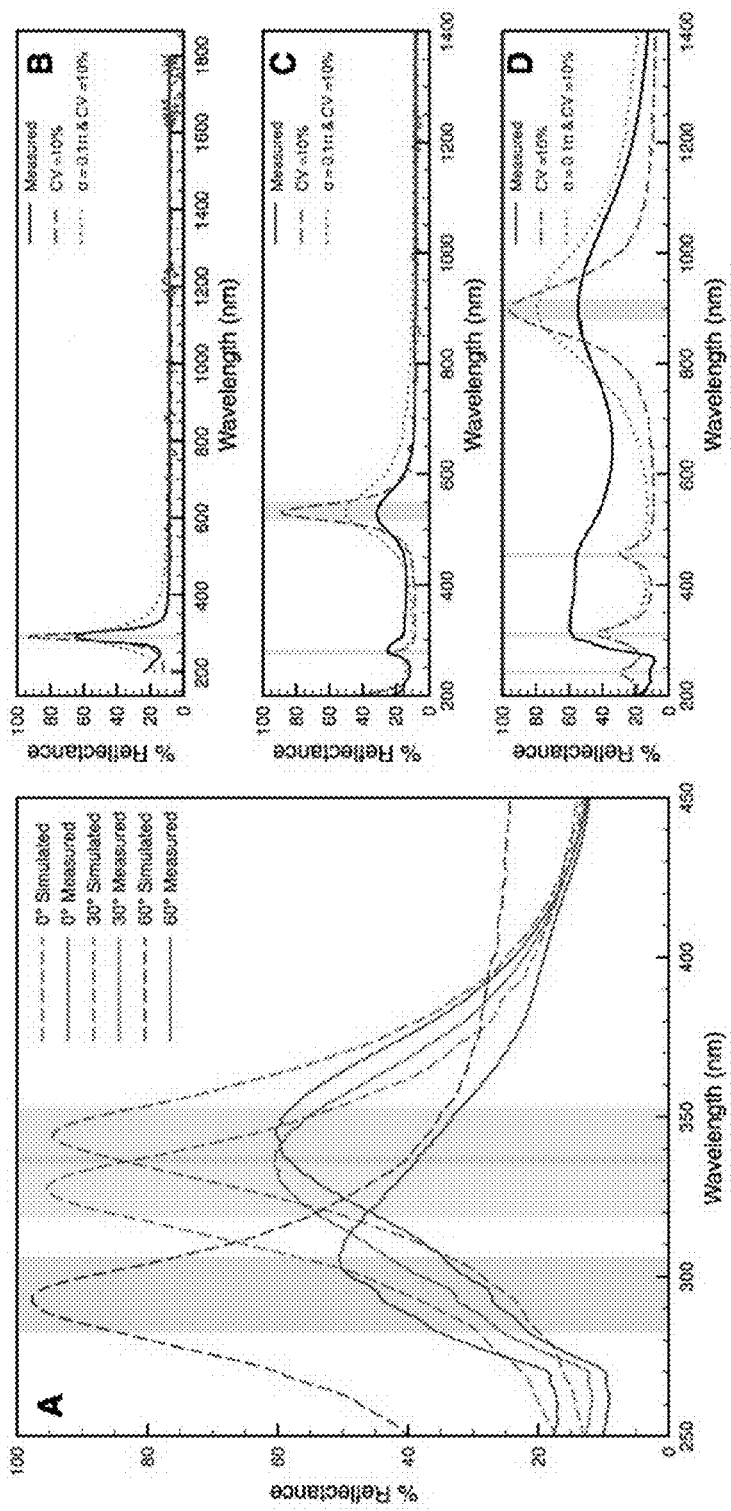

The angle dependent reflection spectra of a well-ordered sample was measured and compared with one-dimensional transfer matrix simulations. The angular frequency response shows good agreement between experiment and simulation (FIG. 24A). We attribute the difference in amplitude to the angular variation due to the curvature of the lamellae and the differences between the fitted and actual complex refractive indices. Additionally, simulations were run for three samples formed by three different assembly procedures, with different MWs representative of the full range of the series studied (FIG. 24B-D). For our simulations, the CV for the layer thicknesses was chosen to be 10%, which we found to be large enough to demonstrate the effect of size distribution on the line widths of the optical spectra, while small enough to clearly resolve the higher order peaks. Partial phase decoherence further contributes to peak broadening, and is well rationalized considering the roughness observed by SEM (32). The qualitative features of the measured spectra are well represented in the simulations (FIG. 24). Our modeling strongly suggests that the observed lamellar nanostructures consist of alternating polymer layers, which represent pseudo 1D photonic crystals. Despite the moderate to poor lamellar alignment observed in the SEM cross-sections, our 1D transfer matrix simulations can qualitatively predict reflection spectra, enabling the design of optical components using this platform.

In conclusion, we have demonstrated rapid self-assembly of high molecular weight brush polymers as a facile method for generating ordered nanostructures with large domain sizes, specifically pseudo 1D photonic crystals. The reduced chain entanglement of brush BCPs enables assembly of large nanostructures that reflect long wavelength light without the use of any additives. The linear trend of $\lambda_{max}$ as a function of MW enables one to synthetically 'dial-in' dielectric mirrors with first order peaks spanning from the UV to NIR. Materials produced through this approach are useful as NIR-reflecting building materials, to inhibit the thermalization of NIR radiation in urban environments. Moreover, the functional flexibility of our approach enables a host of new directions for functional, compliant and stimuli-responsive photonic elements.

Materials and Methods

1. Materials (H$_2$IMes)(pyr)$_2$(Cl)$_2$RuCHPh (33) and N-(hydroxyethanyl)-cis-5-norbornene-exo-2,3-di-carboximide (1) (34), were prepared as described previously. All solvents were purchased from VWR or Sigma-Aldrich. Ruthenium tetroxide was purchased form Acros Organics. Ruthenium-based metathesis catalyst was obtained from Materia Inc. and stored in a drybox. Other chemicals were bought from Sigma-Aldrich. Dry solvents were purified by passing them through solvent purification columns. 3,6-dimethyl-1,4-dioxane-2,5-dione was purified by sublimation under vacuum. All other solvents and chemicals were used without further purification unless otherwise stated.

2. General Information

NMR spectra were recorded at room temperature on a Varian Inova 500 (at 500 MHz). The NMR spectra were analyzed on MestReNova software and are reported relative to CDCl$_3$ (δ 7.26). NMR abbreviations: s=singlet, d=doublet, t=triplet, m=multiplet, br broad, dt=doublet of triblets. Gel permeation chromatography (GPC) was carried out in THF on two Plgel 10 μm mixed-B LS columns (Polymer Laboratories) connected in series with a mini DAWN TREOS multiangle laser light scattering (MALLS) detector, a ViscoStar viscometer and Optilab rex differential refractometer (all from Wyatt Technology. The dn/dc values used for the polylactide and polystyrene macromonomers were 0.050 and 0.180 respectively. dn/dc values for the brush block copolymers were obtained for each injection by assuming 100% mass elution from the columns. High resolution mass spectra were provided by the California Institute of Technology Mass spectrometry Facility. SEM images were taken on a ZEISS 1550 VP Field Emission SEM. Ellipsometry was performed on a Sentech SE-850. Reflection measurements were performed on a Cary 5000 UV/Vis/NIR spectrophotometer, equipped with an 'integrating sphere' diffuse reflectance accessory (Internal DRA 1800). All measurements were referenced to a LabSphere Spectralon 99% certified reflectance standard. The samples were illuminated through a Spectralon-coated aperature with a diameter of 1 cm, with a beam area of approximately 0.5 cm$^2$. The samples were scanned at a rate of 600 nm/min, with a 1 nm data interval, from 1800 to 200 nm, with a detector crossover (InGaAs to PMT) at 800 nm.

3. Synthesis

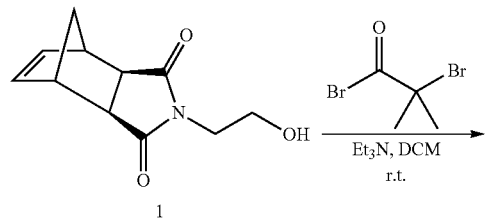

1

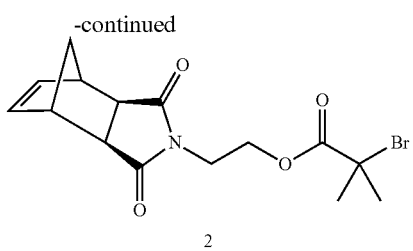

2

N-(2-bromo-2-methylpropanoylethanyl)-cis-5-norbornene-exo-2,3-dicarboximide (2)

A round bottom flask fitted with an addition funnel was flame-dried and subsequently charged with 1 (2.51 g, 12.1 mmol) and triethylamine (2.3 mL, 16 mmol). Dry dichloromethane (80 mL) was added to the addition funnel and approximately half of it was added to the reaction mixture. To the addition funnel was added 2-bromoisobutyrylbromide (2.2 mL 18 mmol). The reaction flask was submerged in an ice-water bath and the mixture in the addition funnel added to the reaction flask drop wise. When the addition was completed the reaction mixture was allowed to stir at room temperature for 20 hours. The reaction mixture was washed with 0.1 N HCl (25 mL), NaHCO$_3$ (25 mL) and brine (2×25 mL) and then dried over MgSO$_4$ and concentrated in vacuo. The product was purified by silica gel chromatography (dichloromethane) to give the product as a white solid in 66% yield (2.87 g, 8.0 mmol). $^1$H NMR (500 MHz, CDCl$_3$): δ (ppm) 6.28 (t, J=1.8 Hz, 2H), 4.34-4.32 (m, 2H), 3.82-3.80 (m, 2H), 3.28-3.26 (m, 2H), 2.70 (d, J=1.4 Hz, 2H), 1.89 (s, 6H), 1.54-1.50 (m, 1H), 1.31 (d, J=9.9 Hz, 1H). $^{13}$C NMR (500 MHz, CDCl$_3$): δ (ppm) 177.7, 171.3, 137.8, 62.6, 55.4, 47.8, 45.2, 42.9, 37.3, 30.6. HRMS (EI+): calcd. for C$_{15}$H$_{18}$O$_4$NBr [M+H]$^+$: m/z=355.0419. found 355.0435. IR (Thin Film, NaCl): 3456, 3065, 2981, 2881, 1774, 1739, 1703, 1464, 1450, 1426, 1392, 1371, 1360, 1328, 1283, 1215, 1192, 1159, 1110, 1037, 1014, 990, 942, 902, 883, 854, 828, 813, 804, 781, 771, 722 cm$^{-1}$.

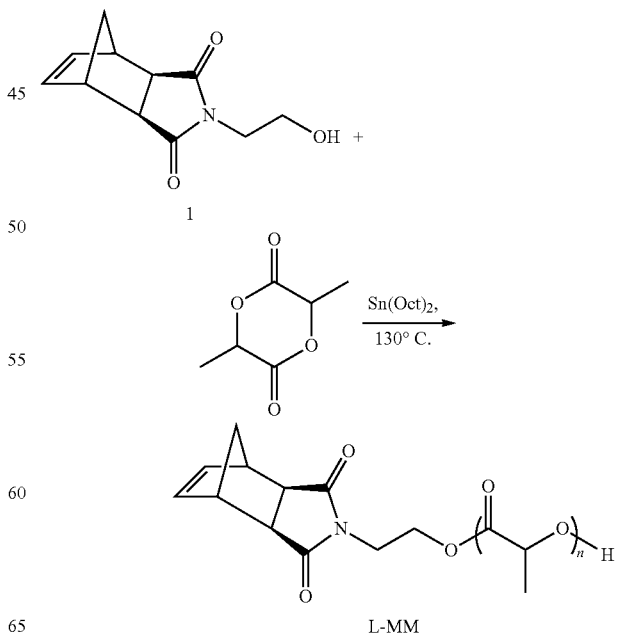

L-MM

Synthesis of Norbornene-Polylactide (L-MM)

A flame-dried Schlenck tube was charged with 1 (233.9 mg, 1.13 mmol) and racemic 3,6-dimethyl-1,4-dioxane-2,5-dione (6.096 g, 42.3 mmol) along with tin (II) 2-ethylhexanoate (≈2 mg, ≈5 μmol). This mixture was put under three vacuum-argon cycles and then allowed to stir at 130° C. for 2.5 hours. After cooling to room temperature the product was dissolved in dichloromethane, filtered through a small pad of celite to remove catalyst and precipitated into cold MeOH. $^1$H NMR (500 MHz, CDCl$_3$): δ (ppm) 6.28 (br t, 2H), 5.25-5.03 (m, 82H), 4.40-4.21 (m, 3H), 3.82-3.68 (m, 2H) 3.26 (s, 2H), 2.70 (m, 2H), 1.73-1.39 (m, 247H), 1.23 (br d, J=8.5 Hz, 1H). $M_n$=6.1 kg/mol. GPC-MALLS: $M_n$=6.3 kg/mol, $M_w/M_n$=1.20.

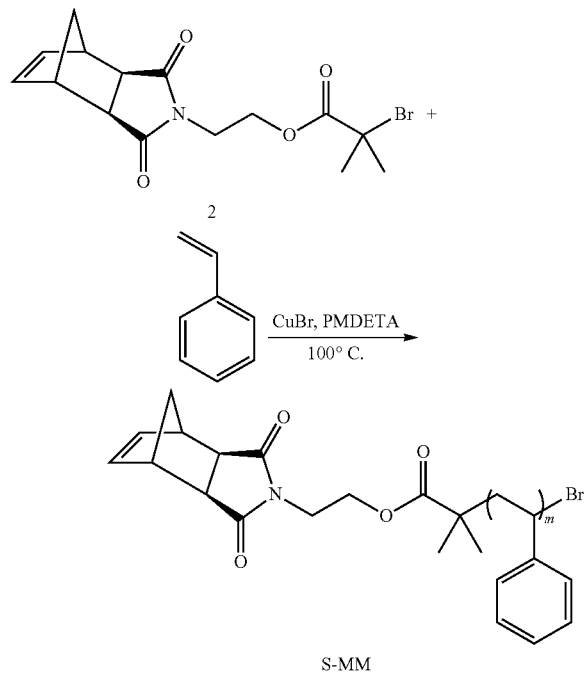

Synthesis of Norbornene-Polystyrene (S-MM)

Styrene (24 mL, 0.209 mol) was passed through basic aluminum oxide and added to an oven-dried Schlenk tube fitted with a septum. Then, the styrene underwent three freeze-pump-thaw cycles and was subsequently frozen again. CuBr (77.0 mg, 0.54 mmol) was next added to the frozen styrene under argon. This mixture was put under three vacuum-argon cycles before allowing the styrene to melt under argon. PMDETA (108 μL, 0.52 mmol) was then added to the mixture via a microsyringe and the solution stirred for 5 minutes. The initiator, 2 (670.4 mg, 1.88 mmol), was subsequently added to the Schlenck tube via syringe and the reaction mixture stirred at 100° C. The reaction was after 4 h, by cooling it quickly down to room temperature using dry ice and adding THF to the mixture. The product was passed through neutral aluminum oxide to remove catalyst and precipitated into MeOH. The product was purified by repeated precipitations into MeOH until no remaining styrene was observed by NMR and further purified by silica gel chromatography (dichloromethane). $^1$H NMR (500 MHz, CDCl$_3$): δ (ppm) 7.25-6.29 (br m, 260H), 6.28 (br s, 2H), 4.59-4.35 (m, 1H), 3.65-3.32 (m, 4H), 3.22 (br s, 2H), 2.62 (br d, J=6.6 Hz, 2H), 2.56-1.55 (br m, 105H), 0.99-0.83 (m, 6H). $M_n$=5.8 kg/mol. GPC-MALLS: $M_n$=6.1 kg/mol, $M_w/M_n$=1.02.

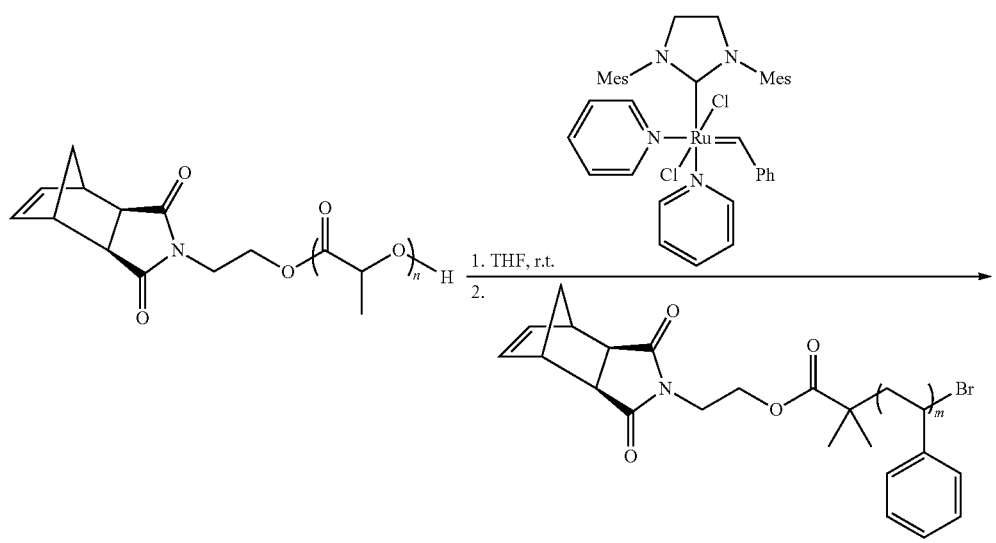

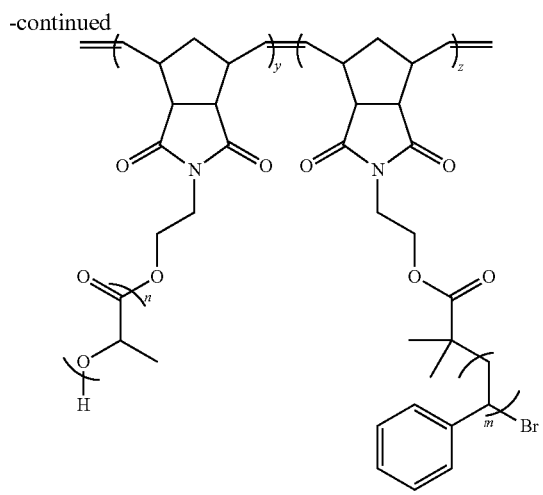

General Procedure for Block Copolymerization of Two Macromonomers via ROMP (A-L)

In a typical experiment, 150 mg of each of the macromonomers were added to separate vials. The desired amount of catalyst was added to the third vial. The vials were brought into a drybox and the macromonomers were dissolved in the desired amount of THF ($[M]_0 \approx 0.05$ M) while the catalyst was dissolved in 1.00 mL of THF. The desired amount of catalyst solution was injected via a microsyringe to the solution of the L-MM since it polymerizes faste (27). When the first macromonomer had polymerized the solution of the second macromonomer (S-MM) was added to the reaction mixture. This solution was allowed to stir for an additional 2-3 hours. The reaction was moved out of the dry box, quenched with butyl vinyl ether and isolated by precipitation into MeOH. Conversion was 100% based on RI traces from the GPC and isolated yields were generally over 85%.

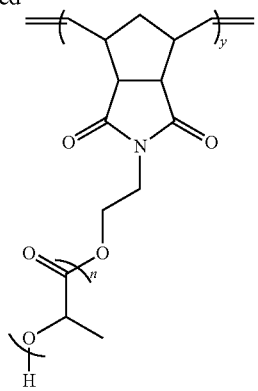

Synthesis of a Polylactide Brush Homopolymer (M)

The L-MM (62.0 mg, 10.2 μmol) was weighed into a vial. The catalyst (2.6 mg, 3.58 μmol) was added to a separate vial. The vials were brought into the drybox and the L-MM was dissolved in THF (250 μL) while the catalyst was dissolved in 1.00 mL of THF. The catalyst solution (17 μL, 0.061 μmol) was injected via a microsyringe to the solution of macromonomers and the solution allowed to stir for 2 hours. The reaction was moved out of the dry box, quenched with butyl vinyl ether and isolated by precipitation into MeOH. GPC-MALLS: $M_n=1.04\times10^6$ g/mol, $M_w/M_n=1.03$.

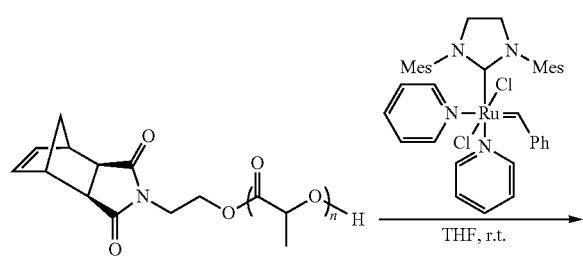

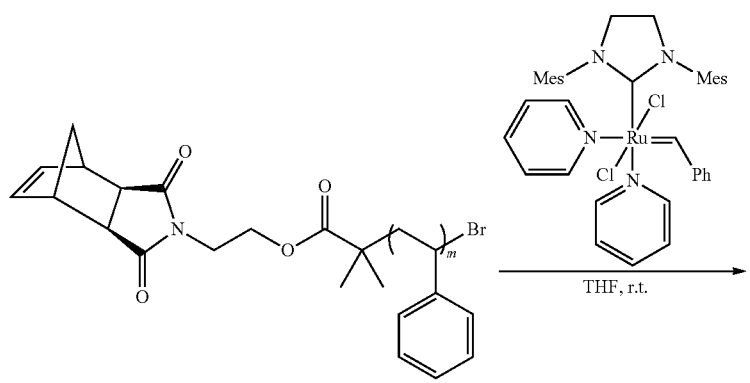

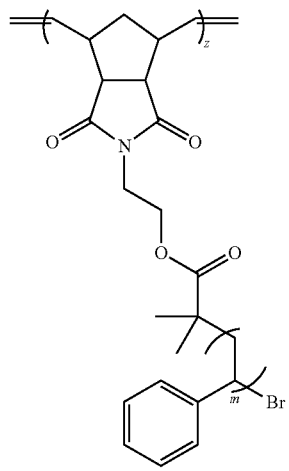

Synthesis of a Polystyrene Brush Homopolymer (N)

The S-MM (52.9 mg, 9.12 µmol) was weighed into a vial. The catalyst (2.6 mg, 3.58 µmol) was added to a separate vial. The vials were brought into the drybox and the S-MM was dissolved in THF (200 µL) while the catalyst was dissolved in 1.00 mL of THF. The catalyst solution (14.5 µL, 0.052 µmol) was injected via a microsyringe to the solution of macromonomers and the solution allowed to stir for 2 hours. The reaction was moved out of the dry box, quenched with butyl vinyl ether and isolated by precipitation into MeOH. GPC-MALLS: $M_n=1.14\times10^6$ g/mol, $M_w/M_n=1.04$.

Annealing by Slow Evaporation

The solid polymer (≈40-50 mg) was put in a vial and dissolved there in approx. 10 mL of solvent (dichloromethane or tetrahydrofuran). Then a glass substrate was put, vertically into the vial and the solvent allowed to evaporate at room temperature. The glass substrate could be subsequently annealed at 120° C. in an oven for 2 h.

Thermal Annealing Between Two Glass Substrates

The solid polymer (≈10 mg) was sandwiched between two glass substrates and compressed with a clamp. The glass substrates, clamped together are then heated in an oven or a vacuum chamber at 140° C. for 30 min.

SEM Sample Preparation

The samples were fractured on glass substrates and exposed to fresh $RuO_4$ vapor for ≈8 min.

Supplementary Table

TABLE S1

Molecular weight information about the (polynorbornene-g-polystyrene)-b-(polynorbornene-g-polylactide) polymer series. a) The molar ratios used in the synthesis of these brush block copolymers of the catalyst (C) and the MMs. b) Molecular weight and polydispersity index as measured by GPC-MALLS. c) Approximation of the size of each block as calculated using NMR and GPC results.

| Sample | C:L-MM:S-MM[a] | $M_{n, theo}$ ($\times 10^6$ g/mol) | $M_n$ ($\times 10^6$ g/mol)[b] | PDI $(M_w/M_n)$[b] | DP L-MM[c] | DP S-MM[c] |
|---|---|---|---|---|---|---|
| A | 1:74:78 | 0.90 | 1.08 | 1.07 | 84 | 98 |
| B | 1:99:105 | 1.20 | 1.53 | 1.09 | 116 | 142 |
| C | 1:126:132 | 1.52 | 1.99 | 1.12 | 153 | 182 |
| D | 1:136:144 | 1.65 | 2.38 | 1.22 | 187 | 215 |
| E | 1:135:142 | 1.63 | 2.68 | 1.16 | 206 | 246 |
| F | 1:150:158 | 1.81 | 2.94 | 1.17 | 225 | 271 |
| G | 1:157:166 | 1.90 | 3.19 | 1.26 | 246 | 292 |
| H | 1:174:183 | 2.10 | 3.32 | 1.29 | 252 | 309 |
| I | 1:198:210 | 2.40 | 4.02 | 1.34 | 289 | 391 |
| J | 1:223:237 | 2.71 | 4.21 | 1.36 | 319 | 391 |
| K | 1:246:262 | 2.99 | 5.80 | 1.5 | 436 | 543 |
| L | 1:273:288 | 3.30 | 6.64 | 1.58 | 497 | 624 |

Supplementary Text

Calculations

The degree of polymerization (DP) of each MM in the final brush BCPs, shown in Table S1, was estimated using NMR data. The total molecular weight, measured by GPC-MALLS was the sum of the molecular weight of each brush times the DP of that brush (eq. 1).

$$M_{n,tot} = DP_{L-MM} \times M_{n,L-mm} + DP_{S-MM} \times M_{n,S-MM} \quad (1)$$

The $M_n$ of the S-MM had been calculated by using the integration value, herein assigned a, of the peak at δ 6.29-7.25 ppm to the norbornene olefin peak at δ 6.28 ppm. Likewise, the $M_n$ of the L-MM had been calculated by using the integration value, herein assigned b, of the peak at δ 5.03-5.25 ppm to the norbornene olefin peak at δ 6.28 ppm. The 2 MMs did not have any overlapping peaks in that area so they could be used as identifying peaks in the brush BCPs where the integration value of the S-MM peak was assigned as x and the integration value of the L-MM peak was assigned as y. The ratio of x over y remained the same as the ratio of a multiplied by the DP of the S-MM block over b multiplied by the DP of the L-MM block as shown in eq. 2.

$$\frac{x}{y} = \frac{a \times DP_{S-MM}}{b \times DP_{L-MM}} \quad (2)$$

If we isolate $DP_{S-MM}/DP_{L-MM}$ and assign it the value c we obtain the following equation:

$$c = \frac{DP_{S-MM}}{DP_{L-MMA}} = \frac{x}{y} / \frac{a}{b} \quad (3)$$

Then we can add $DP_{L-MM}/DP_{L-MM}$ to both sides of the equation and obtain:

$$\frac{DP_{L-MM} + DP_{S-MM}}{DP_{L-MM}} = 1 + c \quad (4)$$

which can be rearranged to:

$$\text{mol } \%(L-MM) = \frac{DP_{L-MM}}{DP_{L-MM} + DP_{S-MM}} = \frac{1}{1+c} \quad (5)$$

to find the mol % of the L-MM in the brush block copolymer. The mol % of the S-MM then becomes:

$$\text{mol } \%(S-MM) = \frac{DP_{S-MM}}{DP_{L-MM} + DP_{S-MM}} = \frac{c}{1+c} \quad (6)$$

With the mol % it becomes simple to calculate the wt % of each MM by multiplying the mol percentages by the molecular weights of their respective MMs:

$$\text{wt } \%(S-MM) = \quad (7)$$

$$\frac{\text{mol } \%(S-MM) \times M_{n,S-MM}}{\text{mol } \%(S-MM) \times M_{n,S-MM} + \text{mol } \%(L-MM) \times_{n,L-MM}}$$

and the DPs can be found by multiplying the weight percentages by the total molecular weight of the brush block copolymer and dividing by molecular weight of the MMs.

$$DP_{S-MM} = \frac{\text{wt } \%(S-MM) \times M_{n,tot}}{M_{n,S-MM}} \quad (8)$$

By substituting eq. 2 into eq. 3 an equation with only one unknown value could be obtained as shown (eq. 4).

$$Z = \frac{a}{b \times DP_{L-MM}} \times \left( \frac{M_{n,tot}}{M_{n,S-MM}} - \frac{M_{n,L-MM}}{M_{n,S-MM}} DP_{L-MM} \right) \quad (4)$$

This equation could be rearranged to give eq. 5 which yielded the DP of the L-MM block.

$$DP_{L-MM} = \frac{a \times M_{n,tot}}{b \times M_{n,S-MM}} / \left( Z + \frac{M_{n,L-MM}}{b \times M_{n,S-MM}} \right) \quad (5)$$

By rearranging eq. 3 the DP of the S-MM could now be calculated with eq. 6 and the information obtained from eq. 5.

$$DP_{S-MM} = \frac{z \times b \times DP_{L-MM}}{a} \quad (6)$$

Transfer Matrix Simulations

Transfer matrix simulations were built upon the EWA MATLAB package by Orfanidis (http://www.ece.rutgers.edu/~orfanidi/ewa/), specifically the multidiel1( ) function. The refractive indices were measured by first synthesizing homopolymers of L-MM (M) and S-MM (N), spin casting thin films (~50 nm) onto a Si wafer, and solving for the thicknesses and indices by fitting a Cauchy model to spectroscopic ellipsometric measurements at 70°. The thicknesses were verified with an AFM scratch test. The refractive indices are very close to reported published values of bulk polylactide (PLA) and polystyrene (PS) (http://refractiveindex.info). The refractive indices as a function of wavelength, averaged over 5 different ellipsometric measurements, were employed in the simulations (Cauchy parameters provide below). The extinction coefficients were not consistently fit by ellipsometry. Instead, the extinction coefficients were calculated from the measured absorption of spin cast thin films on quartz, using a Cary 50 UV/Vis spectrophotometer. Exponential fits of the extinction coefficients were used in the simulations (equations provided below). The numbers of alternating layers in the simulations were guessed from the SEM cross section of the corresponding films. The volume fractions of each polymer were guessed by assuming an equal density for each block, and using the weight ratios calculated by NMR (described elsewhere). The actual density of each block in the film is not easily measured, and we justify the assumption of equal density by the argument that the processing conditions and brush architecture of the polymers (which are identical for every case) will largely dictate the density, rendering literature values of bulk PLA and PS irrelevant.

| Cauchy Parameters | PLA | PS |
|---|---|---|
| $n_0$ | 1.4509 | 1.5642 |
| $n_1$ | 37.0849 | 42.8081 |
| $n_2$ | −3.4587 | −1.7057 |

$$n = n_0 + \frac{n_1 \times 10^2}{\lambda^2} + \frac{n_2 \times 10^7}{\lambda^4}$$

$k_{PS} = 6040.3 \exp(-0.05\lambda)$
$k_{PLA} = 1000000 \exp(-0.088\lambda)$
200 nm < λ < 1800 nm The inputs to our script are: the frequency dependent complex refractive indices, measured first order peak of maximum reflectance, approximate number of layers by SEM, and the weight fractions of each block by NMR. An initial guess of the size of each block domain was made using the first order peak of reflection, using the equation $\lambda = 2(n_1 x_1 + n_2 x_2)$, assuming equal polymer densities. This initial domain size is perturbed by a normally distributed variance, with the coefficient of variation as a free parameter. To account for the loss of coherence due to layer roughness, the calculated phase change in the transfer matrix simulation was perturbed by a normally distributed variance, with the standard deviation as a second free parameter. For each sample, a total of 1000 simulations were run and averaged to remove noise. The plots in the figures were additionally smoothed using FFT smoothing with a factor of 3.

Matlab Code

```
%guess nominal domain thicknesses
function [x0_guess] = guess_bragg_x0s(nA, nB, vfA, vfB, lambdaMax)
xA_guess = lambdaMax/(2*(real(nA)+(real(nB)*vfB/vfA)));
xB_guess = vfB/vfA*xA_guess;
x0_guess = [xA_guess,xB_guess];
end
% Title: multidiel_coherenceMod.m
% Description: modified version of Orfanidis' multidiel1( ) to account for partial decoherence
% Author: Raymond A. Weitekamp - 2012 - raw@caltech.edu
% Comments: modification based on Troparevsky et al, Optics Express, Vol. 18, Issue 24, pp. 24715-24721 (2010)
%                http://dz.doi.org/10.1364/OE.18.024715
%--------------------------------------------
%
%                  na | n1 | n2 | ... | nM | nb
% left medium | L1 | L2 | ... | LM | right medium
%         interface 1  2   3     M   M+1
%
% Usage: [Gamma1,Z1] = multidiel1(n,L,lambda,theta,pol,deco)
% n       = vector of refractive indices [na,n1,n2,...,nM,nb]
% L       = vector of optical lengths of layers [n1*l1,...,nM*lM], in units of lambda_0
% lambda  = vector of free-space wavelengths at which to evaluate input impedance
% theta   = incidence angle from left medium (in degrees)
% pol     = 'tm' or 'te', for parallel/perpendicular polarizations
% deco    = coefficient of variation for decoherence, deco*pi = beta = standard
%              deviation of the randn distribution
%
% Gamma1  = reflection response at interface-1 into left medium evaluated at lambda
% Z1      = transverse wave impedance at interface-1 in units of eta_a (left medium)
%
% multidiel1 notes: simplified version of MULTIDIEL for isotropic layers
%
%         M is the number of layers (must be >=0)
%
%         optical lengths are L1 = n1*l1, etc., in units of a reference
%         free-space wavelength lambda_0. If M=0, use L=[ ].
%
%         lambda is in units of lambda_0, that is, lambda/lambda_0 = f_0/f
%
%         reflectance = |Gamma1|^2, input impedance = Z1 = (1+Gamma1)./(1-Gamma1)
%
%         delta(i) = 2*pi*[n(i)*l(i)*cos(th(i))]/lambda
%
%         it uses SQRTE, which is a modified version of SQRT appropriate for evanescent waves
%
%         see also MULTIDIEL, MULTIDIEL2
% Sophocles J. Orfanidis - 1999-2008 - www.ece.rutgers.edu/~orfanidi/ewa
function [Gamma1,Z1] = multidiel_coherenceMod(n,L,lambda,theta,pol,deco)
M = length(n)-2;                              % number of slabs
if M==0, L = [ ]; end                         % single interface, no slabs
theta = theta * pi/180;
% costh = conj(sqrt(conj(1 - (n(1) * sin(theta) ./ n).^2)));   % old version
costh = sqrte(1 - (n(1) * sin(theta) ./ n).^2);                % new version - 9/14/07
if pol=='te' | pol=='TE',
    nT = n .* costh;                          % transverse refractive indices
else
    nT = n ./ costh;                          % TM case, fails at 90 deg for left medium
end
if M>0,
    L = L .* costh(2:M+1);                    % n(i)*l(i)*cos(th(i))
end
r = -diff(nT) ./ (diff(nT) + 2*nT(1:M+1));    % r(i) = (n(i-1)-n(i)) / (n(i-1)+n(i))
```

Matlab Code

```
beta = deco*pi;                                    % beta = decoherence factor * pi
Gamma1 = r(M+1) * ones(1,length(lambda));          % initialize Gamma at right-most interface
for i = M:-1:1,
    delta = (2*pi*L(i)./lambda)+(beta.*randn);     % phase thickness in i-th layer, perturbed by distribution with
STD = beta
    z = exp(-2*j*delta);
    Gamma1 = (r(i) + Gamma1.*z) ./ (1 + r(i)*Gamma1.*z);
end
Z1 = (1 + Gamma1) ./ (1 - Gamma1);
% Title: 1D Photonic Crystal Simulator
% Author: Raymond A. Weitekamp - July 2012 - raw@caltech.edu
%
% Description: Transfer matrix based simulation which incorporates size
% distribution and partial decoherence, to mimic self-assembled lamellar
% structures or other imperfect multilayer stacks.
%
% Free parameters: sigma = coefficient of variation of layer thickness
%                  decoeff = coefficient of variation of decoherence
%
% Dependencies: multidiel_coherenceMod.m, guess_bragg_x0s.m
% must load polymer n,k as array with same array length as lambdas.
% i.e. - n_ps, k_ps, n_pla, k_pla
%SETUP PARAMETERS
    lambdas = linspace(200,1800,1601);%wavelength range (nm) (must match n_pla)
    na=1;% index it's coming from
    nb=1;% index it's going to
    nglass = 1.466; %index glass slide
    tglass = 1000000;% thickness of glass (nm)
    k_ps = 6040.3*exp(-0.05.*lambdas); %(fit from UV/Vis data)
    k_pla = 1000000*exp(-0.088.*lambdas); %(fit from UV/Vis data)
    nPS = complex(n_ps,-k_ps); %indez 200 - 1800 nm of PS block (imported)
    nPLA = complex(n_pla,-k_pla); %index 200 - 1800 nm of PLA block (imported)
%samples for figure
            %69B DCM
                vf_ps = .535; %NMR
                vf_pla = .465; %NMR
                lambdaMax = 291; %intSphere
                numLayers = 25; %approx from SEM
            %64A THF
%               vf_ps = .532; %NMR
%               vf_pla = .468; %NMR
%               lambdaMax = 531; %intSphere
%               numLayers = 23; %approx from SEM
            %65A thermal
%               vf_ps = .537; %NMR
%               vf_pla = .463; %NMR
%               lambdaMax = 899; %intSphere
%               numLayers = 100; %approx from SEM
            %69B Thermal
%               vf_ps = .535; %NMR
%               vf_pla = .465; %NMR
%               lambdaMax = 345; %intSphere
%               numLayers = 350; %approx from SEM
%-----------------
    %setup layer arrays
    lambda0 = 500; %center wavelength (arbitrary) (nm)
    otG = nglass*tglass/lambda0; %optical thickness of glass in terms of lambda0
    %indices at max
    nPS_AtMax = nPS(find(lambdas==lambdaMax));
    nPLA_AtMax = nPLA(find(lambdas==lambdaMax));
    %guess the domain sizes
    x0 = guess_bragg_x0s(nPS_AtMax,nPLA_AtMax,vf_ps,vf_pla,lambdaMax);
    %set polymer domain thicknesses 1 = PS , 2 = PLA
    t1 = x0(:,1)
    t2 = x0(:,2)
    %angle averaging
    angles = 0;
    %number of averages
    numAvg = 1000;
    %coefficient of variation (of layer thickness)
    sigma = 0.1;
    %decoherence coefficient ( beta = decoeff * pi )
    decoeff = 0.1;
    %SOLVER LOOPS
            %step through numLayers
            R_layAvg = zeros(1,length(lambdas)); %setup average over all numbers of layers
            for num=1:length(numLayers)
```

Matlab Code

```
%step through angles
R_angAvg = zeros(1,length(lambdas)); %setup average over all angles
for ii=1:length(angles)
    %step through dispersity
    R_avg = zeros(1,length(lambdas)); %setup average over dispersity
    for i=1:numAvg
        %step through wavelengths
        R_now = zeros(1,length(lambdas)); %setup reflectance array for each wavelength
        for j=1:length(lambdas)
            ot1 = nPS(j)*t1/lambda0; %nominal optical thickness of 1 in terms of lambda0
            ot2 = nPLA(j)*t2/lambda0; %nominal optical thickness of 2 in terms of lambda0
            variation1 = (sigma*ot1).*randn(1,numLayers(num)); %variation of layer thicknesses
            variation2 = (sigma*ot2).*randn(1,numLayers(num)); %variation of layer thicknesses
            L=repmat([ot1,ot2],1,numLayers(num)); %layer thicknesses without dispersity
            %(wavelengths in the material)
            %add variance
            for x=1:length(L)
                if(mod(x,2)>0)
                    L(x) = ot1 + variation1(x/2 + .5);
                else
                    L(x) = ot2 + variation2(x/2);
                end
            end
            L=[L,otG];%adds back glass
            n=[na,repmat([nPS(j),nPLA(j)],1,numLayers(num)),nglass,nb];%indices corresponding to layers
            R_now(:,j)=abs(multidiel_coherenceMod(n,L,(lambdas(j)./lambda0),angles,'te',decoeff)).^2; %write to reflectance array
        end
        R_avg = R_avg + (R_now./numAvg);
        i
    end
    R_angAvg = R_angAvg + (R_avg./length(angles));
end
R_layAvg = R_layAvg + (R_angAvg./length(numLayers));
end
figure; plot(lambdas,R_layAvg,'-b');
```

REFERENCES

1. F. S. Bates et al., Multiblock Polymers: Panacea or Pandora's Box?, Science 336, 434-440 (2012).
2. R. A. Segalman, Patterning with block copolymer thin films, Mater. Sci. Eng. R Rep. 48, 191-226 (2005).
3. N. S. Wanakule, J. M. Virgili, A. A. Teran, Z.-G. Wang, N. P. Balsara, Thermodynamic Properties of Block Copolymer Electrolytes Containing Imidazolium and Lithium Salts, Macromolecules 43, 8282-8289 (2010).
4. Y. Kang, J. J. Walish, T. Gorishnyy, E. L. Thomas, Broad-wavelength-range chemically tunable block-copolymer photonic gels, Nature Mater. 6, 957-960 (2007).
5. J. D. Joannopoulos, Photonic Crystals: Molding The Flow Of Light (Princeton University Press, 2008).
6. S. Valkama et al., Self-assembled polymeric solid films with temperature-induced large and reversible photonic-bandgap switching, Nature Mater. 3, 872-876 (2004).
7. J. Ge, Y. Yin, Responsive Photonic Crystals, Angew. Chem. Int. Ed. 50, 1492-1522 (2011).
8. M. B. Runge, N. B. Bowden, Synthesis of High Molecular Weight Comb Block Copolymers and Their Assembly into Ordered Morphologies in the Solid State, J. Am. Chem. Soc. 129, 10551-10560 (2007).
9. S. J. Orfanidis, Electromagnetic Waves and Antennas. Online book, retrieved May 2012. http://www.ece.rutgers.edu/~orfanidi/ewa
10. S. Y. Lin et al., A three-dimensional photonic crystal operating at infrared wavelengths, Nature 394, 251-253 (1998).
11. H. Masuda et al., Photonic Crystal Using Anodic Porous Alumina, Jpn. J. Appl. Phys. 38, L1403-L1405 (1999).
12. M. Campbell, D. N. Sharp, M. T. Harrison, R. G. Denning, A. J. Turberfield, Fabrication of photonic crystals for the visible spectrum by holographic lithography, Nature 404, 53-56 (2000).
13. S. Jeon et al., Fabricating Complex Three-Dimensional Nanostructures with High-Resolution Conformable Phase Masks, Proc. Natl. Acad. Sci. USA 101, 12428-12433 (2004).
14. P. V. Braun, P. Wiltzius, Microporous materials: Electrochemically grown photonic crystals, Nature 402, 603-604 (1999).
15. J. F. Bertone, P. Jiang, K. S. Hwang, D. M. Mittleman, V. L. Colvin, Thickness Dependence of the Optical Properties of Ordered Silica-Air and Air-Polymer Photonic Crystals, Phys. Rev. Lett. 83, 300-303 (1999).
16. J. Rzayev, Synthesis of Polystyrene-Polylactide Bottlebrush Block Copolymers and Their Melt Self-Assembly into Large Domain Nanostructures, Macromolecules 42, 2135-2141 (2009).
17. A. Urbas et al., Tunable Block Copolymer/Homopolymer Photonic Crystals, Adv. Mater. 12, 812-814 (2000).
18. A. C. Edrington et al. Polymer-Based Photonic Crystals, Adv. Mater. 13, 421-425 (2001).
19. A. J. Parnell et al., Continuously tuneable optical filters from self-assembled block copolymer blends, Soft Matter 7, 3721-3728 (2011).
20.1. Lee et al., Quasi-Amorphous Colloidal Structures for Electrically Tunable Full-Color Photonic Pixels with Angle-Independency, Adv. Mater. 22, 4973-4977 (2010).

21. A. Urbas et al., Tunable Block Copolymer/Homopolymer Photonic Crystals, *Adv. Mater.* 12, 812-814 (2000).
22. M. Hu, Y. Xia, G. B. McKenna, J. A. Kornfield, R. H. Grubbs, Linear Rheological Response of a Series of Densely Branched Brush Polymers, *Macromolecules* 44, 6935-6943 (2011).
23. N. Hadjichristidis, M. Pitsikalis, S. Pispas, H. Iatrou, Polymers with Complex Architecture by Living Anionic Polymerization, *Chem. Rev.* 101, 3747-3792 (2001).
24. M. W. Neiser, J. Okuda, M. Schmidt, Polymerization of Macromonomers to Cylindrical Brushes Initiated by Organolanthanides, *Macromolecules* 36, 5437-5439 (2003).
25. V. Heroguez, S. Breunig, Y. Gnanou, M. Fontanille, Synthesis of α-Norbornenylpoly(ethylene oxide) Macromonomers and Their Ring-Opening Metathesis Polymerization, *Macromolecules* 29, 4459-4464 (1996).
26. Y. Xia, J. A. Kornfield, R. H. Grubbs, Efficient Synthesis of Narrowly Dispersed Brush Polymers via Living Ring-Opening Metathesis Polymerization of Macromonomers, *Macromolecules* 42, 3761-3766 (2009).
27. Y. Xia, B. D. Olsen, J. A. Kornfield, R. H. Grubbs, Efficient Synthesis of Narrowly Dispersed Brush Copolymers and Study of Their Assemblies: The Importance of Side Chain Arrangement, *J. Am. Chem. Soc.* 131, 18525-18532 (2009).
28. J. A. Johnson et al., Polymers by ROMP: Grafting-Through and Clicking-To, *J. Am. Chem. Soc.* 133, 559-566 (2011).
29. J. A. Johnson et al., Drug-loaded, bivalent-bottle-brush polymers by graft-through ROMP., *Macromolecules* 43, 10326-10335 (2010).
30. M. Vayer et al., Perpendicular orientation of cylindrical domains upon solvent annealing thin films of polystyrene-b-polylactide, *Thin Solid Films* 518, 3710-3715 (2010).
31. A. S. Zalusky, R. Olayo-Valles, J. H. Wolf, M. A. Hillmyer, Ordered Nanoporous Polymers from Polystyrene-Polylactide Block Copolymers, *J. Amer. Chem. Soc.* 124, 12761-12773 (2002).
32. M. C. Troparevsky, A. S. Sabau, A. R. Lupini, Z. Zhang, Transfer-matrix formalism for the calculation of optical response in multilayer systems: from coherent to incoherent interference, *Optics Express* 18 (2010).
33. J. A. Love, J. P. Morgan, T. M. Trnka, R. H. Grubbs, A practical and highly active ruthenium-based catalyst that effects the cross metathesis of acrylonitrile. *Angew. Chem. Int. Ed.* 41, 4035-4037 (2002).
34. J. B. Matson, R. H. Grubbs, Synthesis of Fluorine-18 Functionalized Nanoparticles for use as in vivo Molecular Imaging Agents., *J. Am. Chem. Soc.* 130, 6731-6733 (2008).

SUPPLEMENTAL REFERENCES

1. Bates F S et al. (2012) Multiblock Polymers: Panacea or Pandora's Box? *Science* 336:434-440.
2. Segalman R A (2005) Patterning with block copolymer thin films. *Mater. Sci. Eng. R Rep.* 48:191-226.
3. Wanakule N S, Virgili J M, Teran A A, Wang Z-G, Balsara N P (2010) Thermodynamic Properties of Block Copolymer Electrolytes Containing Imidazolium and Lithium Salts. *Macromolecules* 43:8282-8289.
4. Kang Y, Walish J J, Gorishnyy T, Thomas E L (2007) Broad-wavelength-range chemically tunable block-copolymer photonic gels. *Nature Mater.* 6:957-960.
5. Joannopoulos J D (2008) *Photonic Crystals: Molding The Flow of Light* (Princeton University Press).
6. Valkama S et al. (2004) Self-assembled polymeric solid films with temperature-induced large and reversible photonic-bandgap switching. *Nature Mater.* 3:872-876.
7. Ge J, Yin Y (2011) Responsive Photonic Crystals. *Angew. Chem. Int. Ed.* 50:1492-1522.
8. Runge M B, Bowden N B (2007) Synthesis of High Molecular Weight Comb Block Copolymers and Their Assembly into Ordered Morphologies in the Solid State. *J. Am. Chem. Soc* 129:10551-10560.
9. Orfanidis S J *Electromagnetic Waves and Antennas*. Online book, retrieved May 2012. http://www.ece.rutgers.edu/~orfanidi/ewa.
10. Lin S Y et al. (1998) A three-dimensional photonic crystal operating at infrared wavelengths. *Nature* 394:251-253.
11. Masuda H et al. (1999) Photonic Crystal Using Anodic Porous Alumina. *Jpn. J. Appl. Phys.* 38:L1403-L1405.
12. Campbell M, Sharp D N, Harrison M T, Denning R G, Turberfield A J (2000) Fabrication of photonic crystals for the visible spectrum by holographic lithography. *Nature* 404:53-56.
13. Jeon S et al. (2004) Fabricating complex three-dimensional nanostructures with high-resolution conformable phase masks. *Proc. Natl. Acad. Sci. USA* 101:12428-12433.
14. Braun P V, Wiltzius P (1999) Electrochemically grown photonic crystals. *Nature* 402:603-604.
15. Bertone J F, Jiang P, Hwang K S, Mittleman D M, Colvin V L (1999) Thickness Dependence of the Optical Properties of Ordered Silica-Air and Air-Polymer Photonic Crystals. *Phys. Rev. Lett.* 83:300-303.
16. Rzayev J (2009) Synthesis of Polystyrene-Polylactide Bottlebrush Block Copolymers and Their Melt Self-Assembly into Large Domain Nanostructures. *Macromolecules* 42:2135-2141.
17. Urbas A et al. (2000) Tunable Block Copolymer/Homopolymer Photonic Crystals. *Adv. Mater.* 12:812-814.
18. Edrington A C et al. (2001) Polymer-Based Photonic Crystals. *Adv. Mater.* 13:421-425.
19. Parnell A J et al. (2011) Continuously tuneable optical filters from self-assembled block copolymer blends. *Soft Matter* 7:3721-3725.
20. Lee I et al. (2010) Quasi-Amorphous Colloidal Structures for Electrically Tunable Full-Color Photonic Pixels with Angle-Independency. *Adv. Mater.* 22:4973-4977.
21. Hustad P D, March and G R, Garcia-meitin E I, Roberts P L, Weinhold J D (2009) Photonic Polyethylene from Self-Assembled Mesophases of Polydisperse Olefin Block Copolymers. *Macromolecules* 42:3788-3794.
22. Hu M, Xia Y, McKenna G B, Kornfield J A, Grubbs R H (2011) Linear Rheological Response of a Series of Densely Branched Brush Polymers. *Macromolecules* 44:6935-6943.
23. Lee H, Matyjaszewski, K, Yu-Su S, Sheiko S S (2008) Hetero-Grafted Block Brushes with PCL and PBA Side Chains. *Macromolecules* 41:6073-6080.
24. Hadjichristidis N, Pitsikalis M, Pispas S, Iatrou H (2001) Polymers with Complex Architecture by Living Anionic Polymerization. *Chem. Rev.* 101:3747-3792.
25. Neiser M W, Okuda J, Schmidt M (2003) Polymerization of Macromonomers to Cylindrical Brushes Initiated by Organolanthanides. *Macromolecules* 36:5437-5439.
26. Heroguez V, Breunig S, Gnanou Y, Fontanille M (1996) Synthesis of α-Norbornenylpoly(ethylene oxide) Macromonomers and Their Ring-Opening Metathesis Polymerization. *Macromolecules* 29:4459-4464.
27. Xia Y, Kornfield J A, Grubbs R H (2009) Efficient Synthesis of Narrowly Dispersed Brush Polymers via Living 28. Xia Y, Olsen B D, Kornfield J A, Grubbs R H (2009) Efficient Synthesis of Narrowly Dispersed Brush Copolymers and Study of Their Assemblies: The Importance of Side Chain Arrangement. *J. Am. Chem. Soc* 131:18525-18532.
29. Johnson J A et al. (2011) Polymers by ROMP: Grafting-Through and Clicking-To. *J. Am. Chem. Soc.* 133:559-566.
30. Johnson J A et al. (2010) Drug-loaded, bivalent-bottle-brush polymers by graft-through ROMP. *Macromolecules* 43:10326-10335.
31. Vayer M et al. (2010) Perpendicular orientation of cylindrical domains upon solvent annealing thin films of polystyrene-b-polylactide. *Thin Solid Films* 518:3710-3715.
32. Zalusky A S, Olayo-Valles R, Wolf J H, Hillmyer M A (2002) Ordered Nanoporous Polymers from Polystyrene-Polylactide Block Copolymers. *J. Am. Chem. Soc.* 124:12761-12773.
33. Troparevsky M C, Sabau A S, Lupini A R, Zhang Z (2010) Transfer-matrix formalism for the calculation of optical response in multilayer systems: from coherent to incoherent interference. *Optics express* 18:24715-24721.
34. Love J A, Morgan J P, Trnka T M, Grubbs R H (2002) A practical and highly active ruthenium-based catalyst that effects the cross metathesis of acrylonitrile. *Angew. Chem. Int. Ed.* 41:4035-4037.
35. Matson J B, Grubbs R H (2008) Synthesis of Fluorine-18 Functionalized Nanoparticles for use as in vivo Molecular Imaging Agents. *J. Am. Chem. Soc.* 130:6731-6733.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

It must be noted that as used herein and in the appended claims, the singular forms "a", "an", and "the" include plural reference unless the context clearly dictates otherwise. Thus, for example, reference to "a cell" includes a plurality of such cells and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. Nothing herein is to be construed as an admission that the invention is not entitled to antedate such disclosure by virtue of prior invention.

Whenever a range is given in the specification, for example, a temperature range, a time range, or a composition or concentration range, all intermediate ranges and subranges, as well as all individual values included in the ranges given are intended to be included in the disclosure. As used herein, ranges specifically include the values provided as endpoint values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A structure comprising a supramolecular assembly of a plurality of block copolymers; wherein each of said block copolymers independently comprises:
   a first polymer block comprising first repeating units; wherein each of said first repeating units of said first polymer block comprises a first polymer backbone group covalently linked to a first polymer side chain group or a first wedge group characterized by at least three branch points each terminating in an independent branch moiety comprising at least 10 atoms; said first wedge group having a molecular weight greater than or equal to 50 Da; and
   a second polymer block comprising second repeating units; wherein each of said second repeating units of said second polymer block comprises a second polymer backbone group covalently linked to a second wedge group or a second polymer side chain group that is different than said first wedge group or said first polymer side chain group; said second wedge group characterized by at least three branch points each terminating in an independent branch moiety comprising at least 10 atoms; and said second wedge group having a molecular weight greater than or equal to 50 Da;
   wherein said first and second repeating units are directly or indirectly covalently linked along a backbone of said block copolymer;
   wherein a domain length (DL) of the structure increases substantially linearly with molecular weight (MW) of said copolymer pursuant to the expression (E4) wherein 0.85<x<1:

$$DL \propto MW^x \quad (E4);$$

wherein said structure is characterized by at least one domain having a DL greater than 160 nm;
   wherein said structure absorbs, scatters or reflects electromagnetic radiation having wavelengths greater than or equal to 600 nm;
   wherein each of said block copolymers has a molecular weight selected from the range of 2,000,000 Da to 30,000,000 Da; and
   wherein each of said copolymers has the formula (FX1a):

wherein:
   $Z^1$ is said first polymer backbone group and $Z^2$ is said second polymer backbone group;
   $Q^1$ is a first backbone terminating group and $Q^2$ is a second backbone terminating group;
   $L^1$ is a first linking group, and $L^2$ is a second linking group;
   A is independently a polymer side chain group or a wedge group, wherein A is said first wedge group or said first polymer side chain group;
   wherein B is said second polymer side chain group or said second wedge group; and
   each of n and m is independently an integer selected from the range of 10 to 2000.

2. The structure of claim 1, wherein said second polymer block is directly covalently linked to said first polymer block along said backbone of said block copolymer.

3. The structure of claim 2 wherein a size (S) of the structure corresponds to said domain length of said supramolecular assembly of said plurality of said block copolymers; or wherein said size (S) of the structure corresponds to a route mean square radius (RMSR) of said supramolecular assembly of said plurality of said block copolymers.

4. The structure of claim 2, wherein molecular self-assembly of said plurality of said block copolymers generate a periodic structure characterized by said domain length (DL) that increases substantially linearly with said molecular weight (MW) pursuant to the expression (E2) wherein 0.85<x<1:

$$DL \propto MW^x \quad (E2); \text{ or}$$

wherein molecular self-assembly of said plurality of said block copolymers results in generation of said supramolecular assembly in the solution phase characterized by a route mean square radius (RMSR) that increases substantially linearly with said molecular weight (MW) pursuant to the expression (E3) wherein 0.85<x<1:

$$RMSR \propto MW^x \quad (E3).$$

5. The structure of claim 4, wherein said periodic structure is a thin film lamellar structure having said domain length.

6. The structure of claim 2, wherein said first polymer side chain group or said first wedge group and said second polymer side chain group or said second wedge group provide steric interactions within said block copolymer resulting in said backbone of said block copolymer being an extended backbone.

7. The structure of claim 2 wherein said first polymer block comprises said first polymer side chain group.

8. The structure of claim 7 wherein said first polymer side chain group has a molecular weight selected from the range of 5,000 to 30,000 Da.

9. The structure of claim 7 wherein said second polymer block comprises said second polymer side chain group.

10. The structure of claim 9 wherein said second polymer side chain group has a molecular weight selected from the range of 5,000 to 30,000 Da.

11. The structure of claim 7 wherein said second polymer block comprises said second wedge group.

12. The structure of claim 11 wherein the second wedge group has a molecular weight selected from the range of 50 Da to 1500 Da.

13. The structure of claim 11, wherein said second wedge group independently comprises a $C_2$-$C_{30}$ alkyl, $C_3$-$C_{30}$ cycloalkyl, $C_5$-$C_{30}$ aryl, $C_5$-$C_{30}$ heteroaryl, $C_2$-$C_{30}$ ester, $C_2$-$C_{30}$ ether, $C_2$-$C_{30}$ thioether, $C_2$-$C_{30}$ amine, $C_2$-$C_{30}$ imide, $C_2$-$C_{30}$ halocarbon chain, $C_2$-$C_{30}$ perfluorocarbon or $C_2$-$C_{30}$ polyethylene glycol; or wherein said first wedge group comprises a group derived from a substituted or unsubstituted adamantane, silsesquioxane, norbornane, terpenoid, polyethylene glycol, or borneol.

14. The structure of claim 11, wherein said second wedge group has the formula (W1), (W2), (W3), (W4), (W5), (W6), or (W7):

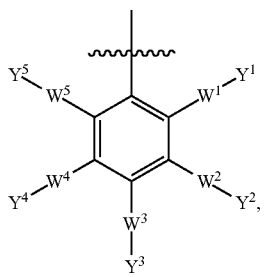

(W1)

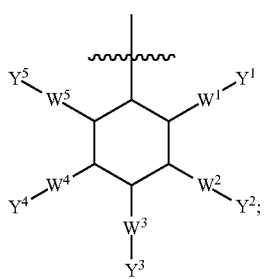

(W2)

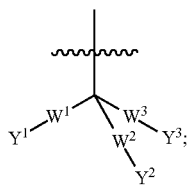

(W3)

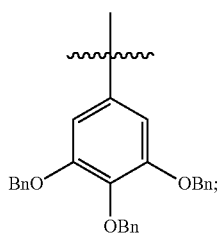

(W4)

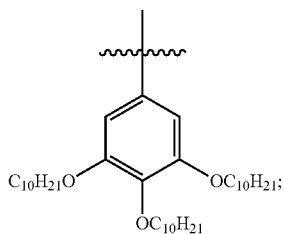

(W5)

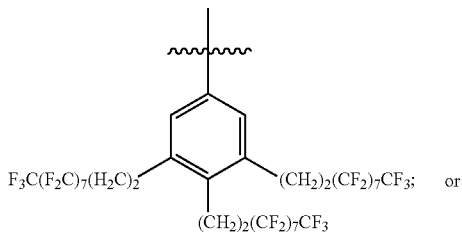

(W6)

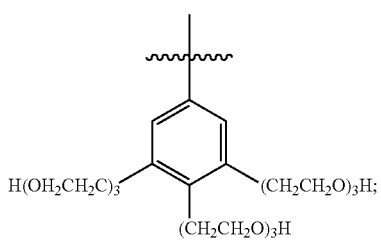

(W7)

wherein each of $W^1$-$W^5$ is independently a linking group; wherein Bn is a benzyl group; and each of $Y^1$-$Y^5$ is independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, or $C_2$-$C_{30}$ polyethylene glycol; wherein each of $R^{30}$-$R^{42}$ is independently hydrogen, $C_5$-$C_{10}$ aryl or $C_1$-$C_{10}$ alkyl.

15. The structure of claim 2, wherein said first polymer block comprises said first wedge group.

16. The structure of claim 15, wherein said first wedge group has a molecular weight selected from the range of 50 Da to 1500 Da.

17. The structure of claim 15, wherein said second polymer block comprises said second wedge group.

18. The structure of claim 17, wherein said second wedge group has a molecular weight selected from the range of 50 Da to 1500 Da.

19. The structure-of claim 2, wherein each of said block copolymers further comprises a third polymer block comprising at least 10 third repeating units; said third polymer block indirectly or directly covalently linked to said first polymer block and said second polymer block along the backbone of said block copolymer; wherein each of said third repeating units of said third polymer block comprises a third polymer backbone group covalently linked to a third polymer side chain group or a third wedge group characterized by at least three branch points each terminating in an independent branch moiety comprising at least 10 atoms; and said third wedge group having a molecular weight greater than or equal to 50 Da.

20. The structure of claim 1, wherein each of said block copolymers comprises between 500 to 2000 of said first repeating units and between 500 to 2000 of said second repeating units.

21. The structure of claim 1, wherein $Z^1$ and $Z^2$ are derived from polymerization of a monomer selected from the group consisting of a substituted or unsubstituted norbornene, olefin, cyclic olefin, norbornene anhydride, cyclooctene, cyclopentadiene, styrene and acrylate.

22. The structure of claim 1, wherein each of said block copolymers has the formula:

(FX2a)

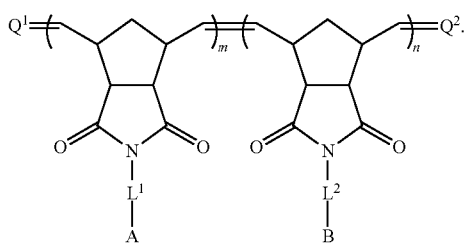

23. The structure of claim 1, wherein each of said block copolymers has the formula (FX3):

(FX3)

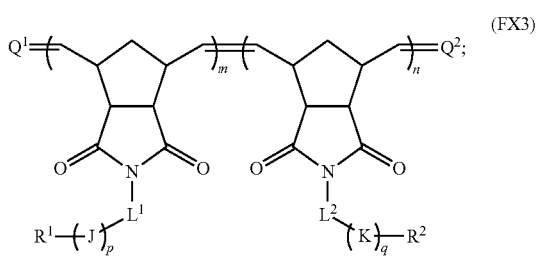

wherein:
J is a repeating group of said first polymer side chain group;
K is a repeating group of said second polymer side chain group;
each of $R^1$ and $R^2$ is independently a polymer side chain terminating group; and
each of p and q is independently an integer selected from the range of 35 to 2000.

24. The structure of claim 23 wherein each of $R^1$ and $R^2$ is independently hydrogen, $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{10}$ alkyl halide, phosphonate, phosphonic acid, silane, siloxane acrylate, or catechol; wherein each of $R^{30}$-$R^{42}$ is independently hydrogen or $C_1$-$C_5$ alkyl.

25. The structure of claim 23 wherein each of said block copolymers has the formula (FX4), (FX5), or (FX6):

(FX4)

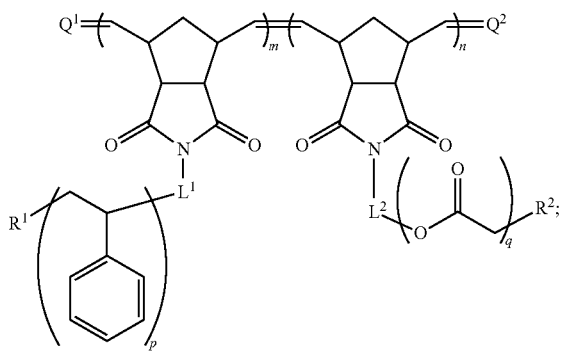

(FX5)

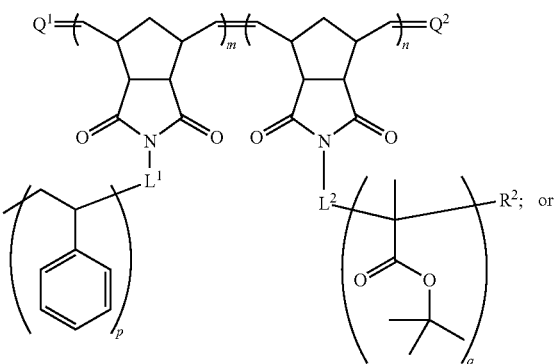

(FX6)

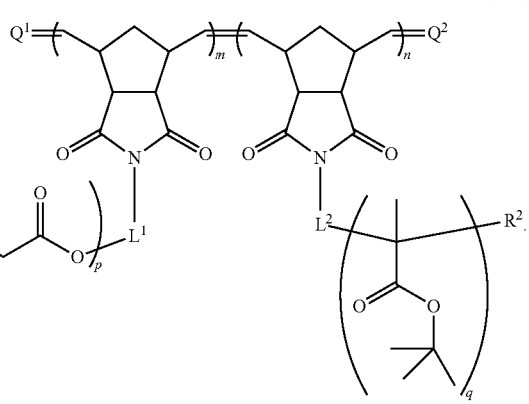

26. The structure of claim 1, wherein each of said block copolymers has the formula (FX7):

(FX7)

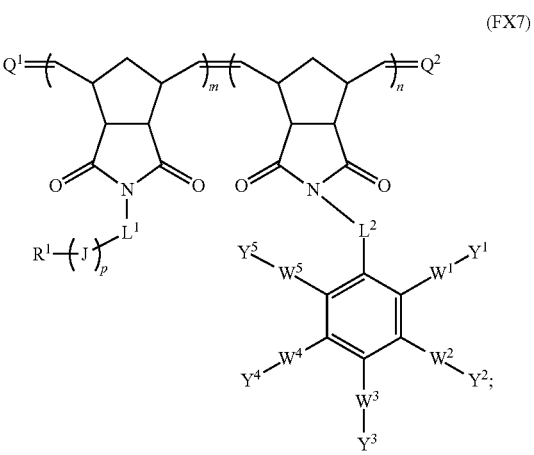

wherein:
J is a repeating group of said first polymer side chain group;
$R^1$ is a polymer side chain terminating group;
p is independently an integer selected from the range of 35 to 2000;
each of $W^1$-$W^5$ is independently a linking group; and
each of $Y^1$-$Y^5$ is independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^{30}$, —$CONR^{31}R^{32}$, —$COR^{33}$, —$SOR^{34}$, $OSR^{35}$, —$SO_2R^{36}$, —$OR^{37}$, —$SR^{38}$, —$NR^{39}R^{40}$, —$NR^{41}COR^{42}$, $C_1$-$C_{30}$ alkyl halide, phosphonate, phosphonic acid, silane, siloxane, silsesquioxane, $C_2$-$C_{30}$ halocarbon chain, $C_2$-$C_{30}$ perfluorocarbon, or $C_2$-$C_{30}$ polyethylene glycol; wherein each of $R^{30}$-$R^{42}$ is independently hydrogen, $C_5$-$C_{10}$ aryl or $C_1$-$C_{10}$ alkyl.

27. The structure of claim 26, wherein each of said block copolymers has any one of the formula (FX8), (FX9), (FX10), (FX11), (FX12) or (FX13):

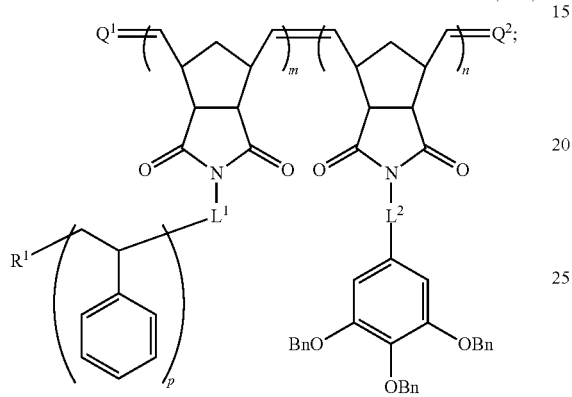

(FX8)

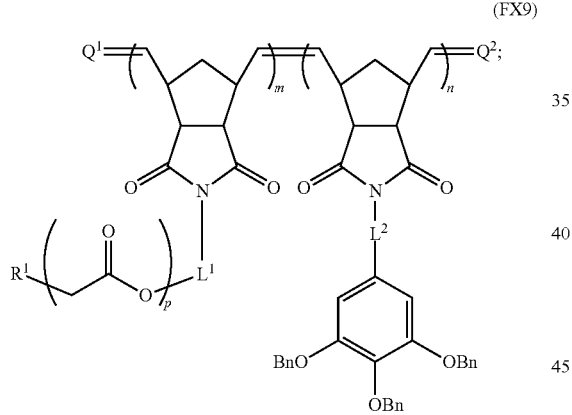

(FX9)

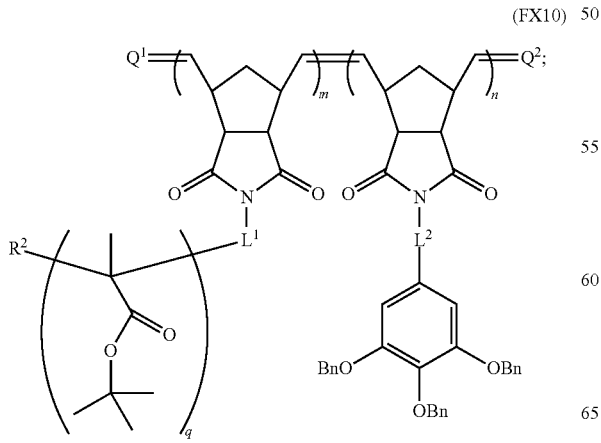

(FX10)

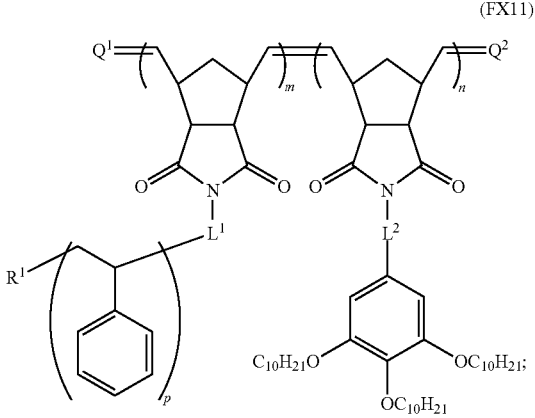

(FX11)

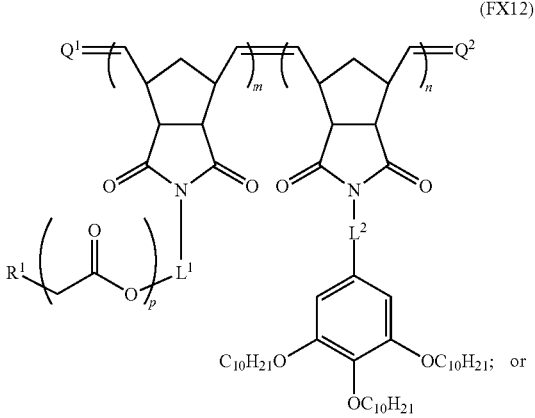

(FX12)

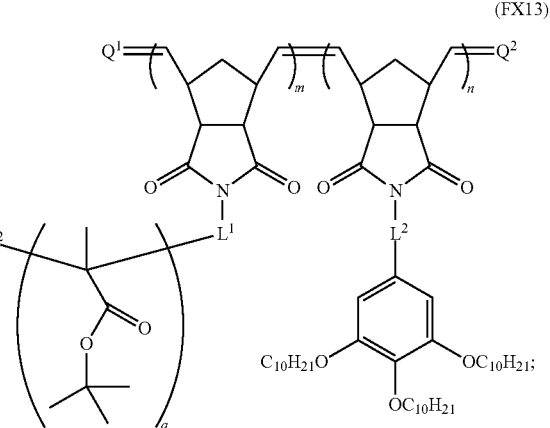

(FX13)

wherein Bn is a benzyl group.

28. The structure of claim 1 wherein each of said block copolymers has the formula (FX14) or (FX15):

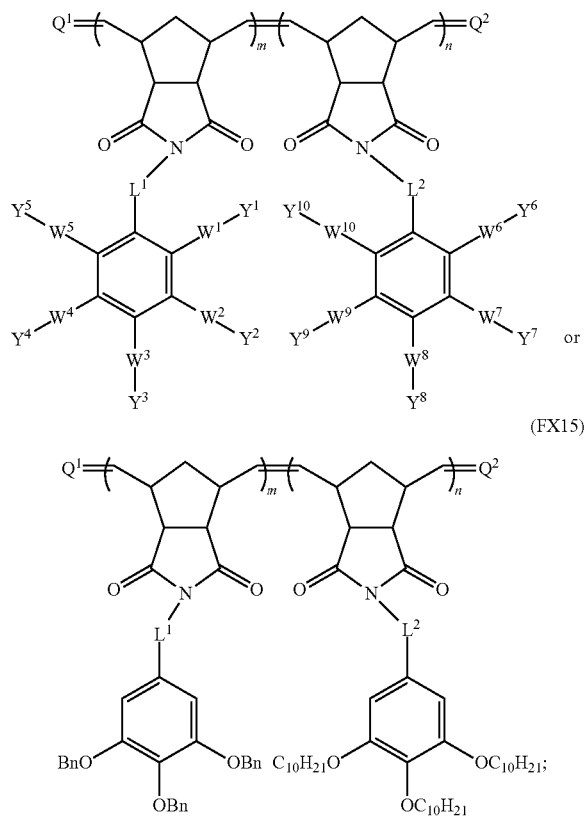

(FX14)

(FX15)

wherein:
each of $W^1$-$W^{10}$ is independently a linking group; wherein Bn is a benzyl group; and
each of $Y^1$-$Y^{10}$ independently a hydrogen, $C_1$-$C_{30}$ alkyl, $C_3$-$C_{30}$ cycloalkyl, $C_5$-$C_{30}$ aryl, $C_5$-$C_{30}$ heteroaryl, $C_1$-$C_{30}$ acyl, $C_1$-$C_{30}$ hydroxyl, $C_1$-$C_{30}$ alkoxy, $C_2$-$C_{30}$ alkenyl, $C_2$-$C_{30}$ alkynyl, $C_5$-$C_{30}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{30}$ alkyl halide, phosphonate, phosphonic acid, silane, siloxane, silsesquioxane, $C_2$-$C_{30}$ halocarbon chain, $C_2$—$O_{30}$ perfluorocarbon, or $C_2$—$O_{30}$ polyethylene glycol; wherein each of $R^{30}$-$R^{42}$ is independently hydrogen, $C_5$-$C_{10}$ aryl or $C_1$-$C_{10}$ alkyl; and wherein at least a portion of $Y^1$-$Y^5$ are different than $Y^6$-$Y^{10}$.

29. The structure of claim 28, wherein each of $W^1$-$W^{10}$ is independently a single bond, —$(CH_2)_q$—, —$(CH_2)_qO(CH_2)_r$—, —$(CH_2)_qS(CH_2)_r$—, —$(CH_2)_qO_2(CH_2)_r$—, —$(CH_2)_qSO(CH_2)_r$, —$(CH_2)_qSO_2(CH_2)_r$—, —$(CH_2)_qSO_3(CH_2)_r$—, —$CH_2)_qOSO_2(CH_2)_r$13 , —$(CH_2)_qNR^{19}(CH_2)_r$—, —$(CH_2)_qCO(CH_2)_r$—, —$(CH_2)_qCOO(CH_2)_r$—, —$(CH_2)_qOCO(CH_2)_r$—, —$(CH_2)_qOCOO(CH_2)_r$—, —$(CH_2)_qCONR^{20}(CH_2)_r$—, —$(CH_2)_qNR^{21}CO(CH_2)_r$—, —$(CH_2)_qOCONR^{22}(CH_2)_r$—, —$(CH_2)_qNR^{23}COO(CH_2)_r$—, or —$(CH_2)_qNR^{24}CONR^{25}(CH_2)_r$—; wherein each of $R^{19}$-$R^{25}$ is independently hydrogen, or $C_1$-$C_5$ alkyl; and wherein each of q and r is independently an integer selected from the range of 0 to 10.

30. The structure of claim 1, wherein each of $L^1$, and $L^2$ is independently a single bond, —$(CH_2)_q$—, —$(CH_2)_qO(CH_2)_r$—, —$(CH_2)_qS(CH_2)_r$—, —$(CH_2)_qO_2(CH_2)_r$—, —$(CH_2)_qSO(CH_2)_r$, —$(CH_2)_q SO_2(CH_2)_r$—, —$(CH_2)_qSO_3(CH_2)_r$—, —$(CH_2)_qOSO_2(CH_2)_r$—, —$(CH_2)_qNR^{19}(CH_2)_r$—, —$(CH_2)_qCO(CH_2)_r$—, —$(CH_2)_qCOO(CH_2)_r$—, —$(CH_2)_qOCO(CH_2)_r$—, —$(CH_2)_qOCOO(CH_2)_r$—, —$(CH_2)_qCONR^{20}(CH_2)_r$—, —$(CH_2)_qNR^{21}CO(CH_2)_r$—, —$(CH_2)_qOCONR^{22}(CH_2)_r$—, —$(CH_2)_qNR^{23}COO(CH_2)_r$—, or —$(CH_2)_qNR^{24}CONR^{25}(CH_2)_r$—; wherein each of $R^{19}$-$R^{25}$ is independently hydrogen, or $C_1$-$C_5$ alkyl; and wherein each of q and r is independently an integer selected from the range of 0 to 10, or wherein each of $Q^1$ and $Q^2$ is independently hydrogen, $C_1$-$C_{10}$ alkyl, $C_3$-$C_{10}$ cycloalkyl, $C_5$-$C_{10}$ aryl, $C_5$-$C_{10}$ heteroaryl, $C_1$-$C_{10}$ acyl, $C_1$-$C_{10}$ hydroxyl, $C_1$-$C_{10}$ alkoxy, $C_2$-$C_{10}$ alkenyl, $C_2$-$C_{10}$ alkynyl, $C_5$-$C_{10}$ alkylaryl, —$CO_2R^{30}$, —$CONR^{31}R^{32}$, —$COR^{33}$, —$SOR^{34}$, —$OSR^{35}$, —$SO_2R^{36}$, —$OR^{37}$, —$SR^{38}$, —$NR^{39}R^{40}$, —$NR^{41}COR^{42}$, $C_1$-$C_{10}$ alkyl halide, phosphonate, phosphonic acid, silane, siloxane, acrylate, or catechol; wherein each of $R^{30}$-$R^{42}$ is independently hydrogen, $C_1$-$C_{10}$ alkyl or $C_5$-$C_{10}$ aryl.

* * * * *